US012766942B2

(12) United States Patent
Liang et al.

(10) Patent No.: US 12,766,942 B2
(45) Date of Patent: Oct. 20, 2026

(54) SIDE-BY-SIDE UTILITY VEHICLE

(71) Applicant: Zhejiang CFMOTO Power Co., Ltd., Hangzhou (CN)

(72) Inventors: Haifeng Liang, Hangzhou (CN); Yibin Yang, Hangzhou (CN); Kaimin Xu, Hangzhou (CN); Meng Chen, Hangzhou (CN); Zhiyong Chen, Hangzhou (CN); Pengfei Zou, Hangzhou (CN); Ying Fang, Hangzhou (CN)

(73) Assignee: Zhejiang CFMOTO Power Co., Ltd., Hangzhou (CN)

( * ) Notice: Subject to any disclaimer, the term of this patent is extended or adjusted under 35 U.S.C. 154(b) by 427 days.

(21) Appl. No.: 18/225,529

(22) Filed: Jul. 24, 2023

(65) Prior Publication Data

US 2023/0364978 A1 Nov. 16, 2023

Related U.S. Application Data

(63) Continuation of application No. PCT/CN2021/085350, filed on Apr. 2, 2021.

(30) Foreign Application Priority Data

Feb. 8, 2021 (CN) ........................ 202110184325.X

(51) Int. Cl.
*B60K 5/04* (2006.01)
*B60J 1/14* (2006.01)
(Continued)

(52) U.S. Cl.
CPC .................. *B60K 5/04* (2013.01); *B60J 1/14* (2013.01); *B60J 5/0487* (2013.01); *B60K 11/02* (2013.01);
(Continued)

(58) Field of Classification Search
CPC .............. B60K 5/00; B60K 5/02; B60K 5/04; B60K 11/02; B60K 13/02; B60K 13/04;
(Continued)

(56) References Cited

U.S. PATENT DOCUMENTS 5,347,799 A 9/1994 Hosaka et al.
6,092,877 A 7/2000 Rasidescu et al.
(Continued)

FOREIGN PATENT DOCUMENTS

CN 201273207 Y 7/2009
CN 101761277 A 6/2010
(Continued)

*Primary Examiner* — Tinh T Dang

(74) *Attorney, Agent, or Firm* — Shewchuk IP Services, LLC; Jeffrey D. Shewchuk

(57) ABSTRACT

A side-by-side utility vehicle includes a frame, a cockpit, a prime mover assembly having an engine, a transmission assembly, and a gear shift assembly, and an intake and exhaust system having a combustion air intake manifold and a combustion exhaust manifold. The combustion air intake manifold is closer to the seat(s) than the combustion exhaust manifold. The engine defines a cylinder head mid-point and the seat(s) define a seat beam front point, the ratio of a distance between the cylinder head mid-point and the seat beam front point to a wheel base is in the range from 0.22 to 0.49. The heat source generated by the engine is away from the driver, improving the comfort, increasing the storage space, and facilitating the maintenance.

19 Claims, 28 Drawing Sheets

(51) Int. Cl.

| | |
|---|---|
| ***B60J 5/04*** | (2006.01) |
| ***B60K 5/02*** | (2006.01) |
| ***B60K 11/02*** | (2006.01) |
| ***B60K 13/02*** | (2006.01) |
| ***B60K 13/04*** | (2006.01) |
| ***B60K 15/01*** | (2006.01) |
| ***B60K 15/063*** | (2006.01) |
| ***B60N 2/005*** | (2006.01) |
| ***B60N 2/06*** | (2006.01) |
| ***B60N 2/90*** | (2018.01) |
| ***B60R 5/04*** | (2006.01) |
| ***B60R 7/04*** | (2006.01) |
| ***B60R 16/04*** | (2006.01) |
| ***E05B 79/12*** | (2014.01) |
| ***E05B 83/36*** | (2014.01) |
| ***E05D 11/06*** | (2006.01) |
| *E05B 79/06* | (2014.01) |

(52) U.S. Cl.

CPC .............. *B60K 13/02* (2013.01); *B60K 13/04* (2013.01); *B60K 15/01* (2013.01); *B60K 15/063* (2013.01); *B60N 2/005* (2013.01); *B60N 2/06* (2013.01); *B60N 2/919* (2018.02); *B60R 5/04* (2013.01); *B60R 7/043* (2013.01); *B60R 16/04* (2013.01); *E05B 79/12* (2013.01); *E05B 83/36* (2013.01); *E05D 11/06* (2013.01); *E05B 79/06* (2013.01); *E05Y 2900/55* (2013.01)

(58) Field of Classification Search

CPC .................. B60K 15/01; B60K 15/063; B60K 2005/003; B60J 1/14; B60J 5/0487; B60N 2/005; B60N 2/06; B60N 2/919; B60R 5/04; B60R 7/043; B60R 16/04; E05B 79/12; E05B 83/36; E05B 79/06; E05D 11/06; E05Y 2900/55; Y02T 10/62; B60P 1/04

See application file for complete search history.

(56) References Cited

U.S. PATENT DOCUMENTS

| | | | | |
|---|---|---|---|---|
| 6,269,899 | B1 | 8/2001 | Izumi | |
| 6,499,561 | B1 | 12/2002 | Yasuda | |
| 7,845,452 | B2 | 12/2010 | Bennett et al. | |
| 8,157,039 | B2 | 4/2012 | Melvin et al. | |
| 8,827,028 | B2 | 9/2014 | Sunsdahl et al. | |
| 9,540,052 | B2 | 1/2017 | Burt, II et al. | |
| 9,545,838 | B1 | 1/2017 | Hill | |
| 10,399,435 | B2 * | 9/2019 | Bastien ............ | B60K 15/03504 |
| 10,816,071 | B2 | 10/2020 | Cheng et al. | |
| 11,066,105 | B2 | 7/2021 | Lutz et al. | |
| 11,104,384 | B2 | 8/2021 | Kinsman et al. | |
| 11,353,099 | B2 | 6/2022 | Cheng | |
| 2008/0023249 | A1 | 1/2008 | Sunsdahl et al. | |
| 2010/0194087 | A1 | 8/2010 | Yamamura | |
| 2011/0240250 | A1 | 10/2011 | Azuma | |
| 2014/0262584 | A1 | 9/2014 | Lovold et al. | |
| 2015/0259011 | A1 * | 9/2015 | Deckard .................. | B60N 2/24<br>280/781 |
| 2017/0001519 | A1 | 1/2017 | Bessho | |
| 2017/0028881 | A1 * | 2/2017 | Proulx ..................... | B60N 2/38 |
| 2017/0029035 | A1 * | 2/2017 | Dube ...................... | B60R 7/043 |
| 2017/0029036 | A1 * | 2/2017 | Proulx ................... | B60N 2/305 |
| 2017/0036717 | A1 | 2/2017 | Wakabayashi et al. | |
| 2018/0065465 | A1 | 3/2018 | Ward et al. | |
| 2018/0222395 | A1 * | 8/2018 | Roy ........................ | B60R 7/043 |
| 2020/0070650 | A1 | 3/2020 | Lin | |
| 2020/0307340 | A1 | 10/2020 | Yao | |
| 2022/0097511 | A1 | 3/2022 | Wang et al. | |
| 2023/0191901 | A1 | 6/2023 | Rao et al. | |

FOREIGN PATENT DOCUMENTS

| | | | | |
|---|---|---|---|---|
| CN | 102355812 A | | 2/2012 | |
| CN | 105840817 A | | 8/2016 | |
| CN | 207594697 U | | 7/2018 | |
| CN | 210033647 U | | 2/2020 | |
| CN | 201317453 U | | 4/2020 | |
| CN | 201317533 U | | 4/2020 | |
| CN | 210309907 U | | 4/2020 | |
| CN | 210309908 U | | 4/2020 | |
| CN | 210390758 U | | 4/2020 | |
| CN | 210822467 U | | 6/2020 | |
| CN | 211364241 U | | 8/2020 | |
| CN | 111717013 A | | 9/2020 | |
| CN | 211543210 U | | 9/2020 | |
| CN | 212003387 U | | 11/2020 | |
| CN | 112248771 A | | 1/2021 | |
| CN | 112282527 A | | 1/2021 | |
| JP | 1134658 A | | 2/1999 | |
| WO | WO-2015085501 A1 | * | 6/2015 | ........... G06F 3/0488 |

* cited by examiner

SIDE-BY-SIDE UTILITY VEHICLE

RELATED APPLICATION INFORMATION

The present application is a continuation of PCT/CN2021/085350 filed on Apr. 2, 2021, which claims the benefits of priority to Chinese Patent Application No. CN202110184325.X, filed with the Chinese Patent Office on Feb. 8, 2021. The entire contents of the above-referenced applications are incorporated herein by reference.

FIELD OF THE DISCLOSURE

The disclosure belongs to the technical field of vehicle engineering, and in particular to a side-by-side utility vehicle.

BACKGROUND OF THE DISCLOSURE

Side-by-side utility vehicles are generally used for field transportation, field rescue, field exploration, field construction and other purposes. However, complex terrain (such as sand beach, river bed, forest road, stream, and harsh desert terrain) leads to high running resistance. Therefore, side-by-side utility vehicles are generally equipped with a powerful prime mover assembly. At the same time, there are generally various obstacles in the roads where side-by-side utility vehicles run, so the body of side-by-side utility vehicles is generally small.

As we all know, a powerful prime mover assembly generally creates a lot of heat, and a cockpit is very close to the powerful prime mover assembly due to the small size of the vehicle, so a driver in the cockpit may be continuously overheated, seriously affecting the driving comfort. In addition, the storage space of the existing cockpit is very small, thus reducing convenience.

SUMMARY OF THE DISCLOSURE

The disclosure is to provide a side-by-side utility vehicle with good driver comfort and large storage volume.

A side-by-side utility vehicle includes a vehicle head or front end, a cockpit and a rear trunk seen from front to back. The vehicle includes a frame formed such as by welding or otherwise joining pipe sections, a vehicle cover, a prime mover assembly, a drive train, an intake and exhaust system, and a plurality of wheels supporting the frame. The plurality of wheels includes a pair of front wheels and a pair of rear wheels. A ground reference plane is defined as a horizontal plane where the wheels make contact with the ground; and a longitudinal mid-plane is defined as a vertical plane where a center line of the vehicle in a width direction is located, the longitudinal mid-plane being perpendicular to the ground reference plane. The frame is supported by the front wheels and the rear wheels. The cockpit is defined by the frame, with a steering mechanism and at least one seat arranged inside the cockpit. The drive train is coupled to the prime mover assembly to drive at least one of the front wheels and the rear wheels.

Optionally, the engine defines a cylinder head mid-point and the seat(s) defines a seat beam front point, and a ratio of a distance between the cylinder head mid-point and the seat beam front point to a wheel base is in the range from 0.22 to 0.49. Preferably, the ratio is in the range from 0.27 to 0.44. More preferably, the ratio is in the range from 0.32 to 0.38.

DETAILED DESCRIPTION

For better understanding of the above objects, features and advantages of this application, the embodiments of the present disclosure will be described in detail below with reference to the accompanying drawings. The terms "first", "second" appearing in this application are only for convenience of description to distinguish different components with the same name, and do not indicate the order or primary secondary relationship. In the following description, the general orientations of front, rear, up (upper), down (lower), left and right for the off-road vehicle 100 are based on the driver's perspective and are defined in FIG. 1.

Figure 1:
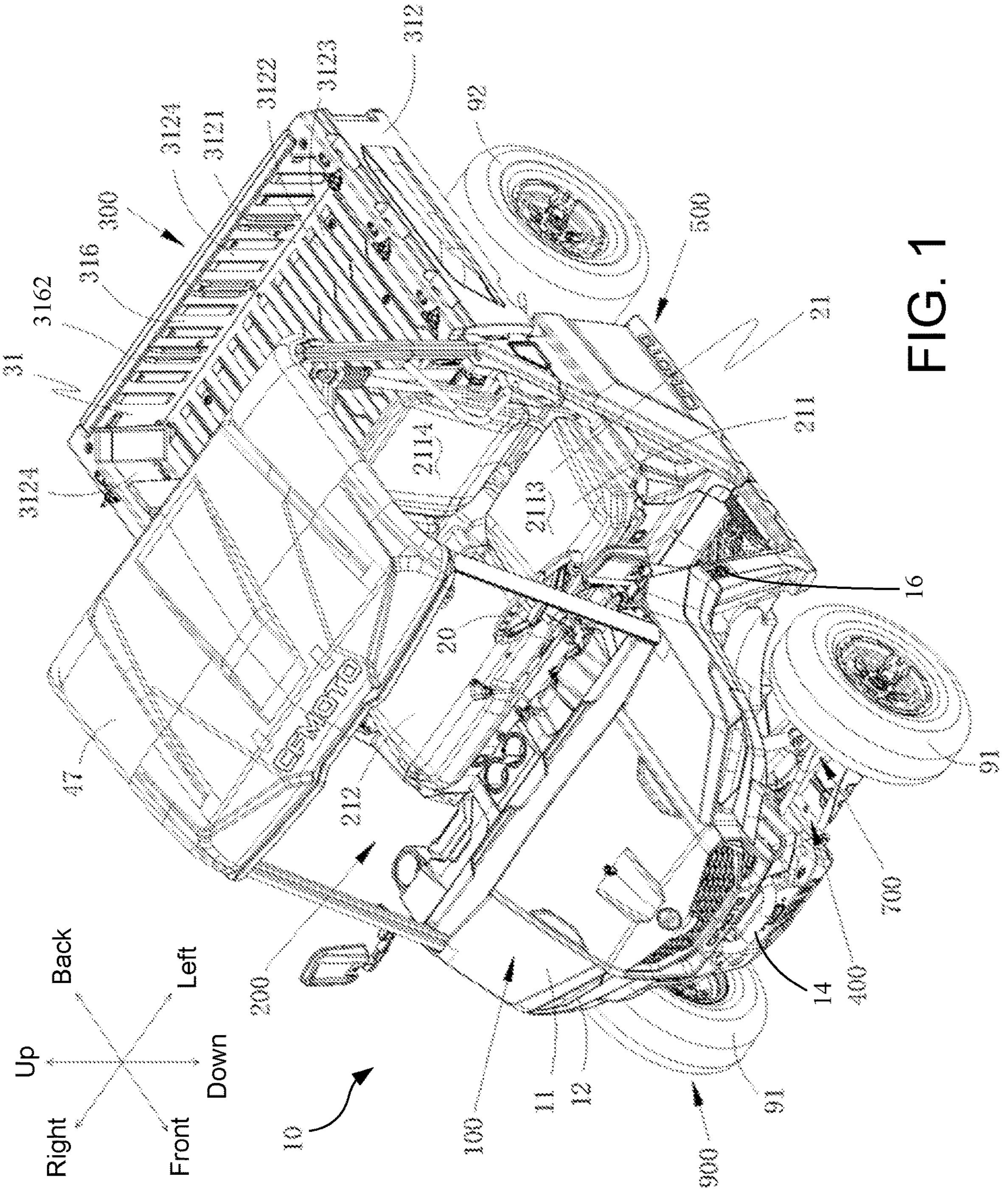
FIG. 1 is a front left perspective view of a side-by-side utility vehicle of the application.

As shown in FIG. 1, a side-by-side utility vehicle 10 includes a vehicle head or front end 100, a cockpit 200 and a rear trunk 300 seen from front to back. The vehicle 10 includes a frame 400 formed by splicing, welding or otherwise joining generally metal pipe or frame sections, a vehicle cover 500, a drive train 700, and a plurality of wheels 900 supporting the frame 400. A steering mechanism 20 for controlling traveling direction of the vehicle 10 and at least one seat 21 are arranged inside the cockpit 200. The plurality of wheels 900 include a pair of front wheels 91 and a pair of rear wheels 92.

Figure 2:
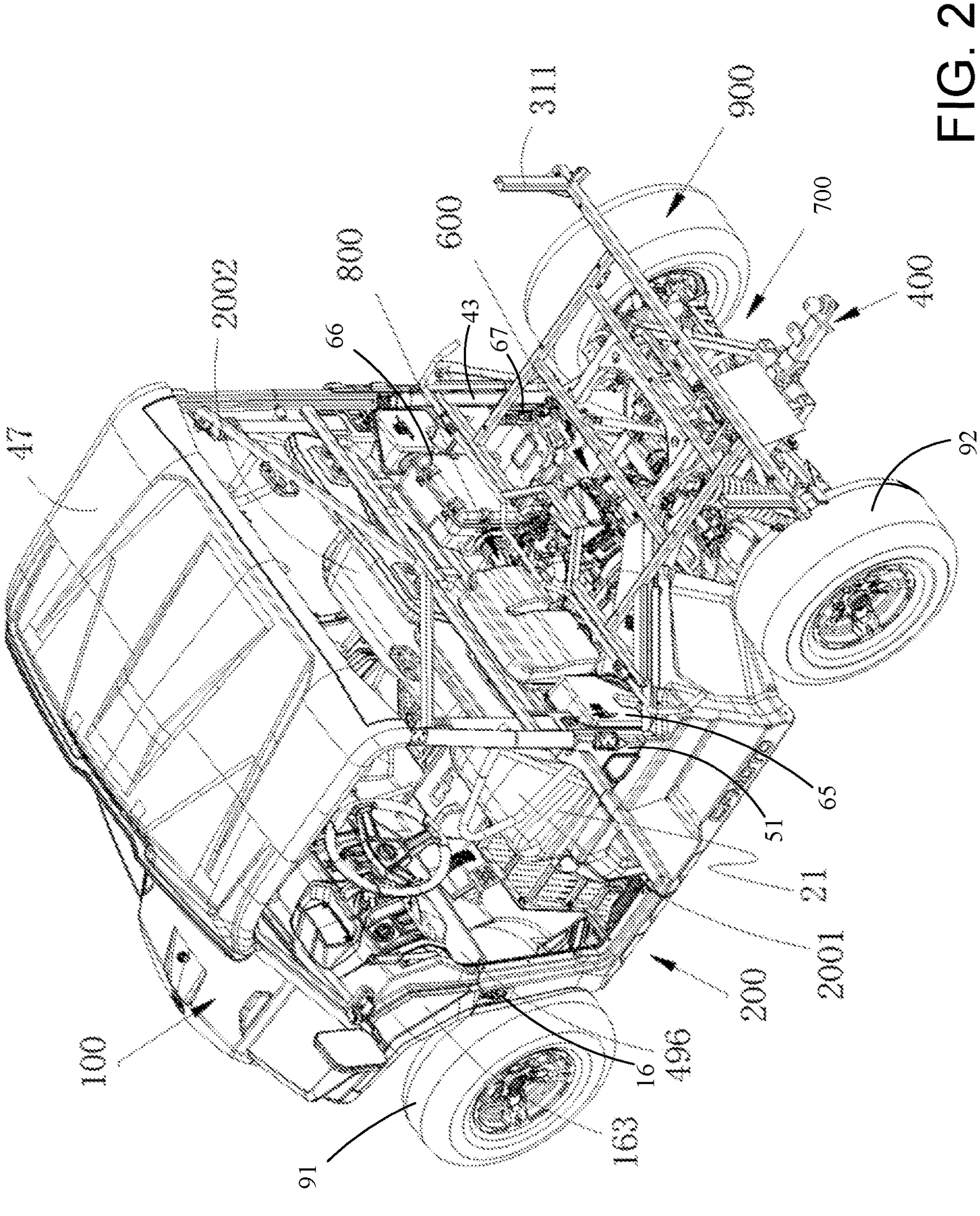
FIG. 2 is a rear left perspective view of the side-by-side utility vehicle in FIG. 1 with its rear trunk body and heat shield protection plate removed.

As better seen in FIG. 2 which doesn't show all of the rear trunk 300, the utility vehicle 10 also includes a prime mover assembly 600 with an intake and exhaust system 800. The drive train 700 is coupled to the prime mover assembly 600 to drive at least one of the front wheels 91 or the rear wheels 92.

Figure 3:
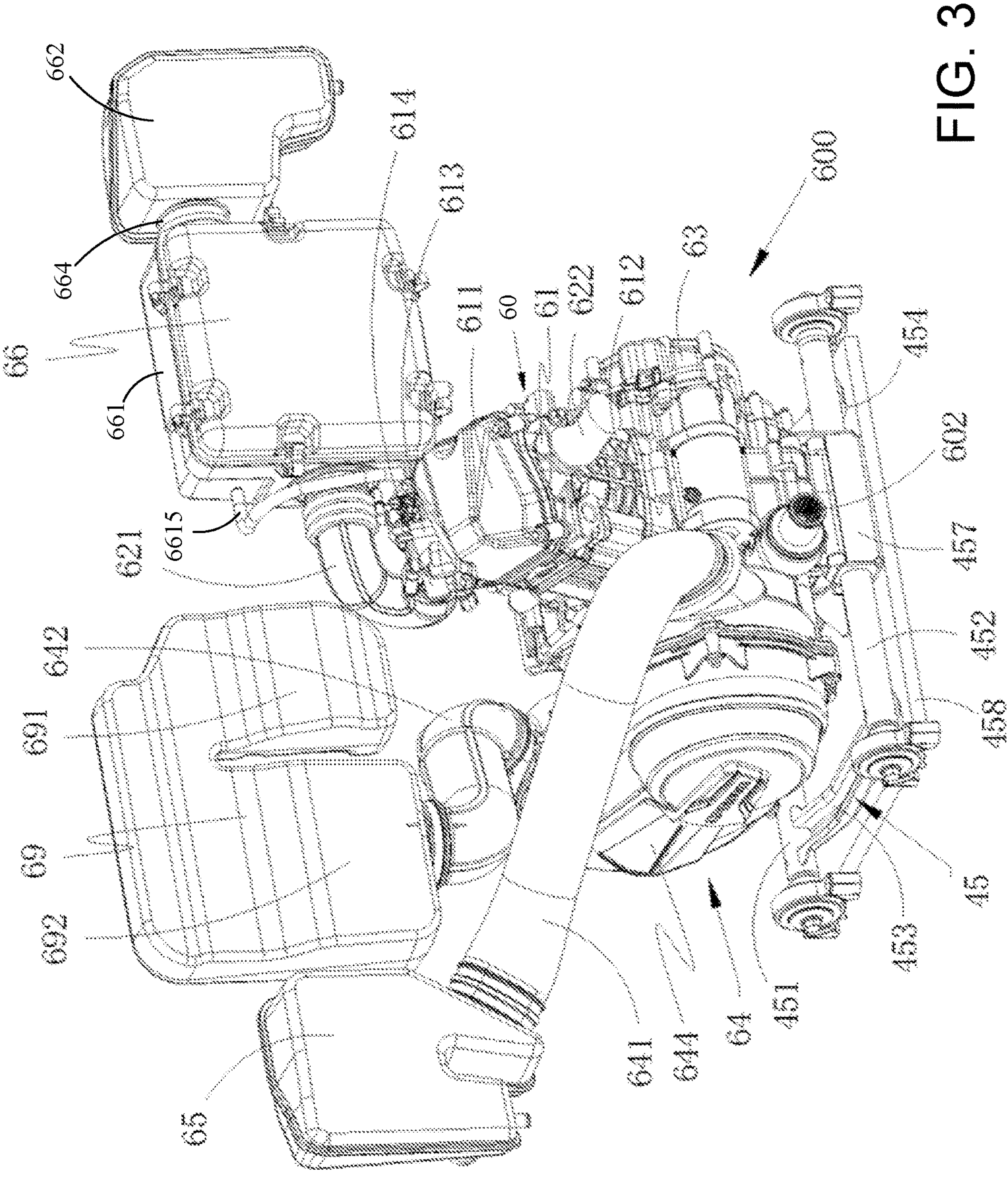
FIG. 3 is a rear left perspective view of a prime mover assembly and support cradle of the side-by-side utility vehicle in FIG. 1.

FIG. 3 better shows the prime mover assembly 600 and portions of the intake and exhaust system 800 secured to the prime mover assembly 600. The prime mover assembly 600 is supported by the frame 400, specifically by a support cradle 45. The prime mover assembly 600 includes an engine 60, a transmission assembly 64 coupled to the engine 60 for adjusting transmission power and speed ratios between the engine 60 and the drive train 700, and a gear shift assembly 63 for shifting gears (typically Park-Reverse-Neutral-Low-High (or Drive)) between the engine 60 and the drive train 700. The engine 60 includes at least one cylinder 61 with a cylinder head 611 positioned at one end (typically the top end) of a cylinder block 612. The cylinder 61 defines a combustion chamber inside the cylinder 61 against a piston (not shown) which is arranged to reciprocate within the cylinder 61. The intake and exhaust system 800 includes a first intake manifold 621 and a first exhaust manifold 622 (shown in part) used for combustion air and combustion exhaust. The combustion chamber of the cylinder 61 is in fluid communication through intake and exhaust valves (not shown, but under the cylinder head 611) with the combustion air intake manifold 621 and the combustion exhaust manifold 622. The intake and exhaust system 800 also includes a second intake manifold 641 and a second outlet manifold 642 both used for cooling air. The transmission assembly 64 is in fluid communication with the cooling air intake manifold 641 and the cooling air outlet manifold 642, so the transmission assembly 64 is cooled by the air flow. In this embodiment, the transmission assembly 64 is a CVT gearbox, and the gear shift assembly 63 is a speed reducing or speed reversing gear pair.

Figure 4:
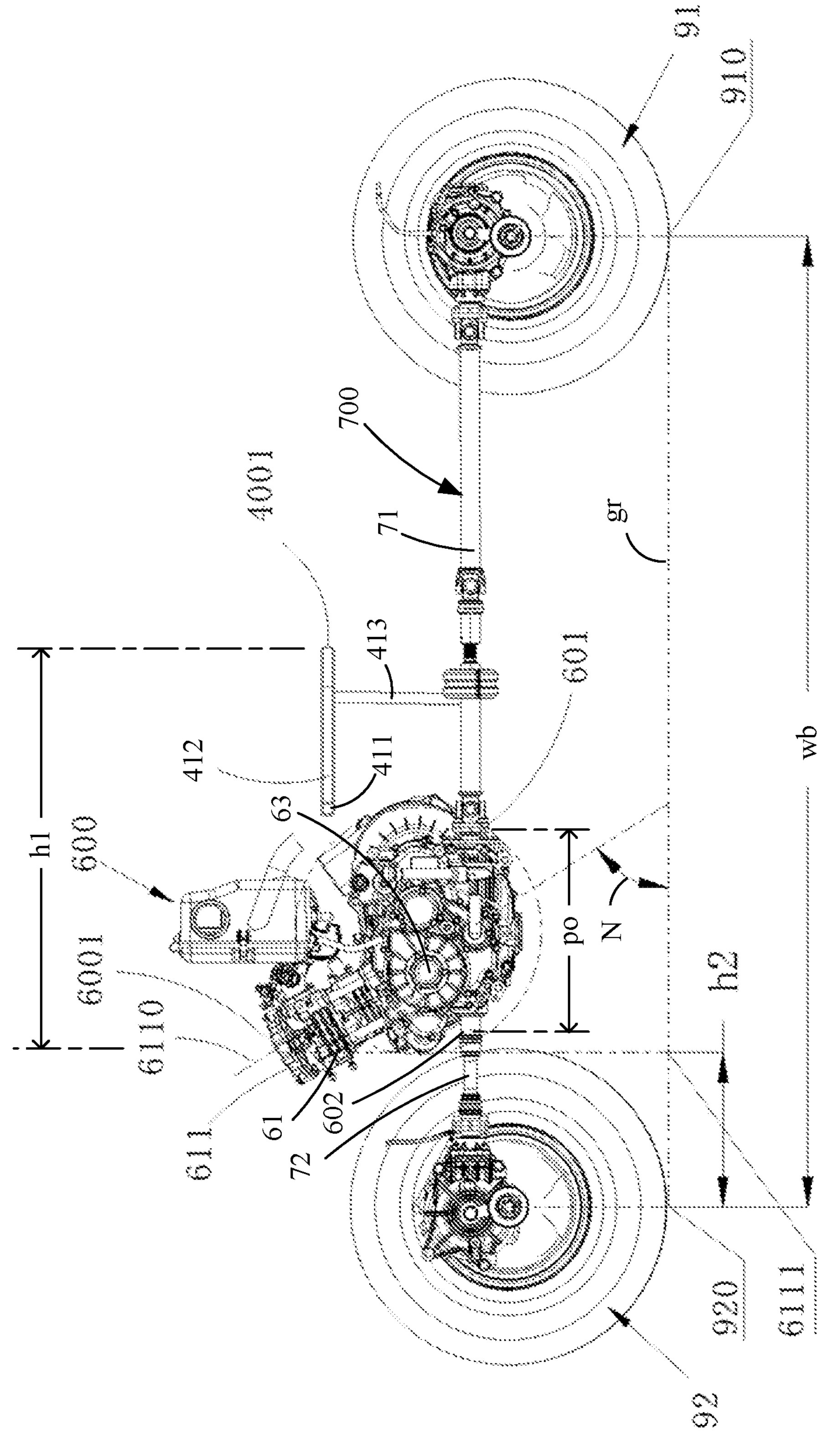
FIG. 4 is a right side view of a prime mover assembly, a drive train and a seat bracket of the side-by-side utility vehicle in FIG. 1.

FIG. 4 shows a side view of the layout of the prime mover assembly 600 relative to the drive train 700, the front wheels 91 and the rear wheels 92, and a seat support main beam 412. A ground reference plane gr is defined as a horizontal plane where the wheels 900 make contact with the ground, including a front wheel contact point 910 where one front wheel 91 contacts the ground reference plane gr and a rear wheel contact point 920 where one rear wheel 92 (on the same side as the front wheel contact point 910) contacts the ground reference plane gr. A distance between the front wheel contact point 910 and the rear wheel contact point 920 is defined as the wheel base wb.

Figure 5:
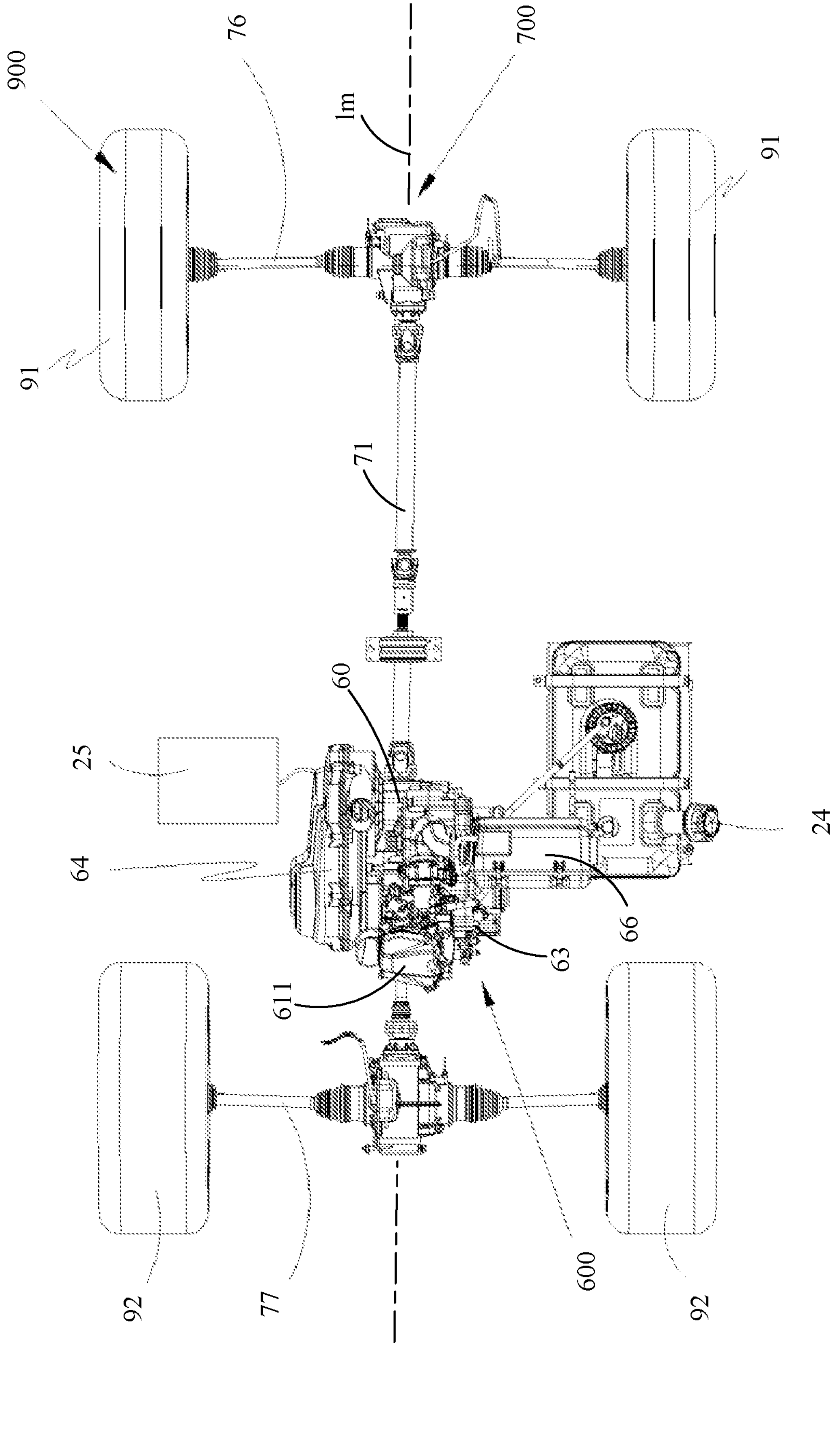
FIG. 5 is a top plan view of the drive train, the prime mover assembly, a fuel tank and a battery (shown schematically) of the side-by-side utility vehicle in FIG. 1.

FIG. 5 shows a plan view of the layout of the prime mover assembly 600 relative to the drive train 700, the front wheels 91 and the rear wheels 92, a fuel tank 24 and a battery 25 (shown schematically). A longitudinal mid-plane lm is defined as a vertical plane where the center line of the vehicle 10 in a width direction is located, with the longitudinal mid-plane lm being perpendicular to the ground reference plane gr. The engine 60 defines a cylinder head mid-point 6001, called out in FIG. 4, where the central axis 6110 of the cylinder 61 intersects the cylinder head 611 as projected on the longitudinal mid-plane lm. The seat(s) 21 defines a seat beam front point 4001, also called out in FIG. 4, where a midpoint of the front end face of a seat support main beam 412 projects onto the longitudinal mid-plane lm. In the preferred embodiment shown, a ratio of the longitudinal distance h1 between the cylinder head mid-point 6001 and the seat beam front point 4001 to the wheel base wb is in the range from 0.22 to 0.49, preferably in the range from 0.27 to 0.44, and more preferably in the range from 0.32 to 0.38.

A cylinder incline angle N is defined between the central axis 6110 of the cylinder 61 and the ground reference plane gr. The cylinder incline angle N is preferably in the range from 45° to 90°, with FIG. 4 showing a cylinder incline angle N of about 58°.

A projection of the cylinder head mid-point 6001 projected on the ground reference plane gr is defined as a cylinder head projection point 6111. A longitudinal distance between the cylinder head projection point 6111 and the rear wheel contact point 920 is defined as h2. A ratio of h2 to wb is in the range from 0.11 to 0.27. Preferably, the ratio of h2 to wb is in the range from 0.13 to 0.24. More preferably, the ratio of h2 to wb is in the range from 0.16 to 0.21. For alternative embodiments that place the prime mover assembly 600 slightly further forward or have a higher cylinder incline angle N, a ratio of h2 to wb is in the range from 0.17 to 0.29, more preferably in the range from 0.19 to 0.27, and most preferably in the range from 0.2 to 0.25.

At least a portion of the cylinder 61 is rearward of (closer to the rear wheels 92 than) the gear shift assembly 63, and the gear shift assembly 63 is forward of (closer to the seat(s) 21 than) at least a portion of the cylinder 61. The combustion air intake manifold 621 is closer to the seat(s) 21 than the combustion exhaust manifold 622, the cooling air outlet manifold 642 is closer to the seat(s) 21 than the cooling air intake manifold 641, and the cylinder 61 is closer to the longitudinal mid-plane lm than the transmission assembly 64. Therefore, the cylinder 61, which generally runs as a heat source with a higher temperature than other components of the engine 60, is kept further from the seat(s) 21, thereby improving driving comfort. At the same time, the cylinder 61 leaves more space for the seat(s) 21, increasing the storage space in the cockpit 200.

The vehicle 10 is preferably a four wheel drive vehicle, and the prime mover assembly 600 includes a front power output flange 601 for connecting a front drive shaft 71 and a rear power output flange 602 for connecting a rear drive shaft 72 as shown in FIG. 4. The longitudinal distance between the front power output flange 601 and the rear power output flange 602 is an engine power output length po. A ratio of engine power output length po to wheelbase wb is preferably in the range from 1:3.8 to 1:4.1. A ratio of engine power output length po plus h2 to wheelbase wb is preferably in the range from 1:2 to 1:3.5.

The center of gravity of the battery 25 and the center of gravity of the fuel tank 24 are preferably located on the opposite sides of the longitudinal mid-plane lm, with the center of gravity of battery 25 being further away from the longitudinal mid-plane lm than the center of gravity of the engine 60. The center of gravity of the battery 25 is preferably farther back than the center of gravity of the seat(s) 21. All of these placements lead to the vehicle 10 having a more centralized and balanced overall center of gravity for various driver weights and various amounts of fuel in the fuel tank 24, reducing the likelihood of tipping the vehicle 10 during use.

As shown in FIG. 3 relative to the longitudinal mid-lane lm called out in FIG. 5, the preferred embodiment positions the cooling air intake manifold 641 and the cooling air outlet manifold 642 on the same side of the longitudinal mid-plane lm, which in the preferred embodiment is the driver's side of the longitudinal mid-plane lm. The combustion air intake manifold 621 and the combustion exhaust manifold 622 are positioned on the same side of the longitudinal mid-plane lm, which in the preferred embodiment is the passenger's side of the longitudinal mid-plane lm. Other embodiments reverse the prime mover assembly 600 and associated manifolds 621, 622, 641, 642 right to left. The cooling air intake manifold 641 and the combustion air intake manifold 621 are respectively located on opposite sides of the longitudinal mid-plane lm.

The cylinder block 612 is in fluid communication with a fuel input pipe 613 and a coolant input pipe 614, both called out in FIG. 3. In the preferred embodiment shown, the fuel input pipe 613 and the coolant input pipe 614 are positioned closer to the seat(s) 21 than the cylinder head 611.

Figure 33:
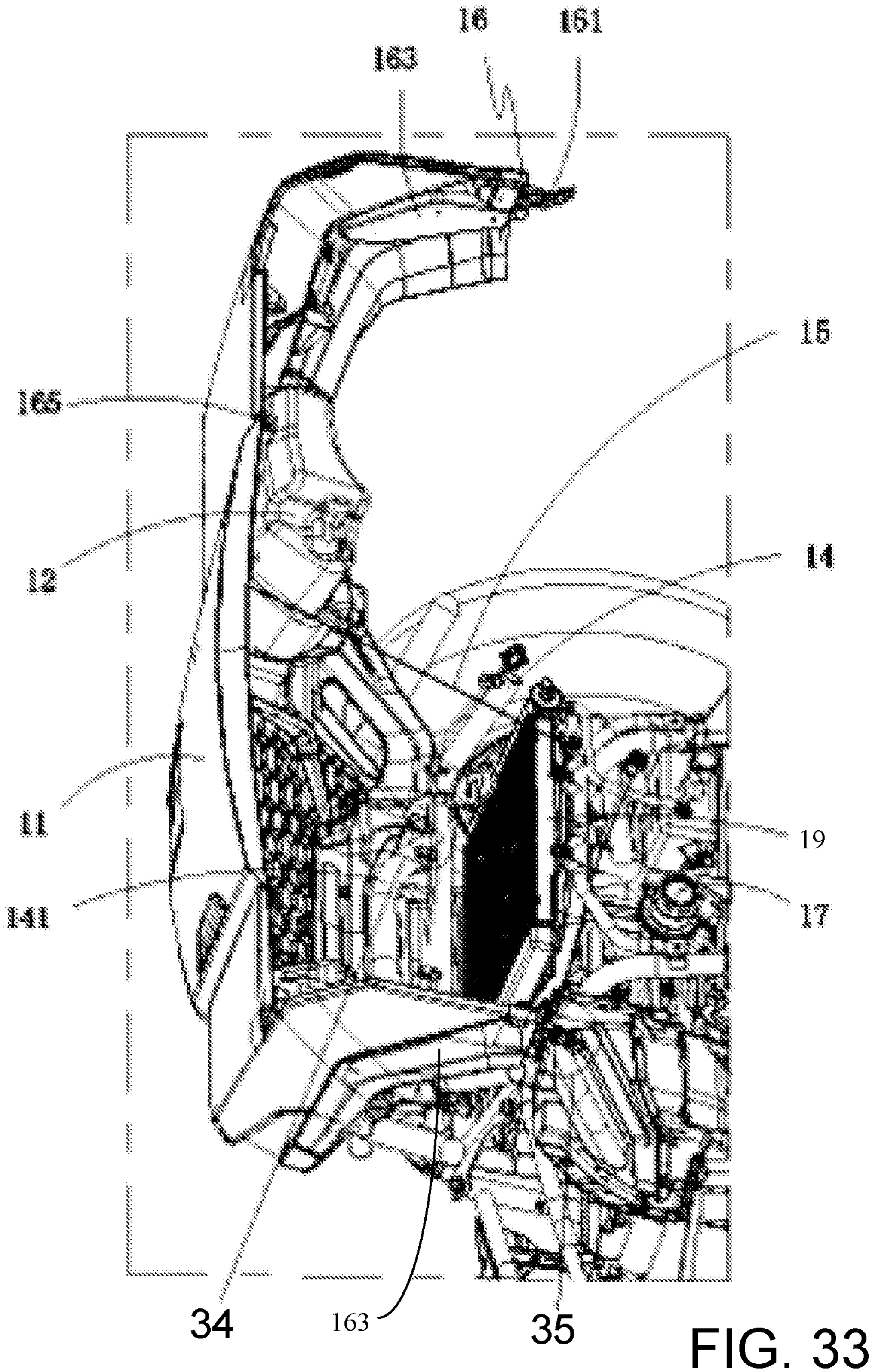
FIG. 33 is a left perspective view of the front end of the side-by-side utility vehicle in FIG. 1, showing the hood fully opened.

In the preferred embodiment shown in FIG. 3, the coolant input pipe 614 is closer to the transmission assembly 64 than the fuel input pipe 613. The coolant input pipe 614 extends forwardly and downwardly from the cylinder block 612 to an under seat portion, then extends forwardly within the cockpit 200, and then extends forwardly and upwardly within the vehicle front end 100, so as to connect to a radiator 19 (as shown in FIG. 33) in the vehicle front end 100 area. The coolant input pipe 614 is fixed to the frame 400 by a stopper (not shown) in the cockpit area 200. After absorbing heat within the cylinder block 612, coolant returns to the radiator 19 through a coolant return pipe (not separately shown). Particularly in the cockpit area 200, the coolant input pipe 614 is preferably closer to the longitudinal mid-plane lm than the coolant return pipe, which facilitates heat dissipation and reduces the impact of the heat source on drivers, thereby improving driving comfort.

Figure 6:
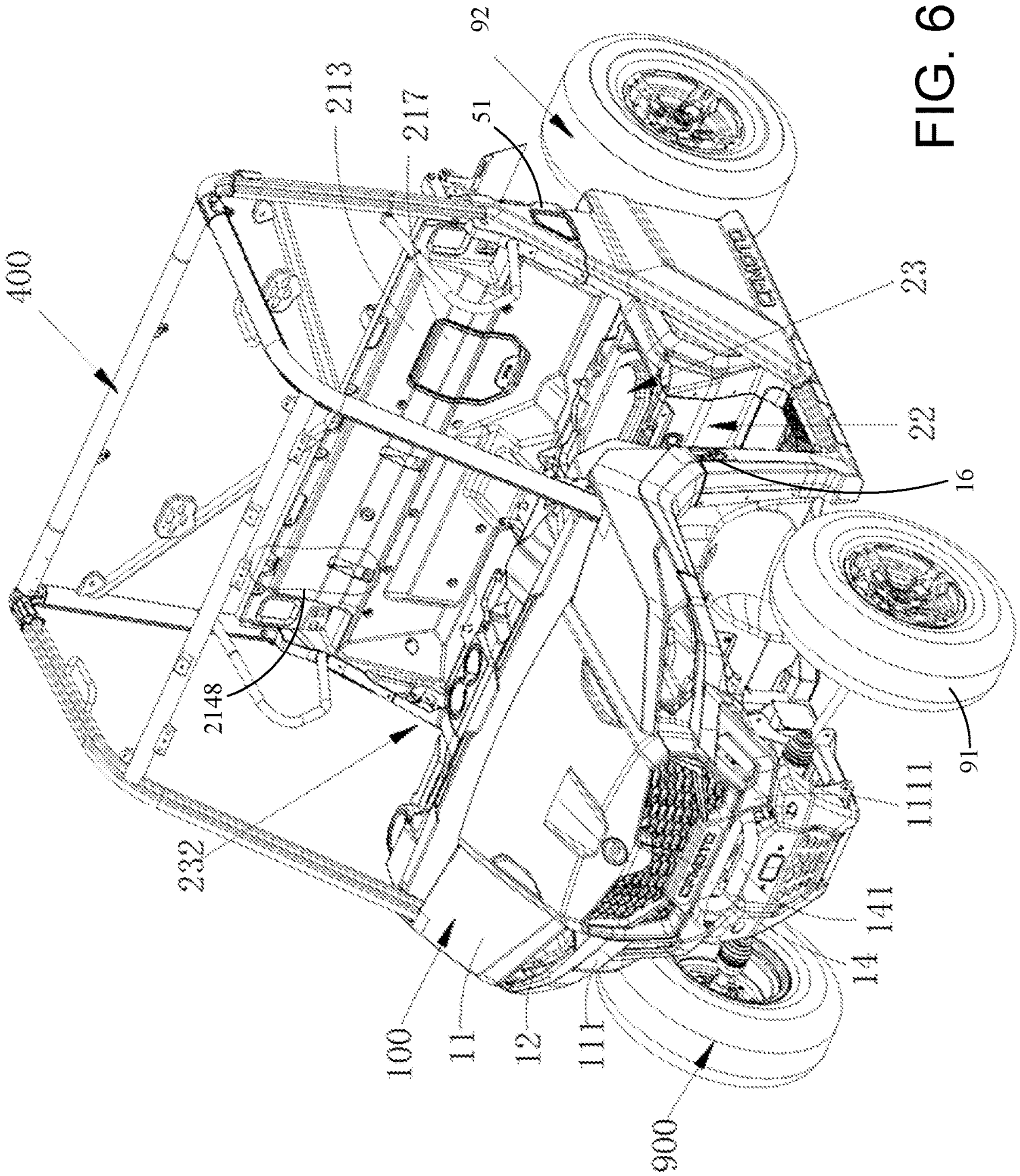
FIG. 6 is a front left perspective view of the side-by-side utility vehicle of FIG. 1 with its rear trunk, roof and seat(s) removed.
Figure 7:
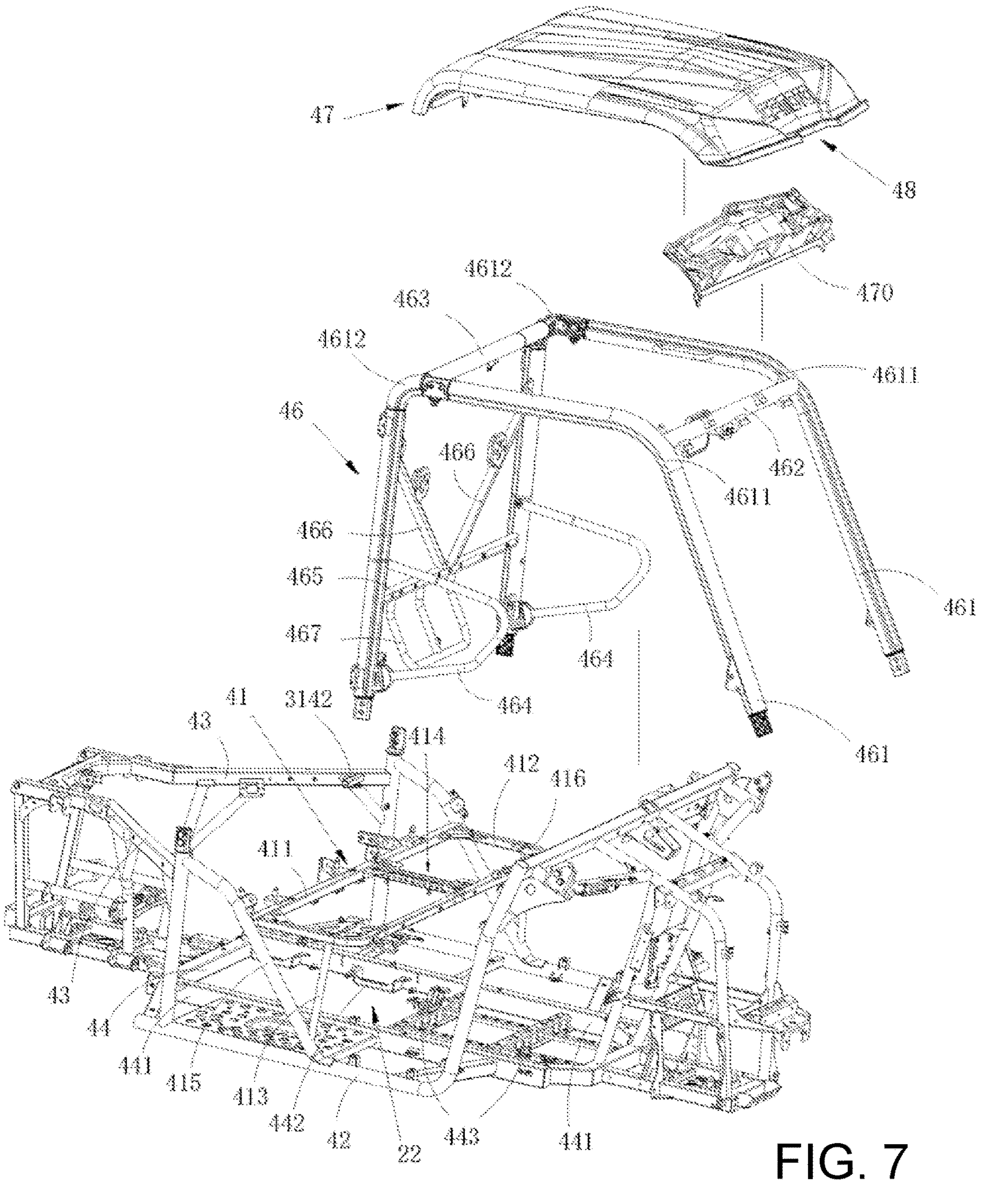
FIG. 7 is a front right exploded perspective view of a frame and a roof of the side-by-side utility vehicle in FIG. 1.
Figure 8:
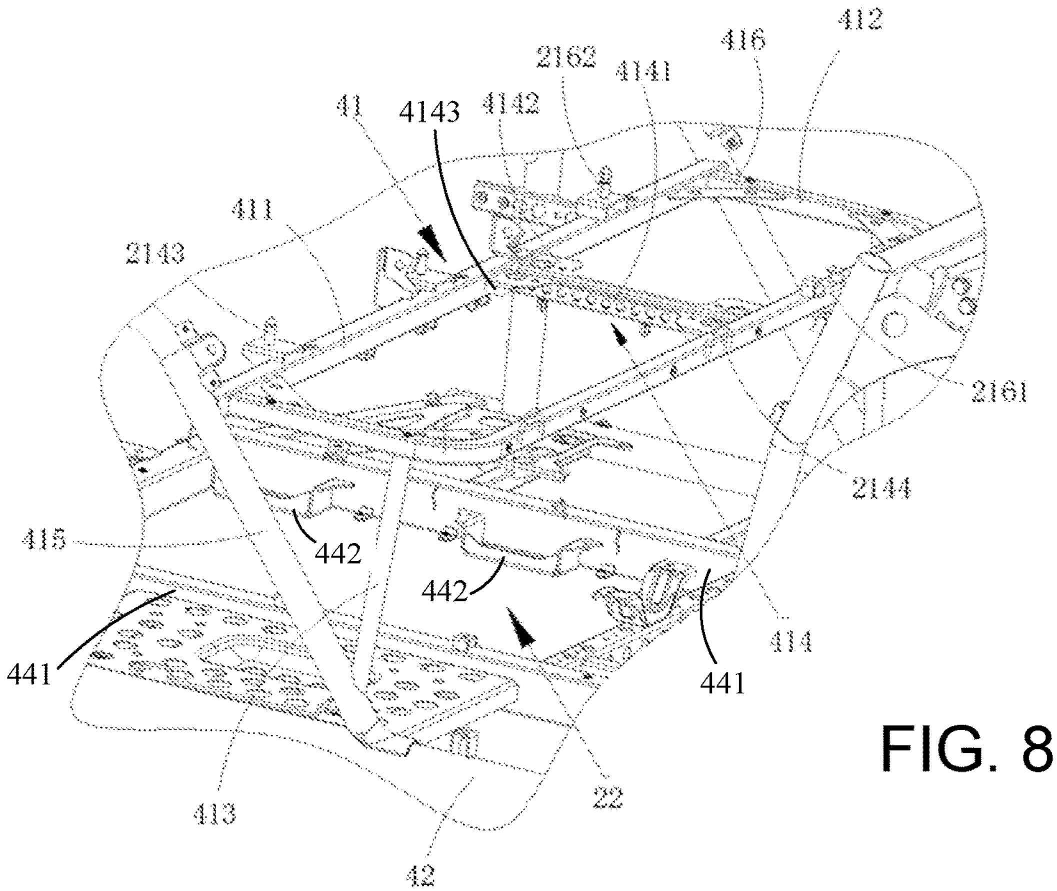
FIG. 8 is an enlargement of a portion of the frame in FIG. 7.
Figure 9:
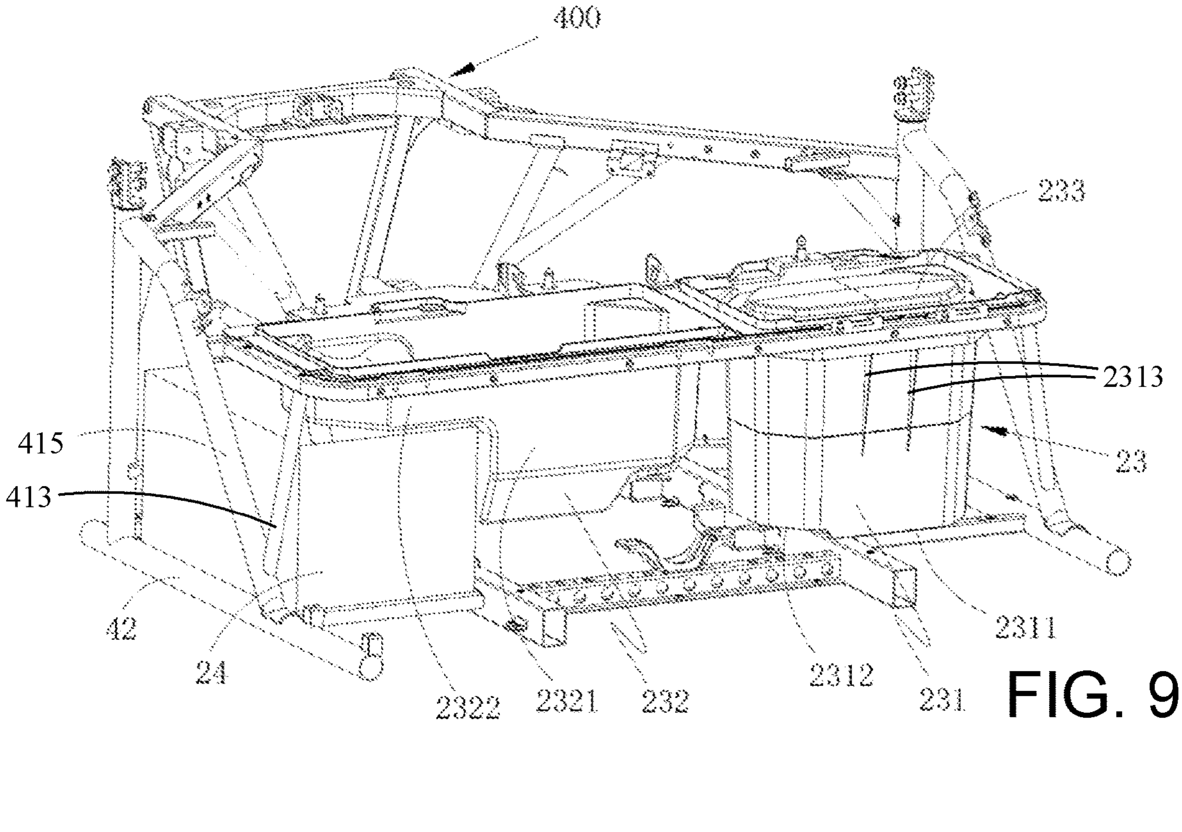
FIG. 9 is a front right perspective view of a storage box and a seat bracket of the side-by-side utility vehicle in FIG. 1, relative to a rear half of the frame.

The seat(s) 21 are relatively elevated within the cockpit 200. FIG. 6 shows the vehicle 10 without showing the seat(s) 21 or the rear trunk 300, and FIGS. 7, 8 and 9 show the preferred frame 400. The frame 400 includes a chassis 44 with a pair of longitudinal beams 441 extending from the vehicle front end 100 toward the rear trunk 300. The two longitudinal beams 441 are symmetrically arranged with respect to the longitudinal mid-plane lm, and a plurality of connection crossbeams 443 are arranged between the longitudinal beams 441. Each longitudinal beam 441 includes a plurality of lugs 442. A support cradle 45 for the engine 60, shown in FIG. 3, is arranged on the lugs 442 shown in FIGS. 7 and 8. The lugs 442 are arranged on inwardly facing sides of the longitudinal beams 441, and the inner side of the lugs 442 close to the longitudinal mid-plane lm is not obstructed, which can better withstand displacement caused by engine vibration during engine operation. The engine 60 is thus arranged on the chassis 44 through the support cradle 45, which will be further described below with reference to FIG. 19.

The preferred embodiment defines a storage space 22 under seat(s) 21. Elevating the seat(s) 21 increases the volume of the storage space 22. Elevating the seat(s) 21 also keeps the heat source of the engine 60 at an elevation below the seat(s) 21, which improves driving comfort.

FIG. 7 shows the preferred frame 400 of the vehicle 10, with FIG. 8 enlarging a portion of FIG. 7. The preferred embodiment fixes a seat bracket 41 to the frame 400. In the preferred embodiment shown, the storage box(es) 23 shown in FIGS. 6 and 9 is(are) mounted on the seat bracket 41 shown in FIGS. 7 and 8 within the cockpit 200.

As best shown in FIG. 8, the seat bracket 41 includes a seat support cross beam 411 fixed to the frame 400, a seat support main beam 412 connected to the seat support cross beam 411, and a plurality of seat support legs 413, each with one end connected to the seat support main beam 412 and the other end fixed to the frame 400. The plurality of the seat support legs 413 are respectively distributed on both sides of the seat support main beam 412.

The frame 400 includes a pair of side frames 42 indirectly connected to the seat bracket 41. The side frames 42 extend forward along the floor of the cockpit 200 to the vehicle front end 100, and then extend forwardly and upwardly. Each side frame 42 is further from the longitudinal mid-plane lm than the longitudinal beam 441 on the same side. The frame 400 includes a plurality of inclined seat support arms 415. The seat support legs 413 extend upwardly in front of the inclined seat support arms 415, so the inclined seat support arms 415 and the seat support legs 413 jointly form a triangular support for the seat(s) 21. Each side frame 42 supports a seat support leg 413 and an inclined seat support arm 415, with the seat support legs 413 being oriented slightly inwardly and upwardly compared with rearwardly and upwardly orientation of the inclined seat support arms 415.

A separation beam 414 separating the storage space 22 is arranged on the seat bracket 41, and the corners of the seat bracket 41 are provided with four angled corner plates 416. The separation beam 414 includes a beam body 4141 and four wings 4142. The separation beam 414 extends backward from the seat support main beam 412 and is connected to the seat support cross beam 411. The wings 4142 are positioned at the connections between the separation beam 414 and the seat support main beam 412 and/or the connections between the separation beam 414 and the seat support cross beam 411. The wings 4142 extend away from the beam body 4141. The separation beam 414 not only separates the storage space 22, but also improves the rigidity of the seat bracket 41. The wings 4142 can support the storage box(es) 23. The angled corner plates 416 also improve the rigidity of the seat bracket 41 and can support the storage box 23.

The beam body 4141 defines a plurality of holes which can be used for attachment of the storage box 23. The wings 4142 extend outwardly from the beam body 4141, and then extend downwardly to form connection lugs 4143. The connection lugs 4143 of the wings 4142 improve the support stiffness. The wings 4142 define a plurality of holes, which likewise can be used for attachment of the seat(s) 21 and/or for attachment of the storage box(es) 23.

One or more storage box(es) 23 each with an opening upward is preferably arranged in the storage space 22. For instance, the preferred vehicle 10 includes a driver storage box 231 and a passenger storage box 232. The storage box(es) 23 may have a storage box cover 233 arranged between the storage box(es) 23 and the seat(s) 21, or the seat(s) 21 may be provided with a sealing portion capable of closing the opening of the storage box(es) 23, which facilitates storing and retrieving objects to/from the storage box(es) 23. The storage box(es) 23 may have one or more holes (not shown) in their bottom for discharging sand, dust, food crumbs, water or other spilled liquid, etc.

In the preferred embodiment shown, the volume of underseat storage 22 which is under the driver seat 211 (generally determined by multiplying the horizontal area of the driver seat 211 by the height that the bottom of the driver seat 211 is over the floor of the cockpit 200) is in the range from 19 to 41.4 L. Preferably, the volume of underseat storage 22 which is under the driver seat 211 is in the range from 27.9 to 38.5 L. More preferably, the volume of underseat storage 22 which is under the driver seat 211 is in the range from 30 to 36 L. As shown in FIG. 8, the volume of underseat storage 22 which is under the passenger seat 212 is greater than the volume of underseat storage 22 which is under the driver seat 211. The volume of underseat storage 22 which is under the passenger seat 212 is in the range from 25.5 to 44 L. Preferably, the volume of underseat storage 22 which is under the passenger seat 212 is in the range from 32 to 40 L. More preferably, the volume of underseat storage 22 which is under the passenger seat 212 is in the range from 35 to 37 L. The total volume of storage space 22 under the seat(s) 21 in the preferably within the range from 63 to 72 L, more preferably within the range from 65 to 71 L, and most preferably within the range from 67 to 70 L.

A ratio of h2 to the volume of underseat storage 22 which is under the driver seat 211 is not more than 11 mm:1 L. Preferably, the ratio is not more than 9.4 mm: 1 L. More preferably, the ratio is not more than 7.7 mm: 1 L. A ratio of h2 to the volume of storage volume under the passenger seat is not more than 14 mm: 1 L. Preferably, the ratio is not more than 10.8 mm: 1 L. More preferably, the ratio is not more than 9.4 mm: 1 L.

A driver area 2001 with a driver seat 211 and a passenger area 2002 with a passenger seat 212 are defined inside the cockpit 200 as called out in FIGS. 1 and 2, and FIGS. 10-12 better show the preferred construction of the seats 211, 212. The driver seat 211 includes at least one or more preferably two driver seat cross beams 2111, a driver seat scaffold 2112 connected to the driver seat cross beam(s) 2111, a driver back-cushion 2114 (called out in FIG. 1), a driver seat cushion 2113 arranged on the driver seat scaffold 2112, and a seat adjustment device 215 connecting the driver seat cross beam(s) 2111 and the driver seat scaffold 2112. The driver seat scaffold 2112 is preferably formed of two metal L-shaped supports running longitudinally under the driver seat cushion 2113 and behind the driver back-cushion 2114. The driver seat cross beam(s) 2111 is(are) mounted on the seat bracket 41, the driver seat scaffold 2112 is positioned above the driver seat cross beam(s) 2111, and the seat adjustment device 215 is arranged between the driver seat scaffold 2112 and the driver seat cross beam(s) 2111.

The seat adjustment device 215 preferably includes at least one and more preferably two movable adjustment slide rail(s) 2151, a corresponding number of stationary adjustment slide rail(s) 2152 and a seat adjustment handle 2153. The movable adjustment slide rail(s) 2151 is connected to the driver seat scaffold 2112, the stationary adjustment slide rail(s) 2152 is connected to the driver seat cross beam 2111, and the movable adjustment slide rail(s) 2151 is(are) capable of sliding relative to the stationary adjustment slide rail(s) 2152. The movable adjustment slide rail(s) 2151 and the stationary adjustment slide rail(s) 2152 is(are) capable of switching between a sliding state and a locking state by operating the seat adjustment handle 2153, so the position of the driver seat 211 can be adjusted to meet the various needs of different drivers.

In this embodiment, the seat adjustment handle 2153 is provided with a latch, and at least one of the stationary adjustment slide rail(s) 2152 defines a plurality of grooves for matching with the latch. When the latch is clamped into one of the grooves, the mating adjustment slide rails 2151, 2152 are in a locked state, and when the latch is separated from the grooves, the mating adjustment slide rails 2151, 2152 are in a sliding state. In other embodiments, switching between the locked state and the sliding state of the mating adjustment slide rails 2151, 2152 may alternatively be realized by other structures or methods.

In order to facilitate assembly and disassembly of the driver seat 211, a driver seat connection structure 216 is preferably arranged between the driver seat 211 and the frame 400. The driver seat connection structure 216 includes a driver seat limit base 2161 and a driver seat fixing pin 2162 both called out in FIG. 8, which mate with a driver seat connection shaft 2163 and a driver seat locking member 2164 both called out in FIG. 10. The driver seat limit base 2161 is arranged on a top side of the seat support main beam 412 toward the vehicle front end 100, and the driver seat connection shaft 2163 is arranged on the forward driver seat cross beam 2111. The driver seat connection shaft 2163 can be placed in the driver seat limit base 2161 and thereafter can pivot about a transverse axis within the driver seat limit base 2161, so as to realize forward pivoting of the driver seat 211 and facilitate access and use of a driver storage box 231. At the same time, the driver seat connection shaft 2163 can also be removed from the driver seat limit base 2161 to facilitate disassembly of the driver seat 211 from the vehicle 10. The driver seat fixing pin 2162 is arranged on a top side of the seat support cross beam 411, and the driver seat locking member 2164 is correspondingly arranged facing downwardly behind the rearward driver seat cross beam 2111. The driver seat fixing pin 2162 and the driver seat locking member 2164 mate in an interference fit, keeping the driver seat 211 from unintentionally overturning or separating from the seat bracket 41.

Figure 10:
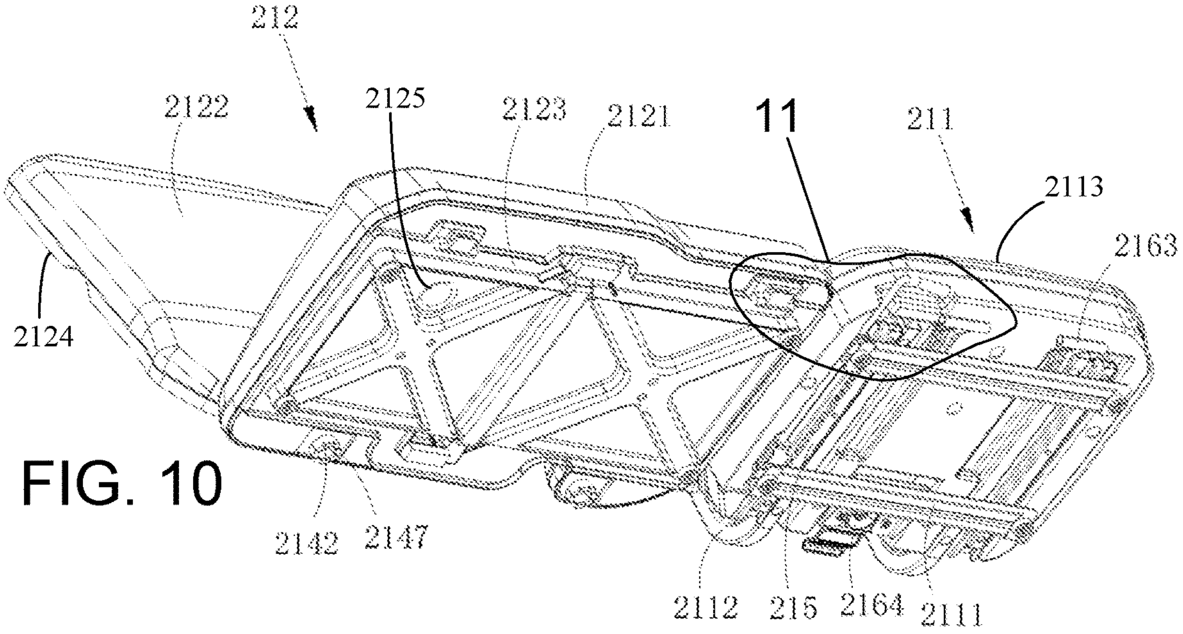
FIG. 10 is a perspective view of a plurality of seats of the side-by-side utility vehicle in FIG. 1, showing the underside of the seats.
Figure 12:
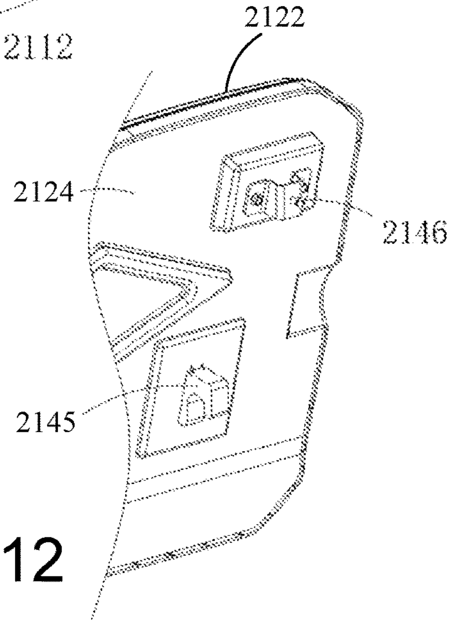
FIG. 12 is a rear left perspective view of a right end portion of a passenger seat back-cushion of FIG. 10.

As shown in FIGS. 10 and 12, the passenger seat 212 preferably includes a passenger seat cushion 2121, a passenger back-cushion 2122, a passenger seat base 2123, and a passenger back-plate 2124. The passenger seat cushion 2121 is arranged on the passenger seat base 2123, and the passenger seat back-cushion 2122 is separately arranged on the passenger seat back plate 2124. Unlike the connection of the driver seat cushion 2113 and the driver back-cushion 2114 provided by the driver seat scaffold 2112, the passenger seat cushion 2121 and its base 2123 are separated from the passenger back-cushion 2122 and its back-plate 2124. The passenger seat base 2123 is detachably connected downwardly onto the seat bracket 41, whereas the passenger seat back plate 2124 is detachably connected rearwardly onto a cabin back plate 213 (shown in FIG. 6). The passenger storage box 232 is arranged under the passenger seat cushion 2121, and the passenger seat cushion 2121 can be removed separately (without moving the passenger back-cushion 2122 and its back-plate 2124) to facilitate the opening and closing of passenger storage box 232.

Figure 11:
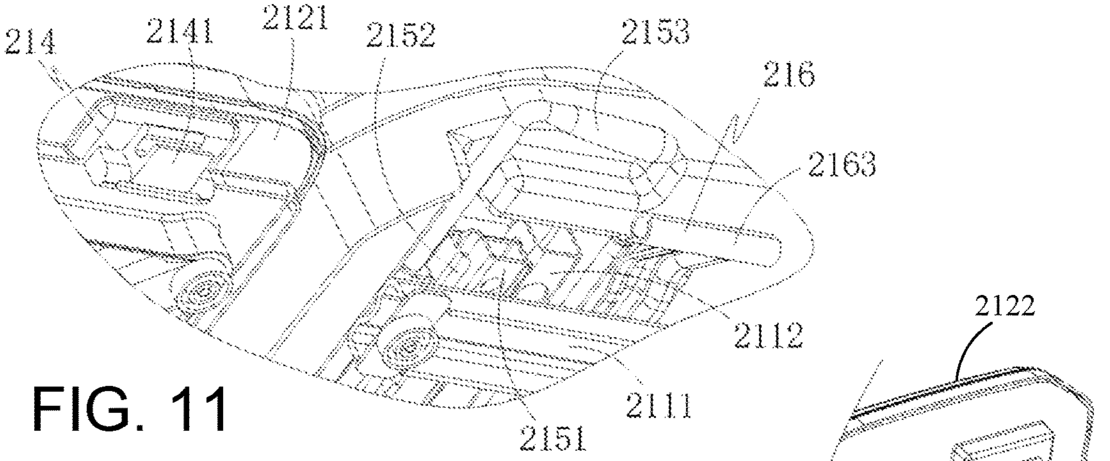
FIG. 11 is an enlargement of a portion 11 of FIG. 10.

In order to facilitate assembly and disassembly of the passenger seat 212 into and out of the vehicle 10, a passenger seat connection structure 214 is arranged between the passenger seat 212 and the frame 400. As shown in FIGS. 10 and 11, the passenger seat connection structure 214 preferably includes at least one and more preferably two passenger seat base stopper(s) 2141 and at least one and more preferably two passenger seat base receptacle(s) 2142 arranged on the passenger seat base 2123. As shown in FIGS. 8 and 9, the passenger seat connection structure 214 preferably also includes a corresponding number of passenger seat fixing pin(s) 2143 and seat stopper(s) 2144 arranged on the seat bracket 41 which mate respectively with the passenger seat base receptacle(s) 2142 and the passenger seat base stopper(s) 2141. At least a portion of the seat stopper(s) 2144 can be inserted into the passenger seat base stopper(s) 2141 allowing a pivoting connection about a laterally-extending axis so the passenger seat baseplate 2123 can be pivoted around the seat stopper(s) 2144 so as to facilitate access and use of the passenger storage box 232. The passenger seat fixing pin 2143 can be detachably inserted into the passenger seat base receptacle 2142, fixing the passenger seat 212 relative to the frame 400. A passenger seat plate bumper 2147, preferably formed of a resilient material such as rubber, is mounted to extend around the passenger seat base receptacle 2142. The passenger seat plate bumper 2147 and passenger seat fixing pin 2143 are connected with an interference fit to prevent the passenger seat fixing pin 2143 from coming out of the passenger seat base receptacle 2142.

The passenger seat connection structure 214 also removably connects the passenger seat back-plate 2124 to the frame 400. As shown in FIG. 12, the passenger seat connection structure 214 includes at least one and more preferably two sets of a seat back hook 2145 and a seat back rod 2146 arranged on the passenger seat back 2124. The seat back hook 2145 and a seat back rod 2146 mate into corresponding structures 2148 (shown in FIG. 6) of the cabin back plate 213, allowing tool-less removal of the passenger seat back-plate 2124 and passenger seat back-cushion 2122 from the vehicle 10.

The side-by-side utility vehicle 10 includes a fuel tank 24, shown in FIG. 5 and schematically shown in FIG. 9. In the preferred embodiment shown where the passenger seat 212 and the driver seat 211 are separated, the fuel tank 24 is located under the passenger seat 212. The center of gravity of the driver seat 211 and the center of gravity of the fuel tank 24 are thus located on opposite sides of the longitudinal mid-plane lm. The driver is away from the fuel tank 24, which improves security.

As best shown in FIG. 9, the preferred passenger storage box 232 is positioned below the passenger seat 212 with the top of the passenger storage box 232 being higher than the top of the fuel tank 24. The bottom of the fuel tank 24 is closer to the ground reference plane gr than the bottom of the passenger storage box 232, which improves space utilization and typically lowers the center of gravity of the vehicle.

As shown in FIG. 9, the preferred passenger storage box 232 includes a first deeper storage area 2321 and a second shallower storage area 2322. The deeper storage area 2321 is closer to the longitudinal mid-plane lm than the fuel tank 24, and the shallower storage area 2322 is located above the fuel tank 24. If desired, the passenger storage box 232 can include structure for fixing a funnel (not shown) beneath the passenger seat 212, and the passenger seat base 2123 may include a recess or opening 2125 capable of accommodating the funnel as shown in FIG. 10, which is convenient for refueling in the field as well as for adding oil or other liquids to the vehicle 10.

As shown in FIG. 9, the driver storage box 231 is arranged under the driver seat 211, and the driver storage box 231 is separate from the passenger storage box 232. The bottom of the driver storage box 231 is closer to the ground reference plane gr than the bottom of the passenger storage box 232, resulting more storage volume, while the front drive shaft 71 (shown in FIGS. 4 and 5), coolant intake and return lines, etc. (not separately shown) may run under the passenger storage box 232.

In order to improve the utilization rate of the storage space 22 under the driver seat, the bottom of the driver storage box 231 is closer to the ground reference plane gr than the lowest point of the transmission assembly 64. The bottom of the driver storage box 231 includes a first, lower bottom area 2311 and a second, slightly higher bottom area 2312. The first, lower bottom area 2311 is closer to the ground reference plane gr than the second, slightly higher bottom area 2312, which may extend over a portion of the frame 400. The second, slightly higher bottom area 2312 is closer to the longitudinal mid-plane lm than the first, lower bottom area 2311.

The vertical surfaces of the driver storage box 231 are preferably provided with vertically extending ribs 2313. If desired, the bottom surfaces of the bottom areas 2311, 2312 may similarly include rib plates (not shown) in a grid shape. The ribs 2323 and rib plates improve the firmness and impact resistance of the storage box 23 while allowing molding of thinner material.

As shown in FIGS. 2 and 3, the intake and exhaust system 800 includes a transmission cooling air filter 65 and a combustion intake air filter 66, both of which are preferably mounted on or adjacent the cabin back plate 213 shown in FIG. 6. The transmission cooling air filter 65 and the combustion intake air filter 66 are located on opposite sides of the longitudinal mid-plane lm.

Figure 13:
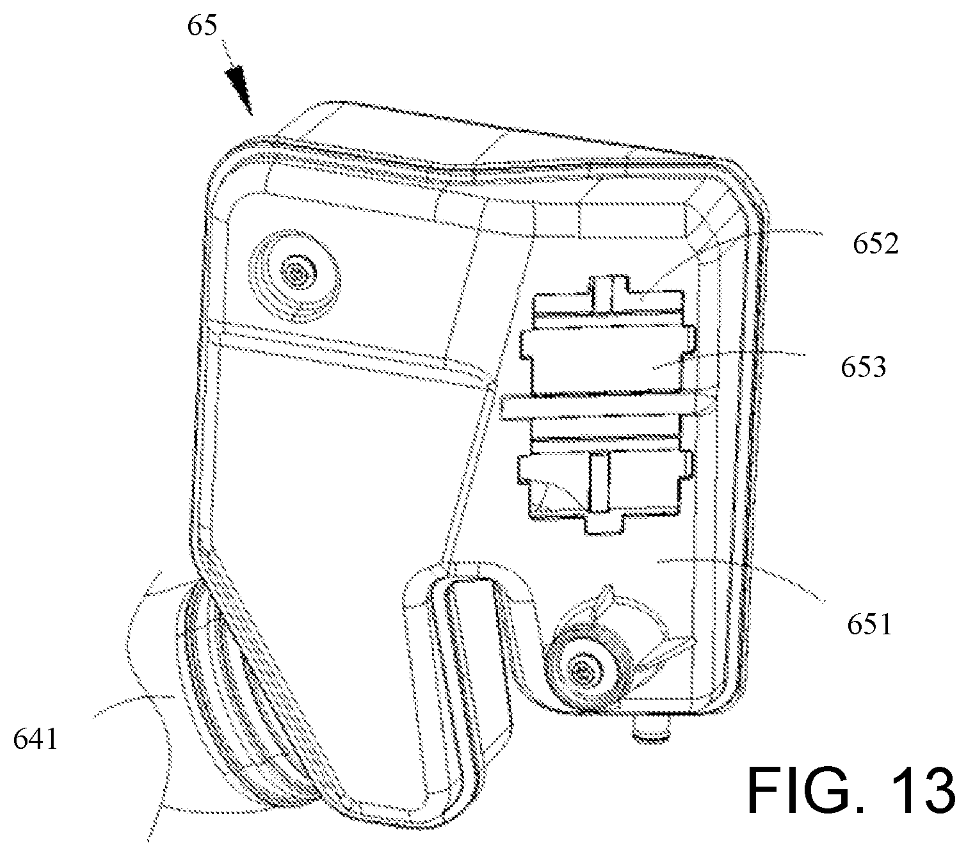
FIG. 13 is a front perspective view of a transmission cooling air filter of the side-by-side utility vehicle in FIG. 2.
Figure 14:
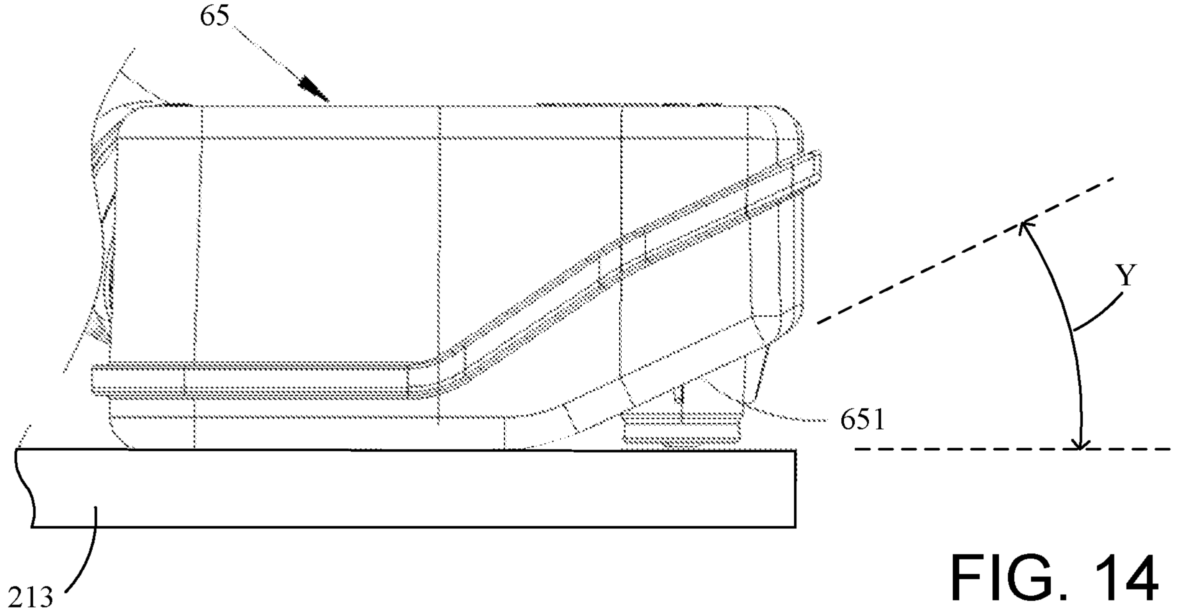
FIG. 14 is a top plan view of the transmission cooling air filter of FIGS. 2, 3 and 13.

FIGS. 13 and 14 further show the transmission cooling air filter 65. The transmission cooling air filter 65 has a cooling intake inlet 652 defined within an angled face 651 of its housing 654. A cooling air filter element 653 is removably supported within the cooling air filter housing 654, and can be seen in FIG. 13 through the cooling intake inlet 652. The angled face 651 of the transmission cooling air filter 65 and the cabin back plate 213 cooperatively define a cooling air inlet wedge angle Y facing toward the outside of the vehicle 10 (called out in FIG. 14). The cooling air inlet wedge angle Y is preferably in the range from 18.2° to 49.6°, more preferably in the range from 20.2° to 43.1°, and most preferably in the range from 22.5° to 37.5°.

Figure 15:
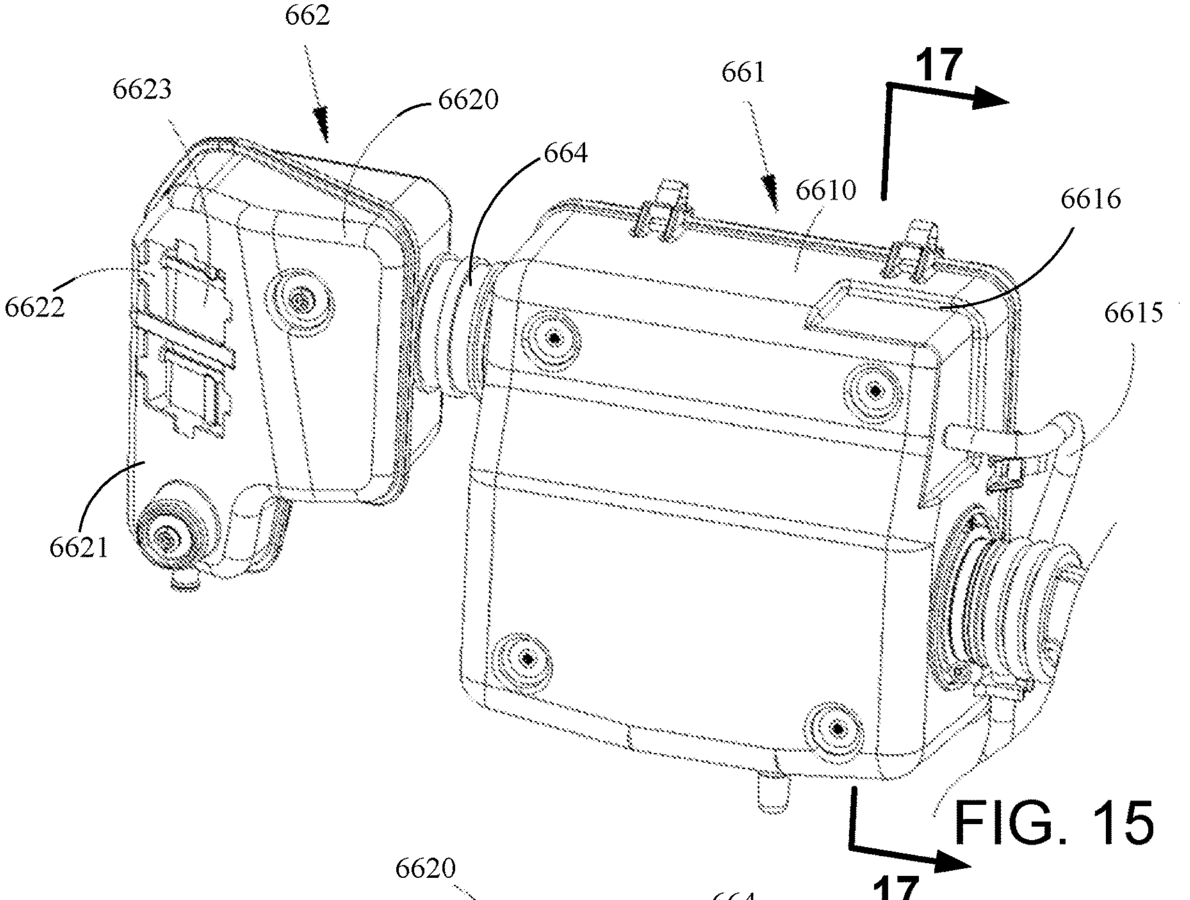
FIG. 15 is a front perspective view of the combustion air filter of the side-by-side utility vehicle in FIG. 2.
Figure 16:
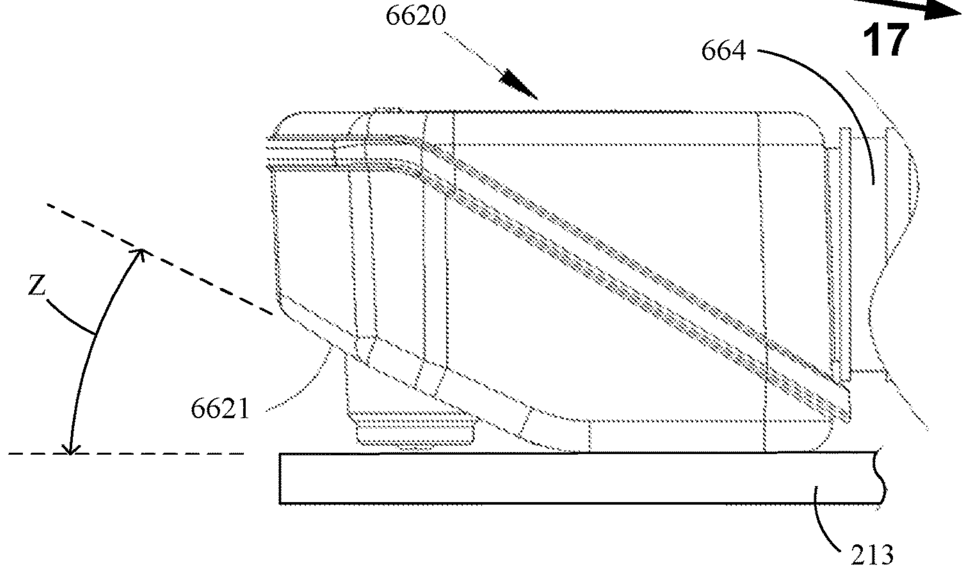
FIG. 16 is a top plan view of an air inlet of the combustion air filter of FIGS. 2, 3 and 15.

FIG. 15 furthers show the combustion air filter 66 which preferably consists of two parts, a main air filter 661 and a preliminary air filter 662. Like the transmission cooling air filter 65, the preliminary air filter 662 has a combustion air intake inlet 6622 defined within an angled face 6621 of its housing 6620. A preliminary air filter element 6623 is removably supported within the preliminary air filter housing 6620, and can be seen in FIG. 15 through the combustion air intake inlet 6622. As shown in FIG. 16, the angled face 6621 of the combustion air filter 66 and the cabin back plate 213 cooperatively define a combustion air inlet wedge angle Z facing toward the outside of the vehicle 10 (called out in FIG. 16). Like the cooling air inlet wedge angle Y, the combustion air inlet wedge angle Z is preferably in the range from 18.2° to 49.6°, more preferably in the range from 20.2° to 43.1°, and most preferably in the range from 22.5° to 37.5°.

Figure 22:
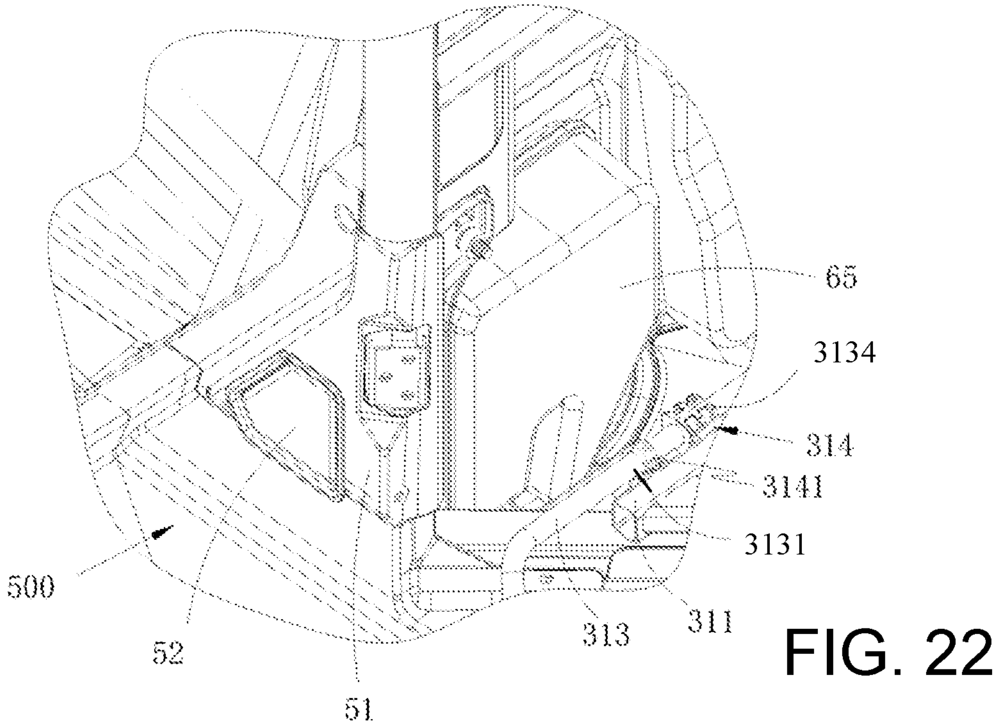
FIG. 22 is a front left perspective view of the transmission cooling air filter of FIGS. 13 and 14 relative to its air inlet and a portion of the frame of the side-by-side utility vehicle in FIG. 1, also showing a portion of the rear trunk release lever.

The vehicle body cover 500 includes two outer side covers 51, which face away from the longitudinal mid-plane lm. As best shown in FIG. 22, a baffle 52 is detachably mounted on each outer side cover 51. When seen from the side, the baffle 52 overlaps the inlet wedge angles Y, Z, such that air entering either the preliminary air filter 662 or the transmission cooling air filter 65 must first pass transversely through the baffle 52 of a side cover 51.

The main air filter 661 has a main air filter housing 6610 which receives air from the preliminary air filter 662 through a pipeline 664. The main air filter housing 6610 is closer to the longitudinal mid-plane lm than the preliminary air filter housing 6620.

Figure 17:
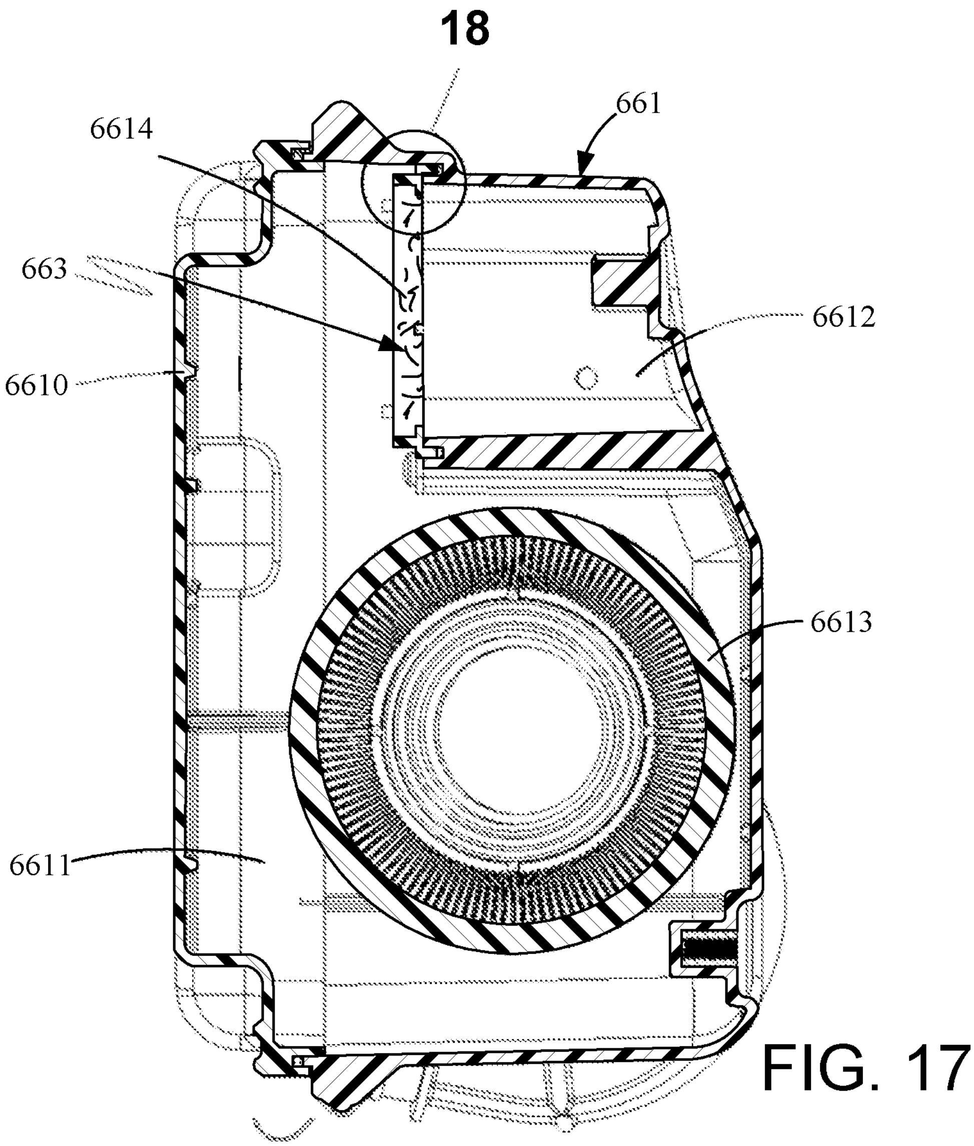
FIG. 17 is a cross-sectional view of the combustion air filter, taken along cut-lines 17-17 in FIG. 15.
Figure 18:
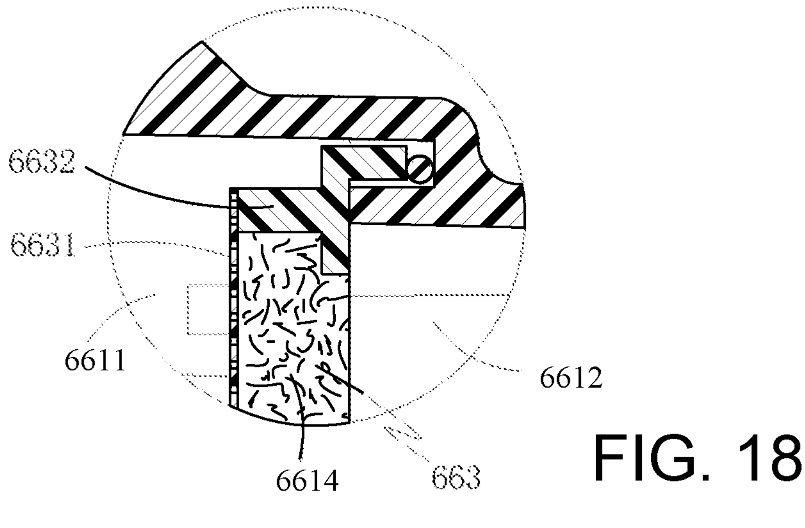
FIG. 18 is an enlarged view of part 18 in FIG. 17.

FIGS. 17 and 18 are cross-sectional views showing the construction of the main air filter 661. The main air filter housing 6610 defines a primary flow filter chamber 6611 and a supplementary flow filter chamber 6612. The primary flow filter chamber 6611 is in fluid communication with the pipeline 664, and the supplementary flow filter chamber 6612 is in fluid communication with the primary flow filter chamber 6611. The primary flow filter chamber 6611 has a larger volume than the supplementary flow filter chamber 6612, with the preferred embodiment generally showing the extent of the supplementary flow filter chamber 6612 via a small ridge 6616 (called out in FIG. 15) in the main air filter housing 6610. The supplementary flow filter chamber 6612 is thus preferably defined in a top corner of the main air filter housing 6610 toward the longitudinal mid-plane lm. A replaceable air filter element 6613 is disposed in the primary flow filter chamber 6611 filtering air entering the combustion air intake manifold 621, whereas supplemental air is added through a supplemental filter element 6614 and a supplemental pipeline 6615. The functioning of the primary and supplemental air flows are further explained in U.S. patent Ser. No. 18/144,532, incorporated by reference.

As shown in FIG. 6, the cabin back plate 213 includes an electronic control unit (ECU) access port, and an ECU access port cover 217 is provided as part of the cabin back plate 213. As disclosed in U.S. patent application Ser. No. 18/113,527, incorporated by reference, an ECU (not separately shown) is disposed behind the ECU access port cover 217, as well as optionally a fuse box. The ECU access port cover 217 and the ECU are preferably located on the opposite side of the longitudinal mid-plane lm as the combustion intake air filter 66, and at least the main air filter 661 is closer to the longitudinal mid-plane lm than the ECU access port cover 217 and the ECU.

Figure 19:
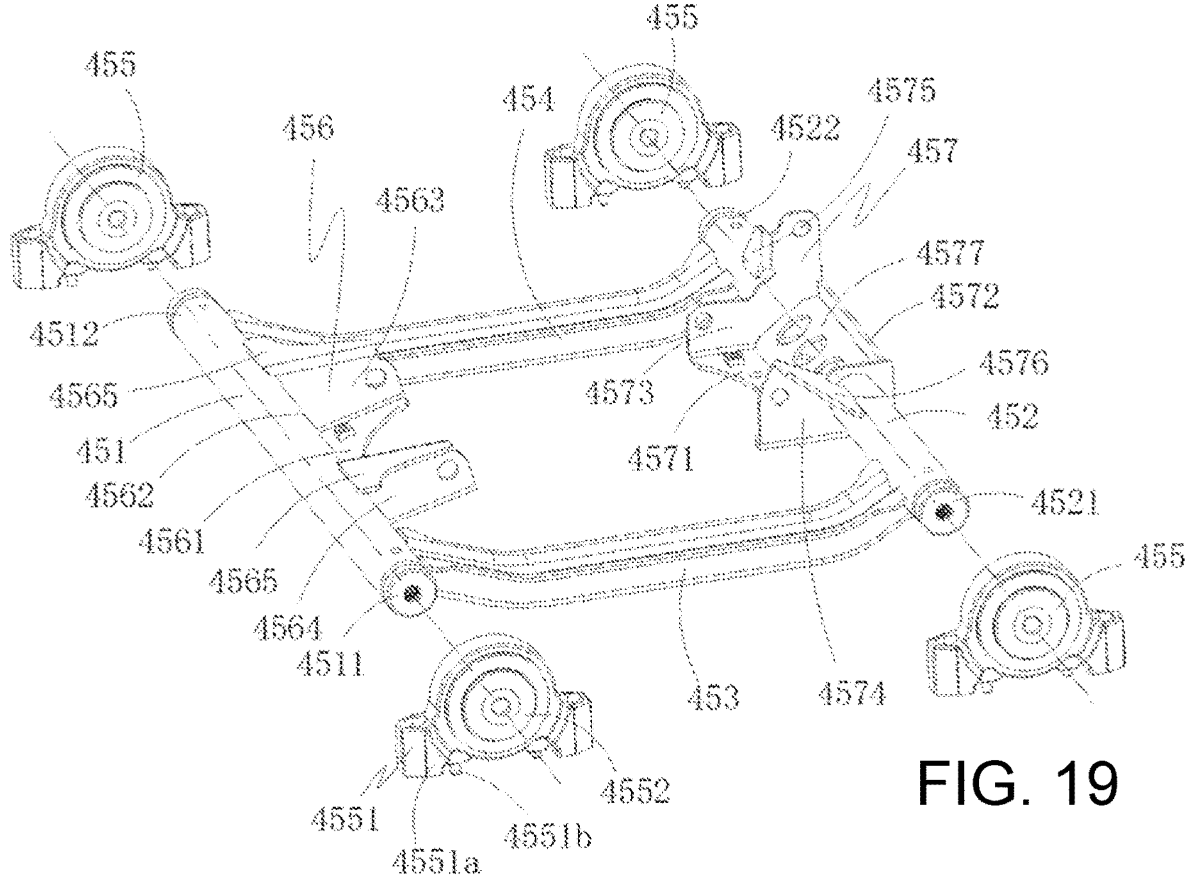
FIG. 19 is a front left exploded perspective view of a prime mover support cradle of FIG. 2.

As best shown in FIG. 19, the preferred support cradle 45 includes a front beam 451 and a rear beam 452 extending along the vehicle width direction, and a driver side connection beam 453 and a passenger side connection beam 454 extending along the vehicle length direction. The front beam 451, the rear beam 452 and the two connection beams 453, 454 jointly form a closed framework. As shown in FIG. 3, a bottom plate 458 may be optionally arranged on the closed framework to help protect the engine 60.

The front beam 451 has outwardly facing ends 4511, 4512 that extend wider than the connection beams 453, 454, and the rear beam 452 similarly has outwardly facing ends 4521, 4522 that extend wider that the connection beams 453, 454. The four outwardly facing ends 4511, 4512, 4521, 4522 are respectively mounted on the lugs 442 (shown in FIG. 7) by a plurality of buffer components 455. Each buffer component 455 includes a plurality of positioning members 4551 fixedly connected to the lugs 442 to fix the support cradle 45 to the engine 60, and a flexible or elastic part 4552 located between the positioning members 4551. Each flexible or elastic part 4552 may be formed of rubber or a similar material. Each positioning member 4551 includes a positioning body **4551*a* and a positioning pin 4551*b*. The flexible or elastic parts 4552 are mounted on the positioning body 4551*a*, and at least a portion of the lower surface of the positioning body 4551*a* extends outward, forming a positioning pin 4551*b*, which facilitates the positioning and installation of positioning member 4551 relative to the lugs 442**.

A front fixing member 456 is arranged in the middle of the front beam 451 and a rear fixing member 457 is arranged in the middle of the rear beam 452. The front fixing member 456 is bolted to the front of the engine 60, and the rear fixing member 457 is bolted to the rear of the engine 60, thereby firmly installing the engine 60 to avoid resonance, to improve shock absorption and to reduce noise.

The front fixing member 456 includes a bottom extension portion 4561 extending generally horizontally from front to rear. A front extension portion 4562 extends vertically upward from the front of the bottom extension portion 4561, and the front extension portion 4562 can be welded or otherwise joined to the front beam 451. Two outer sides of the bottom extension portion 4561 extend upwardly to form a first outer extension portion 4563 and a second outer extension portion 4564. The first outer extension portion 4563 and the second outer extension portion 4564 are respectively fixed to the front beam 451. Each outer extension portion 4563, 4564 extends outward at its top end to form top extension portions 4565, and each top extension portion 4565 is fixed to the front beam 451. The two outer extension portions 4563, 4564 of the front fixing member 456 are provided with bolt through holes through which the bolts (not shown) are screwed into the engine 60. Joining the front fixing member 456 to the front beam 451 at all of the front extension portion 4562, the outer extension portions 4563, 4564 and the top extension portions 4565 improves structural strength.

As further shown in FIG. 19 and similar to the front fixing member 456, the rear fixing member 457 includes a bottom extension portion 4571 extending generally horizontally from rear to front. A rear extension portion 4572 extends vertically upward from the rear of the bottom extension portion 4571, and the rear extension portion 4572 can be welded or otherwise joined to the rear beam 452. Two outer sides of the bottom extension portion 4571 extend upwardly to form a first outer extension portion 4573 and a second outer extension portion 4574 respectively fixed to the rear beam 452. The two outer extension portions 4573, 4574 of the rear fixing member 457 are provided with bolt through holes through which the bolts (not shown) are screwed into the engine 60. The top of the first outer extension portion 4573 has a first folding ear 4575, and the top of the second outer extension portion 4574 has a second folding ear 4576. One of the first folding ear 4575 and the second folding ear 4576 extends upward and then downward, and the other extends diagonally rearward and outward. The first folding ear 4575 and the second folding ear 4576 are fixed on opposite sides of the rear beam 452.

An inclined support plate 4577 of the rear fixing member 457 is arranged between the bottom extension portion 4571 and the rear extension portion 4572. The inclined support plate 4577 contacts and supports the bottom of the engine 60. The bolt through holes in the two outer extension portions 4573, 4574 are at a position in front of the inclined support plate 4577. Both the bottom extension portion 4571 and the inclined support plate 4577 define a plurality of through-holes used for heat dissipation and weight reduction. If desired, the bottom extension portion 4561 and the front extension portion 4562 of the front fixing member 456 may have similar through-holes and/or notches and/or gaps (not shown) for heat dissipation and weight reduction.

As shown in FIG. 3, the cooling air outlet manifold 642 preferably discharges air through a two-part expansion chamber 69, which includes an initial expansion chamber 692 and a final expansion chamber 691. Both the initial expansion chamber 692 and the final expansion chamber 691 have a larger cross-sectional area than the transmission cooling air outlet manifold 642, so the air flow speed is slower. Air flows upwardly through the initial expansion chamber 692 and then downwardly through the final expansion chamber 691 before being expelled rearwardly over the engine 60. In the preferred embodiment shown, the ratio of volume of the final expansion chamber 691 to the initial expansion chamber 692 is about 1:1.5, and flowspeed through the initial expansion chamber 692 is about ⅔ of the flowspeed of air pushed across the engine 60. In other embodiments, the ratio of the volume of the final expansion chamber 691 to the volume of the initial expansion chamber 692 is in the range from 1:6 to 1:10, blowing air more quickly across the engine 60.

The preferred rear trunk 300 of the off-road vehicle 10 is further described with reference to FIGS. 1, 2 and 20-22. The rear trunk 300 includes a rear trunk frame 311 (shown in FIGS. 2 and 21) supporting a rear trunk body 312 (shown in FIGS. 1 and 20). As best seen in FIG. 1, the rear trunk body 312 has side walls 3124 and a tailgate 316 which, together with a front wall 3125 called out in FIG. 20, enclose and open-topped cargo area 31 above a rear trunk floor 3121. The tailgate 316 is pivotably connected to the rear trunk frame 311 by a tailgate pivot shaft 3161 shown in FIG. 21. If desired, the tailgate pivot shaft 3161 may allow the tailgate 316 to be easily removed from the rear trunk frame 311. The rear trunk body 312 is preferably molded of polymer, while the rear trunk frame 311 is formed by welding or otherwise joining steel components. Being molded, various markings may be embossed or indented on the rear trunk body including the tailgate 316, and the preferred embodiment includes a ruler 3162 marked onto the tailgate 316 to easily enable a user to measure lengths of things in the field. Alternatively, decals with such ruler markings or other markings may be included on the vehicle 10.

An under surface of the rear trunk floor 3121 preferably defines a rear trunk frame installation groove (not shown) which mates with and contains the rear trunk frame 311, so the rear trunk frame 311 supports the rear trunk body 312. The under surface of the rear trunk floor 3121 includes a plurality of rib plates (not shown) extending downwardly and staggered to form a network or grid shape, adding strength and stability to the rear trunk body 312. A top surface of the rear trunk floor 3121 includes projections 3122 extending longitudinally, with a groove 3123 defined between every two adjacent projections 3122.

Figure 20:
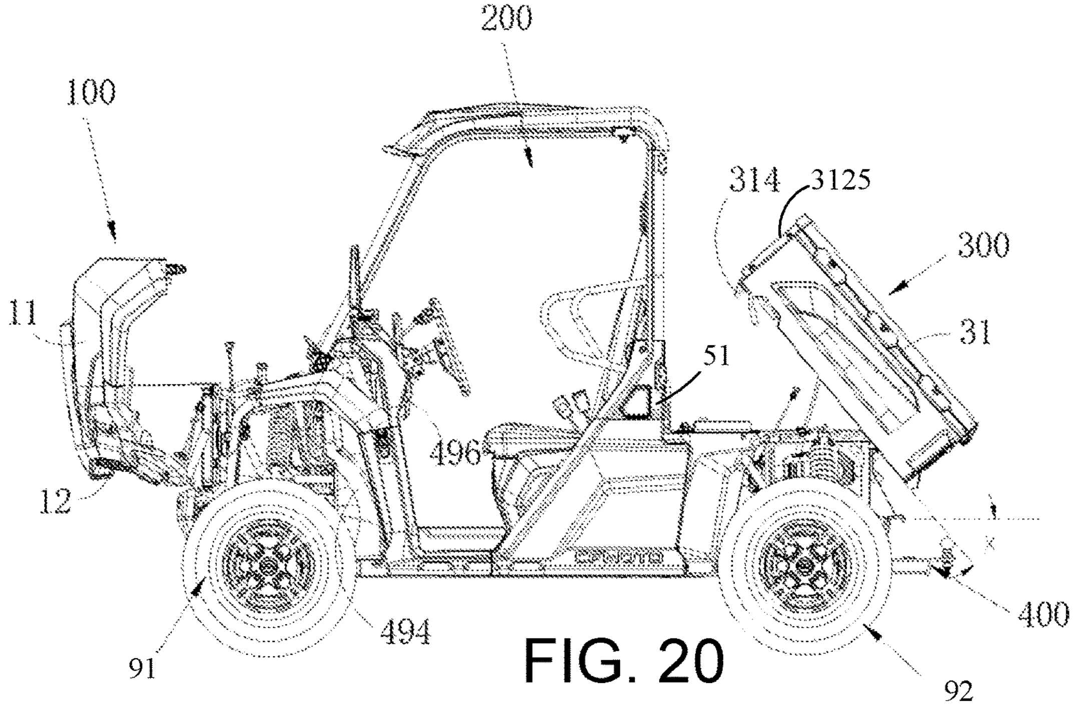
FIG. 20 is a side view of the side-by-side utility vehicle in FIG. 1, with its hood and rear trunk tilted open.

The rear trunk frame 311 is hinged to the frame 400 so the rear trunk 31 is pivotable about a transverse axis, from the cargo-carrying position shown in FIG. 1 in which the rear trunk floor 3121 is substantially parallel to the ground reference plane gr to the dump position shown in FIG. 20. In the fully opened dump position shown in FIG. 20, an angle X between the rear trunk floor 3121 and the ground reference plane gr is in the range from 40° to 60°, more preferably in the range from 45° to 55°, and most preferably in the range of 48° to 53°.

A rear trunk latch mechanism 314 secures a front of the rear trunk 300 to the frame 400 while in the cargo-carrying position. The rear trunk latch mechanism 314 includes a release lever 313 pivotally mounted on the rear trunk frame 311 by two pivot blocks 3134. The release lever 313 is preferably positioned closer to the seat(s) 21 than the cargo area 31 of the rear trunk 300. The rear trunk latch mechanism 314 includes a pair of hooks 3141 welded or otherwise fixed on the release lever 313 which mate into a pair of clasps 3142 (one shown in FIG. 7) arranged on the frame 400.

Figure 21:
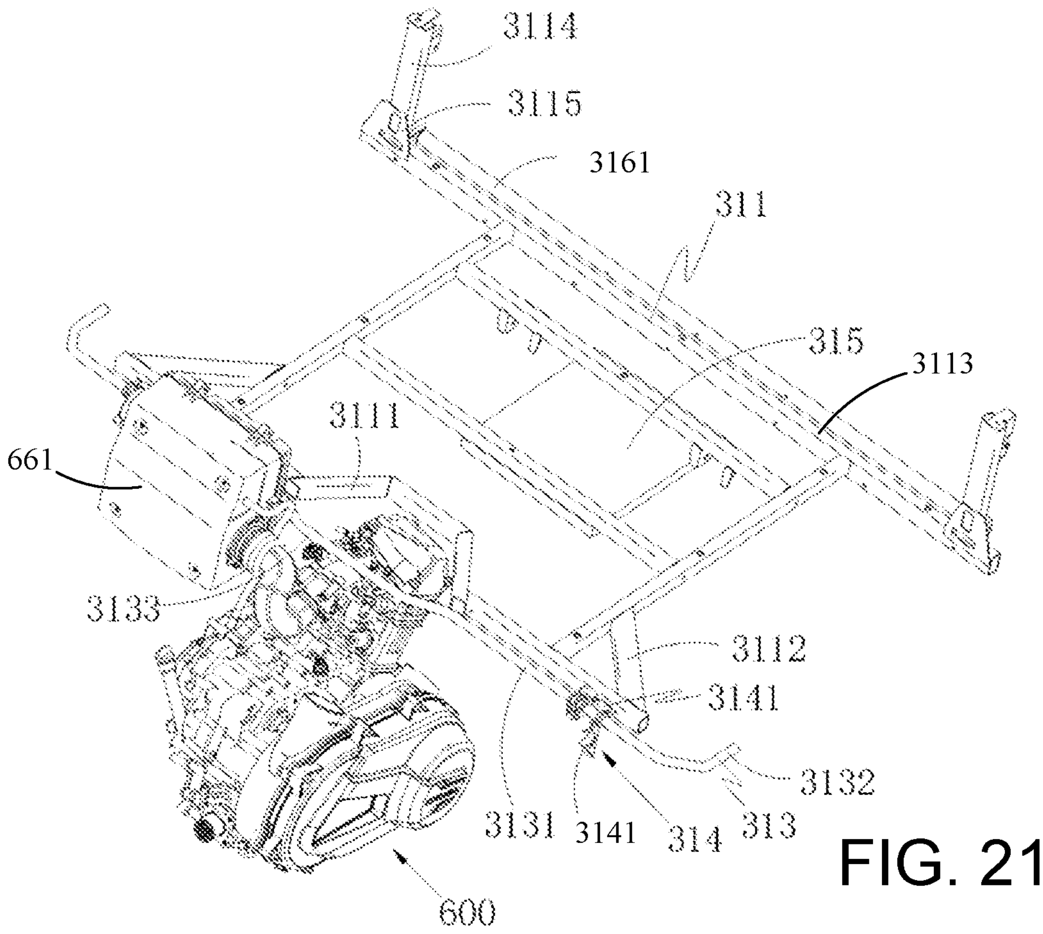
FIG. 21 is a front left perspective view of the rear trunk frame and the prime mover assembly of the side-by-side utility vehicle in FIG. 1.

As best shown in FIG. 21, the rear trunk release lever 313 includes a rod 3131 extending along a vehicle width direction across the longitudinal mid-plane lm and two handle portions 3132 extending from ends of the rod 3131 and angled relative to the rod 3131. The handle portions 3132 are exposed to be conveniently accessible to a person standing beside the vehicle 10 who wants to dump any cargo. The user can use either handle portion 3132 to pivot the release lever 313 about the axis defined by the rod 3131/pivot blocks 3134, moving the hooks 3141 out of engagement with the clasps 3142/frame 400.

In the preferred embodiment, the rod 3131 includes a central curve 3133 so as to avoid interference with the cylinder head 611. The ratio of the transverse length of the central curve 3133 to the length of the rod 3131 is preferably in the range from 1:3.3 to 1:3.6.

As best shown in FIG. 21, the rear trunk frame 311 includes a trunk front beam 3111 and a trunk rear beam 3113, both extending transversely and joined by a trunk platform section 3112 that may have various longitudinal beams, crossbeams, and angled beams. Two connection arms 3114 are welded to the ends of the rear trunk rear beam 3113 and extend vertically therefrom, with a rear beam rib plate 3115 connected between each connection arm 3114 and the rear trunk rear beam 3113 to strengthen the connection. In the preferred embodiment, the front beam 3111 includes a shape, like the central curve 3133 of the release lever rod 3131, which avoids interference with the cylinder head 611. Specifically, the front beam 3111 extends laterally from the outside of the vehicle body towards the longitudinal mid-plane lm, then extends inwardly and rearwardly at a location closer to the longitudinal mid-plane lm but not yet reaching the longitudinal mid-plane lm, and then extends laterally over the longitudinal mid-plane lm, then extends outwardly and forwardly, and then extends laterally towards the outside of the vehicle body on the other side. If desired, the front side of the front beam 3111 may be provided with a front rib plate (not shown), and the rear side of the front beam 3111 may be provided with a rear rib plate (not shown), with the bottom of the rear rib plate extending lower than the bottom of the front rib plate. Such rib plates can be used to both strengthen welds in the front beam 3111 and to achieve better seating of the front beam 3111 against the frame 400 when the rear trunk 300 is in its normal secured position.

As shown in FIG. 21, a metal plate 315 is preferably arranged at a central location on an under surface of the rear trunk frame 311. The metal plate 315 extends over the muffler 68 connected to the combustion exhaust manifold 622 as shown and further described below with reference to FIG. 37-39. The metal plate 315 helps to protect the rear trunk body 312 in large part by spreading heat from the engine exhaust.

As shown in FIG. 1, a plurality of dividing chutes 3124 are preferably defined on an inner wall of the rear trunk body 312 and on the inside vertical surface of the tailgate 316. The dividing chutes 3124 can be used to optionally hold vertical divider plates (not shown) which users can insert into the rear trunk 300 to divide the cargo area 31 into separate compartments.

Figure 23:
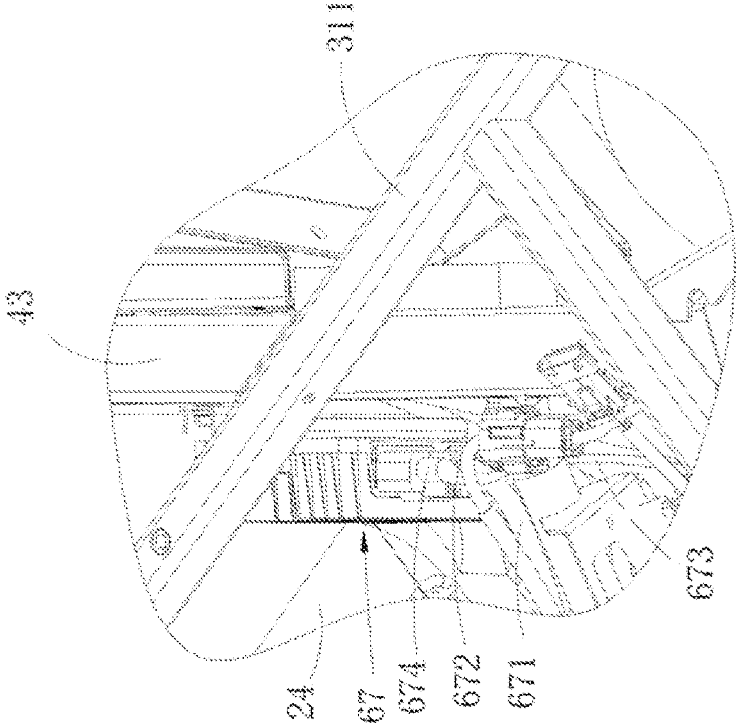
FIG. 23 is a rear left perspective view of a carbon canister of the side-by-side utility vehicle in FIG. 2.

As shown in FIGS. 2 and 23, the side-by-side utility vehicle 10 preferably includes a carbon canister 67, the function of which is more fully explained in U.S. patent application Ser. No. 18/144,532, incorporated by reference. The carbon canister 67 is preferably located behind the seat(s) 21. The frame 400 includes a pair of rear frame members 43 (shown in FIGS. 7 and 23) extending horizontally diagonally inwardly and rearwardly. The diagonal orientation of the rear frame members 43 reserves space for the installation of the rear wheels, which in turn makes the vehicle width smaller and the space utilization higher. The carbon canister 67 is preferably mounted on the passenger side rear frame member 43.

The carbon canister 67 is connected to the fuel tank 24 by a fuel evaporation pipeline 671 at a first joint 672 which preferably extends upward. The fuel evaporation pipe 671 extends downwards from the carbon canister 67, then forward, and then backward to connect to the fuel tank 24. The engine 60 is connected to the carbon canister 67 through a fuel recovery pipe 673, and the carbon canister 67 has a second joint 674 extending upward connected to the fuel recovery pipe 673. The fuel recovery pipe 673 extends downwards from the carbon canister 67, then forward, and then backward to connect to the engine 60. This pipeline mounting arrangement prevents engine vibration from affecting the connection reliability between the engine 60 and the carbon canister 67. The fuel recovery pipe 673 may be positioned and secured within the vehicle 10 as needed, such as with a fuel evaporation pipe stopper (not shown) arranged on the seat support cross beam 411 or the cabin back plate 213.

Figure 24:
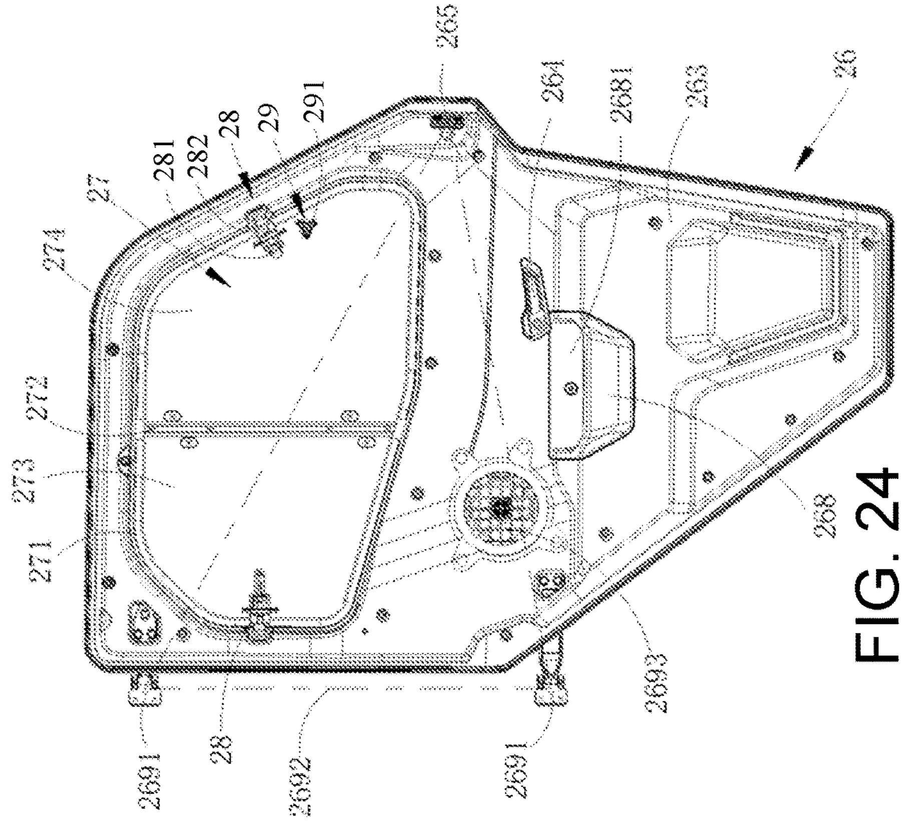
FIG. 24 is a side view of the interior side of an optional driver side vehicle door for use with the side-by-side utility vehicle in FIG. 1.
Figure 25:
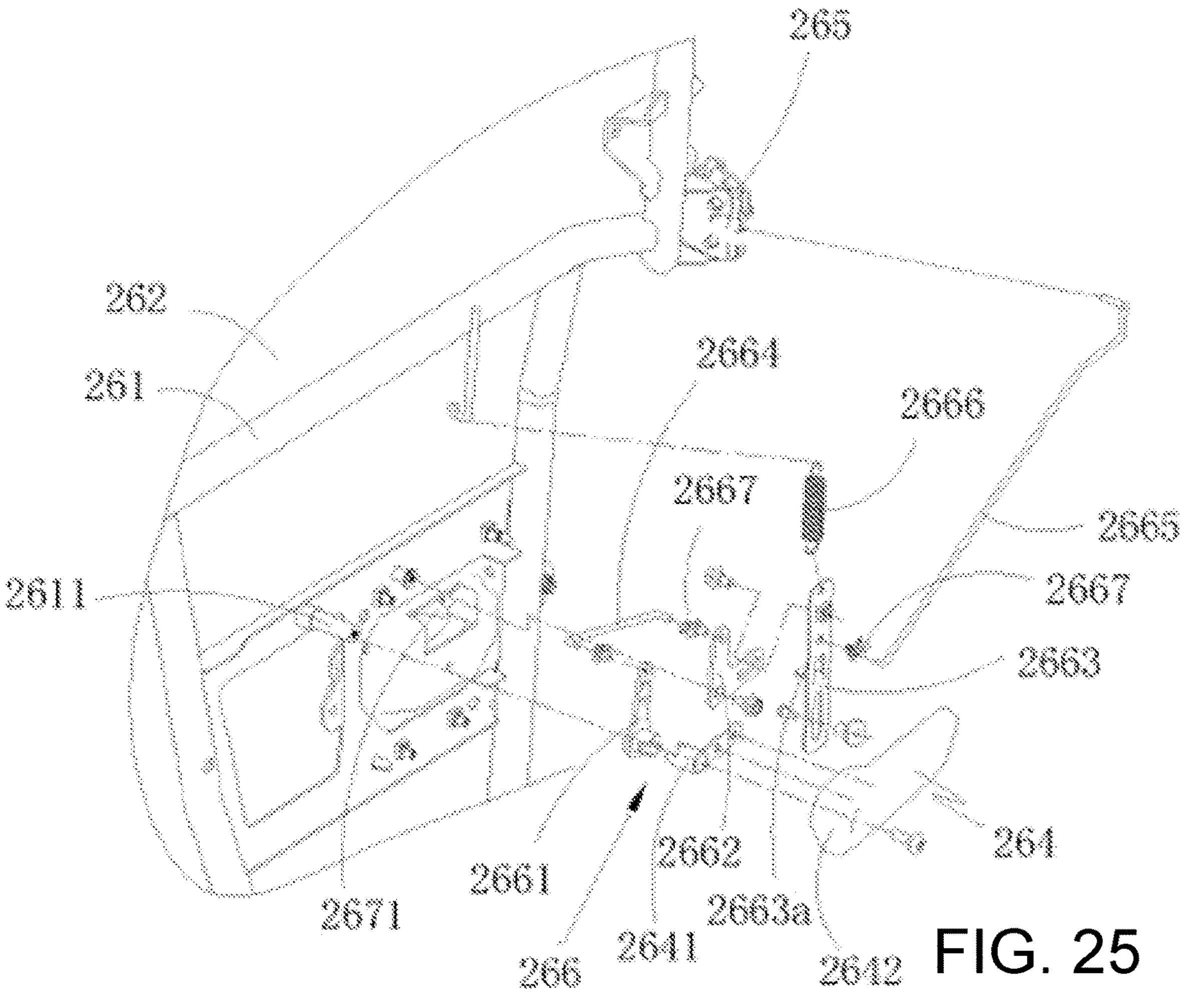
FIG. 25 is an exploded perspective view of a latch linkage mechanism used in the door of FIG. 24.
Figure 27:
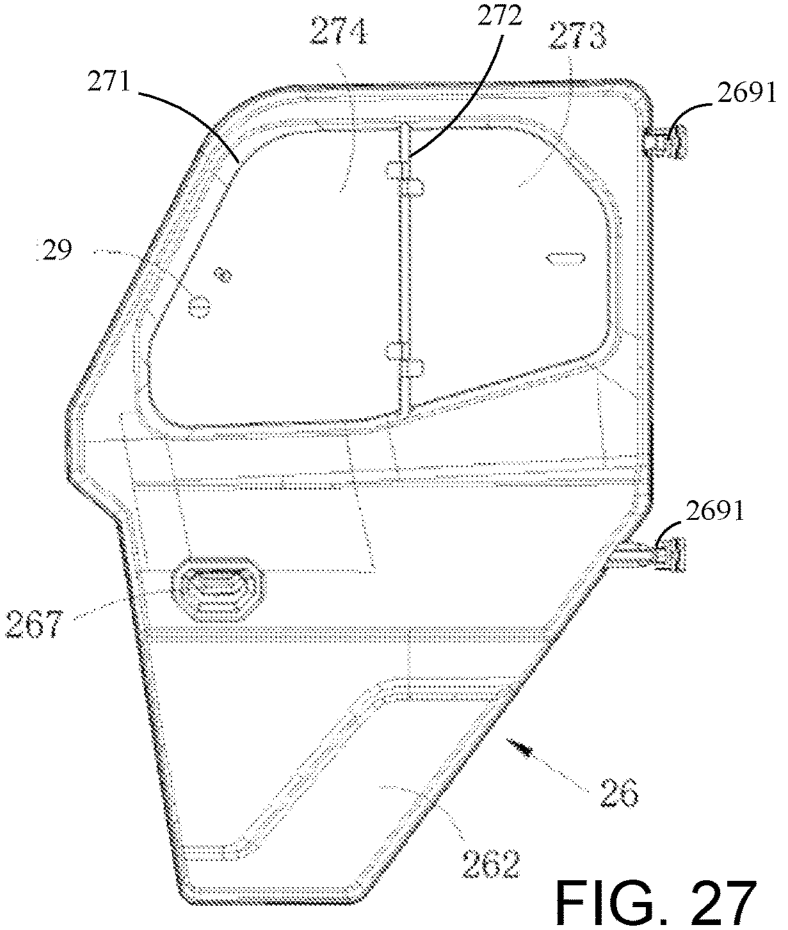
FIG. 27 is side view of the exterior side of the optional driver side vehicle door of FIG. 24.

The vehicle 10 shown in FIG. 1 may optionally be outfitted with vehicle doors, and side views of a driver side vehicle door 26 are shown in FIGS. 24 and 27. FIG. 25 shows a perspective view of the frame structure for the door 26. The passenger side door (not shown) is a mirror image of the driver side door 26. Each vehicle door 26 includes a door frame 261 (FIG. 25) sandwiched between an inner door cover 263 (FIG. 24) and an outer door cover 262 (FIG. 27). The ratio of the thickness of the vehicle door 26, including the frame 261 and both covers 262, 263, to the width of the vehicle 10 is in the range from 0.03 to 0.068. When the ratio is less than 0.03, the strength of the vehicle door 26 is too low, making the door 26 easy to deform or damage. When the ratio is greater than 0.068, the cockpit space is reduced, which affects the operation of the driver, and there are potential safety hazards.

The vehicle door 26 includes a plurality of connection portions, which in the preferred embodiment are two hinges 2691 and a door latch 265. One end of each hinge 2691 is connected to the door frame 261, and the other end is connected to the vehicle frame 400. In the preferred embodiment shown, the door latch 265 is on a forward end of the door 26, while the hinges 2691 are on a rearward end of the door 26. An installation area 2692 is defined between the connection portions 265, 2691. An external device 2693 is arranged on the door frame 261 within the installation area 1692. The external device 2693 may have significant mass which is accelerated and decelerated while the door 26 is being opened and shut. When the external device 2693 is placed within the installation area 2692, the sum of the moment arms from the external device 2693 to each connection portion 2691, 265 is smaller than if the external device 2693 were placed outside the installation area 2692. In this embodiment, the external device 2693 is a speaker for a sound system of the vehicle 10.

The inner door cover 263 preferably includes a storage pouch 268 with a handgrasp section 2681 projecting into the cabin 200. The handgrasp section 2681 can be used by the driver to pull the door 26 shut from inside the cabin 200.

The vehicle door 26 includes an interior handle 264 and a latch linkage mechanism 266 connected to the door latch 265. When the interior handle 264 is in a first, opened position, the door latch 265 is in an open state through the latch linkage mechanism 266. When the interior handle 264 is in a second, closed position, the door latch 265 may be in a latched state through the latch linkage mechanism 266.

The interior handle 264 pivots about a horizontal axis, and the movement of the interior handle 264 from the closed position to the opened position is located in a plane which is substantially parallel to a middle plane of the vehicle door 26 along the vehicle width direction, improving driver operating space and driving comfort.

The construction and operation of the preferred latch linkage mechanism 266 is best understood with reference to FIG. 25. In the preferred embodiment shown, the door frame 261 includes a bracket pin 2611, and the interior handle 264 includes a handle lever 2641 pivotably connected to the bracket pin 2611. The handpiece 2642 of the handle 264 is fixed to the handle lever 2641 such as by a screw, causing the handle lever 2641 to turn about the axis of the bracket pin 2611 whenever the handpiece 2642 is pivoted downwardly about the axis of the bracket pin 2611 by the driver to open the door 26.

As shown in FIG. 25, the preferred latch linkage mechanism 266 includes a pivot link 2661. The connection between the pivot link 2661 and the handle lever 2641 is such that pivoting of the handle lever 2641 clockwise from the closed position shown in FIG. 25 will cause the pivot link 2661 to pivot clockwise. A distal end of the pivot link 2661 is connected to a rearward end of a push rod 2664, a forward end of the push rod 2664 is secured to one leg of an angle link 2662, and a second leg of the angle link 2662 is connected to a vertically sliding link 2663. A pull rod 2665 connects the vertically sliding link 2663 to the latch 265. When the pivot link 2661 is pivoted clockwise from the position shown in FIG. 25, it pushes the pushrod 2664 forwardly, causing the angle link 2662 to pivot and pull both the vertically sliding link 2663 and the pull rod 2665 downwardly, opening the latch 165. When the handpiece 2642 is released, a return tension spring 2666 with one end connected to the vertically sliding link 2663 and the other end connected to the door frame 261 pulls the vertically sliding link 2663 and the pull rod 2665 upwardly. All of this movement occurs in planes substantially parallel to a middle plane of the vehicle door 26.

Meanwhile, an exterior handle 267 is pivotably connected to an outer side of the vehicle door 26. When someone outside the vehicle 10 pulls on the exterior handle 267, it causes a connection lug 2663*a* of the vertically sliding link 2663 to move the vertically sliding link 2663 downward, which in turn drives the pull rod 2665 downwardly and switches the door latch 265 from the latched state to the open state. However, the connection between the pivot link 2661 and the handle lever 2641 is such that the pivot link 2661 can pivot clockwise without causing pivoting of the handle lever 2641 and the handpiece 2642.

Figure 26:
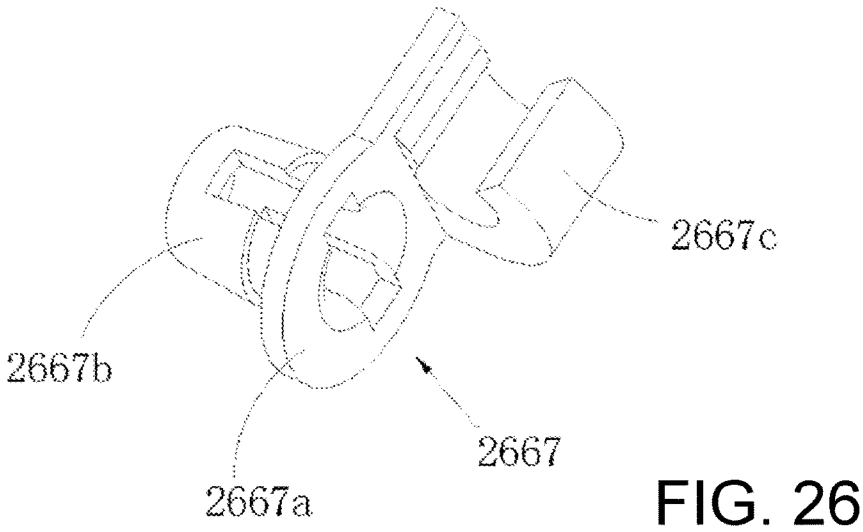
FIG. 26 is an enlarged perspective view of either of the rod sleeves of FIG. 25.

In the preferred embodiment as shown in FIGS. 25 and 26, the push rod 2664 and the pull rod 2665 are both provided with a rod sleeve 2667 used to connect the rod 2664, 2665 to the respective link 2662, 2663. Each rod sleeve 2667 includes a sleeve seat 2667*a*, a sleeve body 2667*b* arranged on the rod sleeve seat 2667*a*, and a rod sleeve hook 2667*c* arranged on the rod sleeve seat 2667*a*. The rod sleeves 2667 help ensure smooth, durable and long lasting operation of the rods 2664, 2665, while also facilitating quick assembly and installation.

Figure 29:
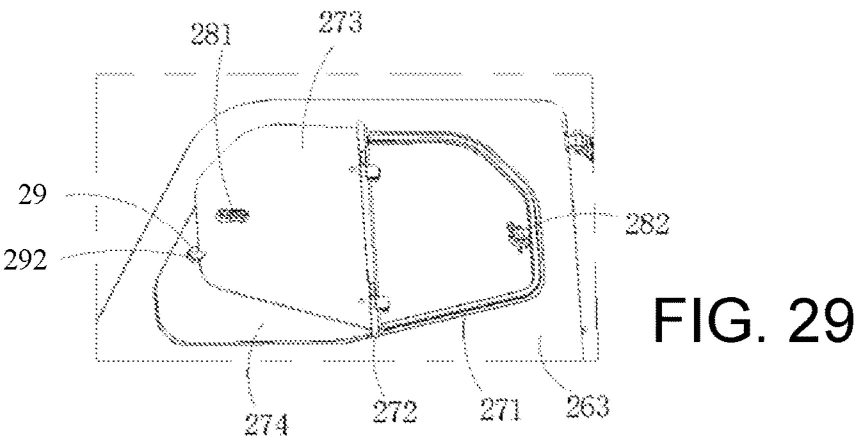
FIG. 29 is an exterior side view of a portion of the driver side door of FIGS. 24 and 27 with the rear pane flipped forward and held in a fully opened position.

As best shown in FIGS. 24, 27 and 29, the vehicle door 26 preferably includes a door window 27 including a casement frame 271, a window hinge 272 arranged on the casement frame 271, and a rear pane 273 and a front pane 274 connected to the window hinge 272. The rear and front panes 273, 274 are both formed of a transparent or translucent rigid material, such as shatter-resistant tempered glass or polycarbonate.

Figure 28:
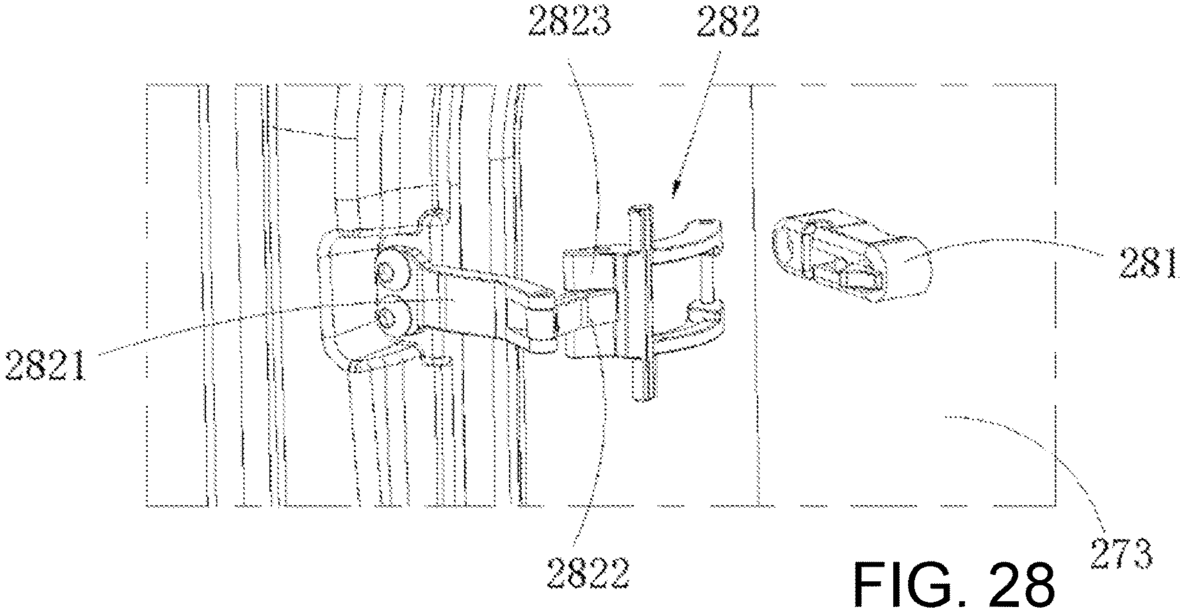
FIG. 28 is a side perspective view of a limit mechanism used in the door window of FIGS. 24 and 27.

Each of the rear and front panes 273, 274 are connected to the casement frame 271 using a limit mechanism 28, with a preferred limit mechanism 28 best shown in FIG. 28. The limit mechanism allows each pane 273, 274 to pivot outwardly from the cabin 200 a limited amount. Specifically, the limit mechanism 28 includes a pane fixing member 281 and a casement body connection member 282 both secured to the respective pane 273 or 274. The casement body connection member 282 includes a fixation plate 2821 secured on the casement frame 271, a rod 2822 pivotably connected to the fixation plate 2821 and a rack 2823 pivotably connected to both the rod 2822 and the pane 273, 274. The rack 2823 is detachably connectable to the pane fixing member 281, holding the pane 273, 274 fully closed. After detaching the rack 2823 from the pane fixing member 281 and into the position shown in FIG. 28, each pane 273, 274 is capable of pivoting about the axis established by the window hinge 272 by an allowed pivot angle under the limit of the limit mechanism 28 while the rod 2822 is still attached to the rack 2823. The allowed pivot angle is in the range from 3° to 30°, preferably in the range from 5° to 25°, and more preferably in the range from 5° to 7°. When the allowed pivot angle is less than these value ranges, the ventilation effect is poor. When the allowed pivot angle is greater than these value ranges, the wind resistance is not only large, but it is also easy for the pane 273, 274 to scratch or collide with obstacles beside the narrow road.

Through the described limit mechanisms 28, the window 27 can be vented without a need to reserve storage space in the vehicle door 26, so that the thickness of the vehicle door 26 can be reduced, thereby improving the space of the cockpit 200.

The preferred limit mechanisms 28 also allow full detachment as shown in FIG. 29, by separating the rod 2822 from the rack 2823. After the rod 2822 is separated from the rack 2823, the associated pane 273 can fully pivot to a position abutting the other pane 274. For instance, FIG. 29 shows the rear pane 273 fully pivoted forward against the front pane 274. An attachment mechanism 29 is positioned on whichever of the panes 273, 274 is longer, in the preferred embodiment on the front pane 274. Alternatively, the attachment mechanism could be positioned on the outer door cover 262 just beyond the edge of the shorter of the panes 273, 274. The preferred attachment mechanism 29 has an attachment tab 292 which can be used to hold the two panes 273, 274 against each other. For instance, the attachment tab 292 may be on the outer side of the front pane 274. In the preferred embodiment, the attachment tab 292 can be rotated using a knob 291 which extends through the forward pane 274. The driver may use the knob 291 to rotate the attachment tab 292 between a holding position where the attachment tab 292 extends rearwardly beyond the edge of the rear pane 273 and a release position where the attachment tab 292 extends forwardly in front of the edge of the rear pane 273.

As shown in FIGS. 1, 2 and 7, the preferred side-by-side utility vehicle 10 further includes a roll-over protection system (ROPS) frame 46 and a roof 47 mounted on the ROPS frame 46, wherein the roof 47 covers the cockpit 200. The ROPS frame 46 includes two longitudinally extending ROPS pillar tubes 461 as called out on FIG. 7. Each ROPS pillar tube 461 extends from the front end 100 of the vehicle 10 upwardly, then bends to form a first elbow section 4611 and extends rearwardly parallel or nearly parallel to the ground reference plane gr, and then bends to form a second elbow section 4612 and extends downwardly. The preferred ROPS pillar tubes 461 are symmetrically arranged with respect to the longitudinal mid-plane lm. A front ROPS crossbar 462 and a rear ROPS crossbar 463 extend between the ROPS pillar tubes 461. Ends of the front ROPS crossbar 462 are respectively connected to the two front elbow sections 4611, and ends of the rear ROPS crossbar 463 are respectively connected to the two rear elbow sections 4612.

A shoulder protection tube 464 is mounted on each ROPS pillar tube 461. The upper end of the shoulder protection tube 464 firstly extends forwardly, then bends downwardly, and then extends rearwardly to connect to the ROPS pillar tube 461 at its lower end. In the preferred embodiment shown, the frame 46 includes a pair of shoulder protection tubes 464 symmetrically arranged with respect to the longitudinal mid-plane lm, one protecting the left shoulder of the driver and one protecting the right shoulder of the passenger.

The preferred ROPS frame 46 further a horizontal back tube 465 and two transversely sloped back tubes 466. Ends of the horizontal back tube 465 are respectively connected to the two ROPS pillar tubes 461. One end of each sloped back tube 466 is connected to one of the ROPS pillar tubes 461, and the other end is connected to the horizontal back tube 465 near its midpoint. A back plate mounting bracket 467 for mounting the cabin back plate 213 is arranged on the horizontal back tube 465 and extends downwardly therefrom. In the preferred embodiment shown, the sloped back tubes 466 are symmetrically arranged with respect to the longitudinal mid-plane lm.

As called out in FIG. 7, in the preferred embodiment shown, a transition mounting frame 470 is arranged between the roof 47 and the ROPS frame 46. The transition mounting frame 470 is connected to the front ROPS crossbar 462. If desired, the transition mounting frame 470 could define a standby mounting slot (not shown) for mounting switches (not shown) for various electrical equipment of the side-by-side utility vehicle 10.

The roof 47 is connected to the transition mounting frame 470. The roof 47 preferably defines a pair of mounting recesses (not shown) extending longitudinally along both sides, and the front elbow section 4611 and the rear elbow section 4612 are capable of mating into the mounting recesses. The width of roof 47 is largely equal to the width of cockpit 200.

Figure 30:
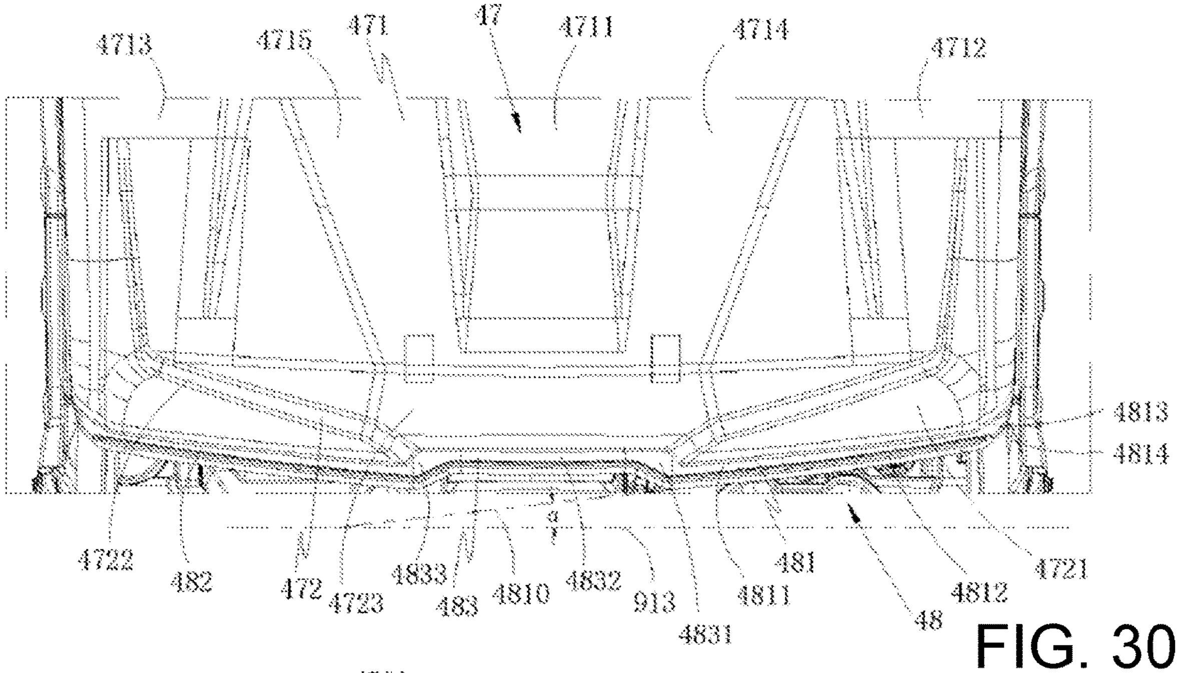
FIG. 30 is a top view of a portion of the roof of the side-by-side utility vehicle in FIG. 1.
Figure 31:
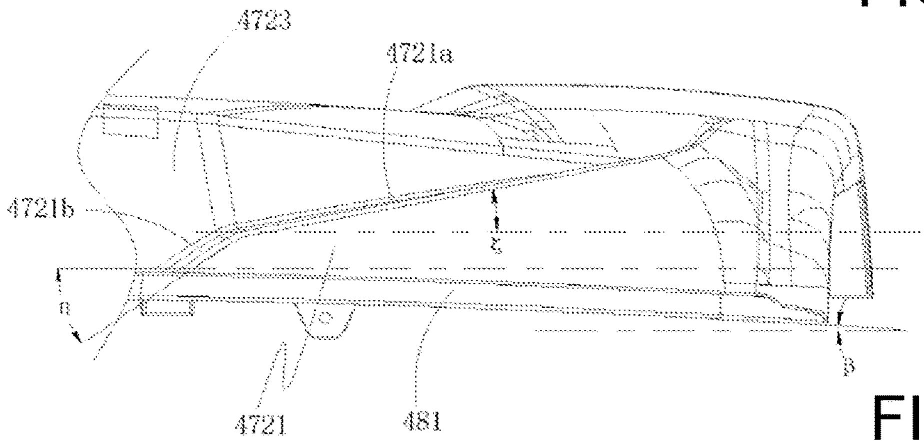
FIG. 31 is a front view of the partial structure of the roof of the side-by-side utility vehicle in FIG. 1.

FIGS. 30 and 31 better show certain features of the preferred roof 47. The roof 47 defines a rainwater diversion trench 48 at the front of the roof 47. The position where the rainwater diversion trench 48 coincides with the longitudinal mid-plane lm is the highest section of the rainwater diversion trench 48. In other words, the rainwater diversion trench 48 extends downwardly and outwardly from the longitudinal mid-plane lm.

As shown in FIG. 30, in the preferred embodiment shown, the rainwater diversion trench 48 includes at least a driver side water diversion portion 481 and a passenger side water diversion portion 482. The driver side water diversion portion 481 and the passenger side water diversion portion 482 are symmetrically arranged with respect to the longitudinal mid-plane lm. In the preferred embodiment, a central water diversion portion 483 bridges the longitudinal mid-plane lm and connects the driver side water diversion portion 481 and the passenger side water diversion portion 482, though other embodiments omit the central water diversion portion 483 and instead have the driver side water diversion portion 481 directly connect to the passenger side water diversion portion 482.

The outer ends of the driver side water diversion portion 481 and the passenger side water diversion portion 482 are preferably rearward of the inner ends, with a projection of the portions 481, 482 on the ground reference plane gr defining a trench angle $\alpha$ relative to the transverse direction. The trench angle $\alpha$ is less than 10.7°, preferably in the range from 6.5° to 9.3°, and most preferably in the range from 7.2° to 8.1°. When the trench angle $\alpha$ is smaller than these value ranges, rain or snow water is not easily discharged from both sides of the rainwater diversion trench 48. When the trench angle $\alpha$ is larger than these value ranges, rain or snow water can easily to splash out from the rainwater diversion trench 48. The outer ends of the driver side water diversion portion 481 and the passenger side water diversion portion 482 are lower than the inner ends, such that the portions 481, 482 define a trench slope $\beta$ relative to horizontal in front view as called out in FIG. 31. The trench slope $\beta$ is in the range from 3.2° to 6.1°, preferably in the range from 3.5° to 5.3°, and most preferably in the range from 3.7° to 4.6°. When the trench slope $\beta$ is smaller than these value ranges, rain or snow water is not easily gravitationally discharged from both sides of the rainwater diversion trench 48. When the trench slope $\beta$ is larger than these value ranges, rain or snow water can easily splash out from the rainwater diversion trench 48.

The driver side water diversion portion 481 at least includes a trench bottom 4811 with a trench edge 4812 connected to the trench bottom 4811, curved so the trench edge 4812 helps funnel water outwardly rather than forwardly out of the driver side water diversion portion.

As shown in FIG. 30, in the preferred embodiment shown, the driver side water diversion portion 481 further includes a second trench bottom 4813 connected to the first trench bottom 4811 and a second trench edge 4814 connected to the first trench edge 4812. One end of the second trench bottom 4813 connected to the first trench bottom 4811 is away from the ground reference plane gr relative to the other end. The second trench edge 4814 is arc-shaped. One end of the second trench edge 4814 connected to the first trench edge 4812 is closer to the front wheels 91 than the other end.

The rainwater diversion trench 48 further includes a central water diversion portion 483 between the driver side water diversion portion 481 and the passenger side water diversion portion 482. The central water diversion portion 483 includes a thin middle trench section 4832 which is slightly arched to direct rainwater flow away from the center line of the vehicle 10. At outer ends of the thin middle trench section 4832, the central water diversion portion 483 includes wider forwardly and outwardly sloped trench sections 4831, 4833 to direct rainwater flowing outwardly in the thin middle trench section 4832 into both the driver side water diversion portion 481 and the passenger side water diversion portion 482.

In the preferred embodiment shown, behind the rainwater diversion trench 481, the roof 47 includes an upwardly and rearwardly sloped drainage portion 472, and then a largely horizontal sheet portion 471. The sloped drainage portion 472 includes a driver side drainage convex 4721 and a passenger side drainage convex 4722 and a central drainage slope 4723 defined between the two drainage convexes 4721, 4722. As shown in FIG. 31, the top edge of each drainage convex 4721, 4722 is defined by an outer ramp 4721$a$ and an inner ramp 4721$b$, both sloping downwardly and inwardly. An outer ramp angle $\zeta$ relative to horizontal in front view as called out in FIG. 31 is in the range from 16° to 20°, and an inner ramp angle η relative to horizontal in front view as called out in FIG. 31 is in the range from 16° to 90°. The inner ramps 4721*b* empty into the wider forwardly and outwardly sloped trench sections 4831, 4833, which turn the inward flow and further direct water into the driver side water diversion portion 481 and the passenger side water diversion portion 482. The larger width of the sloped trench sections 4831, 4833 helps in reversing and dispersing the flow out of the inner ramps 4721*b*.

As shown in FIG. 30, in the preferred embodiment shown, the sheet portion 471 includes sections that extend largely longitudinally, including a central sheet convex 4711, a driver side sheet convex 4712, a passenger side sheet convex 4713, a driver side sheet trough 4714 and a passenger side sheet trough 4715. The central sheet convex 4711 is defined in the middle of the roof 47. The driver side sheet convex 4712 and the passenger side sheet convex 4713 are respectively arranged on both sides of the central sheet convex 4711. The driver side sheet trough 4714 is defined between the central sheet convex 4711 and the driver side sheet convex 4712, and the passenger side sheet trough 4715 is defined between the central sheet convex 4711 and the passenger side sheet convex 4713.

Figure 32:
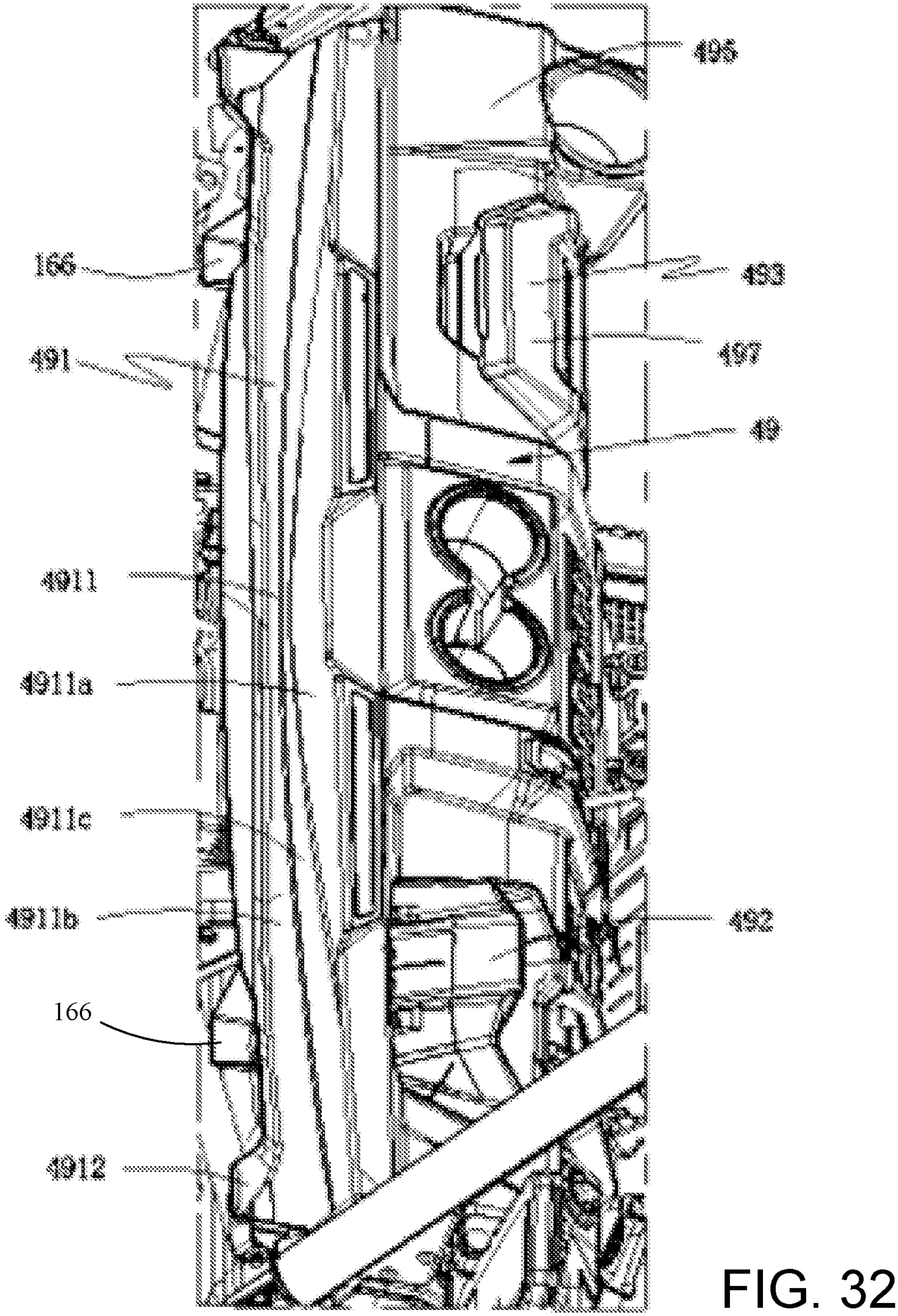
FIG. 32 is a left perspective view of a dashboard panel of the side-by-side utility vehicle in FIG. 1.

FIG. 32 shows a preferred dashboard panel 49 arranged inside and at the front of the cockpit 200. The dashboard panel 49 defines a front drainage portion 491 including a water catchment 4911. One or a plurality of drainage holes 4912 gravitationally receive and discharge water from the water catchment 4911. The water catchment 4911 preferably includes three water catchment faces 4911*a*, 4911*b* and 4911*c*, with water catchment faces 4911*a* and 4911*b* both being inclined. The three water catchment faces 4911*a* are preferably arched in the front-rear direction.

An incoming call notification module 492 is arranged on the driver side of the dashboard panel 49. The incoming call notification module 492 includes one or more selected from the group consisting of voice notification, vibration notification, and image notification.

A storage compartment 493, commonly referred to as a "glove box", is defined on the passenger side of the dashboard panel 49. The glove box storage compartment 493 is surrounded by a passenger side front fender 494 (called out on the driver side in FIG. 20), an upper dashboard body 495, a lower dashboard body 496 (called out in FIG. 20), and a glove box storage compartment cover 497. The glove box storage compartment cover 497 is pivotably connected to the upper dashboard body 495 or the lower dashboard body 496 for pivoting about a transverse horizontal axis, facilitating the opening and closing of the glove box storage compartment 493.

Figure 34:
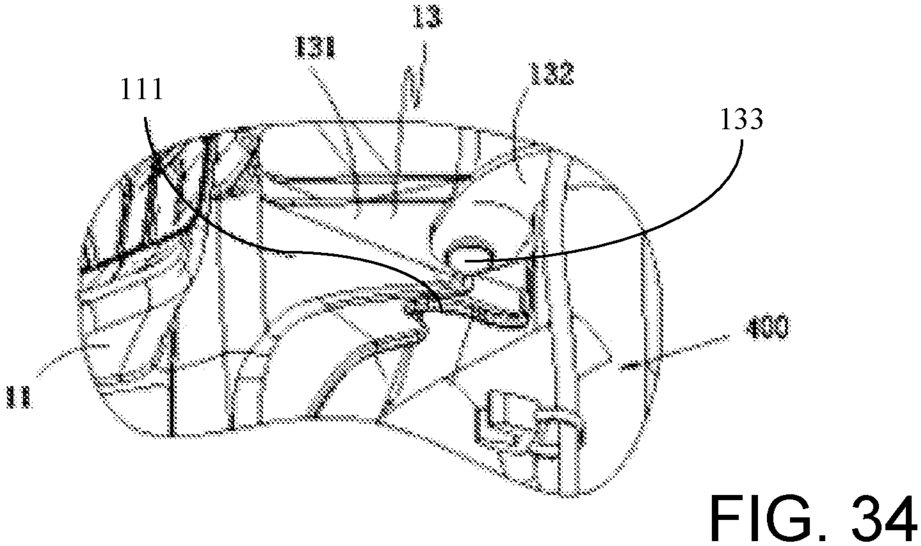
FIG. 34 is an enlarged view of part 34 in FIG. 33.

As shown in FIGS. 1 and 33, in the preferred embodiment shown, the vehicle front end 100 includes a front cover or hood 11 and front headlights 12. The hood 11 is hinged to the frame 400 with a pair of hood hinges 13, one of which is best seen in FIG. 34, allowing the hood 11 to pivot about a horizontal transverse axis from the closed position shown in FIGS. 1, 2 and 6 to the opened position shown in FIGS. 20 and 33. Each hood hinge 13 includes a cover flange 131 connected to a frame flange 132 by a pivot pin 133. Opening of the hood 11 is convenient for access and repair of the components under the hood 11. The hood hinges 13 allow pivoting of the hood 11 in a total hood pivot amount in the range from 75° to 270°, more preferably in the range from 90° to 180°, and most preferably in the range from 100° to 120° before a stay cord 15 prevents further opening. The stay cord 15 is flexible but not stretchable, and one end of the stay cord 15 is connected to the hood 11, and the other end of the stay cord 15 is connected to the frame 400. Too short of a stay cord 15 prevents the hood 11 from opening sufficiently for maintenance, whereas too long of a stay cord 15 makes it easy to damage the lights 12 and other components. If desired, two stay cords 15 can be used, including angling the anchor points for the stay cords 15 to provide improved stability when the stay cords 15 hold the hood 11 opened.

Figure 35:
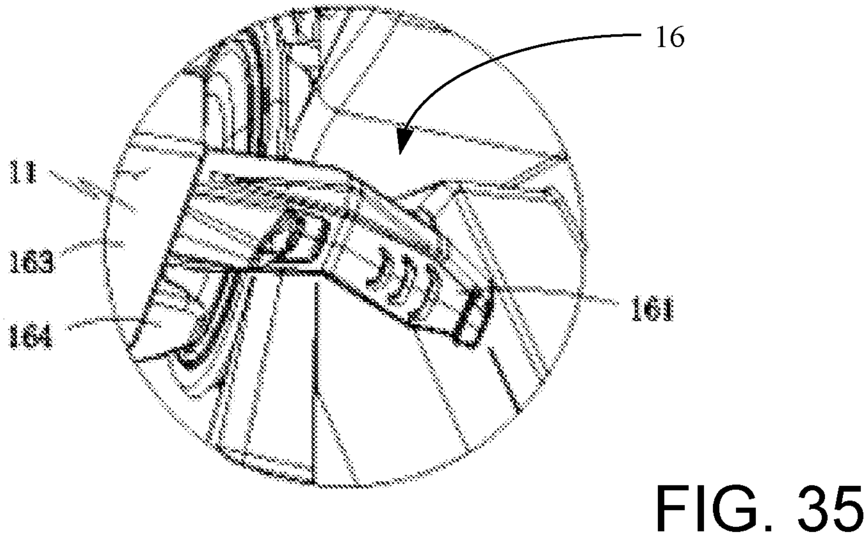
FIG. 35 is an enlarged view of part 35 in FIG. 33.

In the closed position of FIGS. 1, 2 and 6, the hood 11 of the vehicle front end 100 is held in place by at least one hood locking mechanism 16, which is located on a rear end 163 of the hood 11 which extends rearwardly and downwardly near the cockpit 200. One embodiment uses a single hood locking mechanism 16 such as on the driver side of the vehicle 10, while the embodiment shown uses two hood locking mechanisms 16, one on the driver side and one on the passenger side. Each hood locking mechanism 16 includes a hood strap 161 shown in FIGS. 33 and 35 and formed of flexible or elastic material, which mates onto a hood strap locking T 162 shown in FIGS. 20 and 36. The hood strap 161 is mounted on the rear end 163 of the hood 11. The hood strap locking T 162 is located on the vehicle cover 500 below the outer side of the dashboard panel 49, between the front wheels 91 and the cockpit 200. When the hood strap 161 is matched with the hood strap locking T 162, the hood 11 is restrained closed, but when the hood strap 161 is separated from the hood strap locking T 162, the hood 11 can be pivoted away from the cockpit 200.

Figure 36:
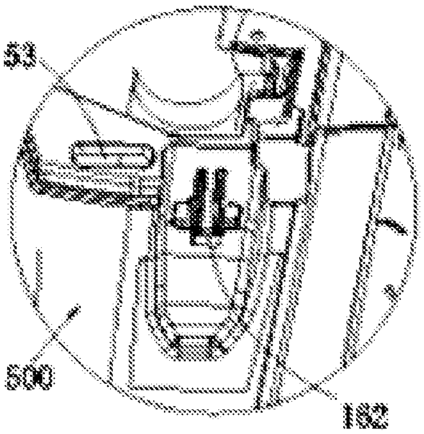
FIG. 36 is a left perspective view of a hood strap locking T of the side-by-side utility vehicle in FIG. 1.

As shown in FIG. 36, each side of the preferred vehicle cover 500 also defines a hood positioning groove 53 located just forward of the hood strap locking T 162 close to the front wheels 91. Two hood positioning tabs 164 are positioned on the hood 11, each to be inserted and matched with one of the hood positioning grooves 53. Use of the hood positioning tabs 164 reduces the stiffness requirements for the hood 11, while still allowing a stable latch which is unlikely to accidently unlock. The hood 11 will not be opened accidentally when driving, and will not interfere with the steering of the front wheels 91. To intentionally open the hood 11, the user simply pulls each hood strap 161 off its hood strap locking T 162 while pulling outwardly on the hood 11 to pull the hood positioning tab 164 out of its hood positioning groove 53, before pivoting the hood 11 open.

As shown in FIG. 33, the edge of the hood 11 close to the cockpit 200 is preferably provided with one or a pair of hood support bases 165. As shown in FIG. 32, the dashboard panel 49 is provided with a corresponding number of hood support plates 166 which can be abutted against each hood support base 165, further supporting the flexible hood 11 when closed.

As shown in FIG. 1, the preferred vehicle 10 includes a front bumper 14 fixed to a front end of the frame 400 which extends across the longitudinal mid-plane lm. More of the front bumper 14 can be seen in FIG. 33. Ends of the front bumper 14 extend rearward and upward to below the headlights 12. The front bumper 14 preferably includes a central bumper reinforcement bar 141, which extends forwardly and perhaps somewhat downwardly to extend across the longitudinal mid-plane lm. The central bumper reinforcement bar 141 is preferably exposed on a front of the vehicle 10. The hood 11 may include notches 111 (best shown in FIG. 34) extending away from the ground reference plane gr, so as to avoid interference with the central bumper reinforcement bar 141 when pivoting the hood 11 open.

Figure 37:
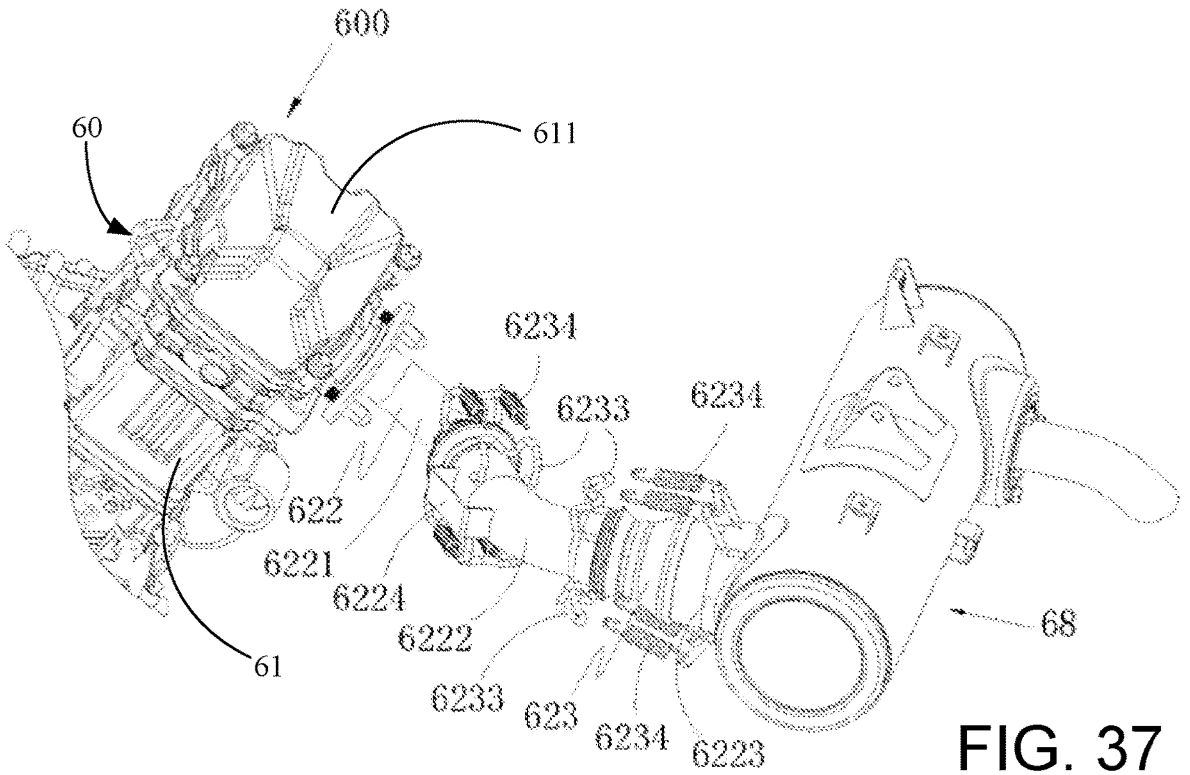
FIG. 37 is a left perspective view of a combustion exhaust manifold, a muffler and a portion of the engine of the side-by-side utility vehicle in FIG. 1.
Figure 38:
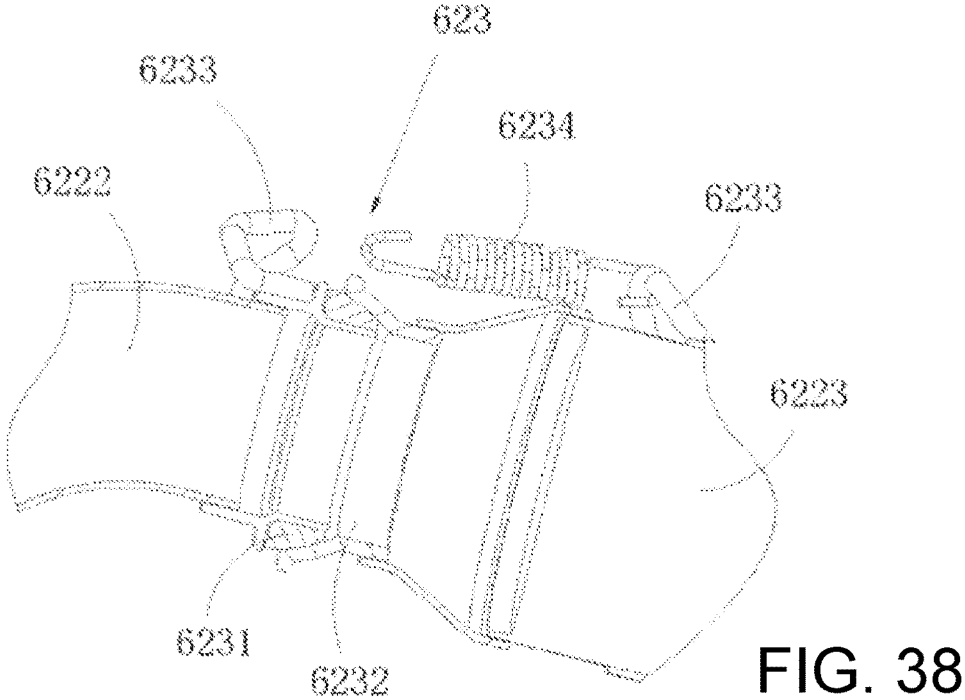
FIG. 38 is a cross-sectional view of a portion of the combustion exhaust manifold of the side-by-side utility vehicle in FIG. 1.
Figure 39:
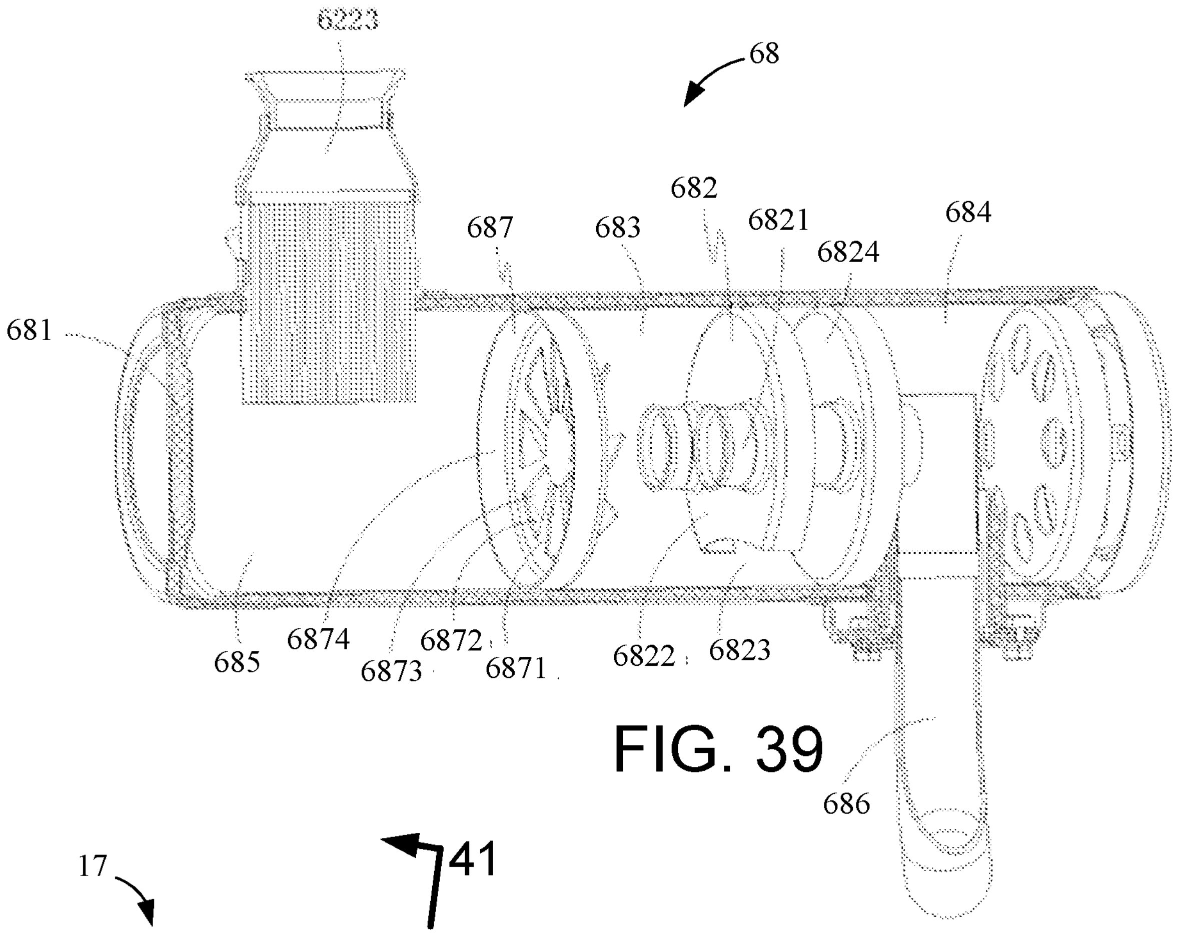
FIG. 39 is a plan view of the muffler of FIG. 37, showing the trailing exhaust manifold section and the muffler housing in cross-section.

The preferred embodiment includes a muffler 68 mounted on the frame 400, connected to the engine 60 through the combustion exhaust manifold 622. The muffler 68 is located below the rear trunk 300, such as below the metal plate 315 shown in FIG. 21. FIGS. 37-39 better show the muffler 68 and its connection to the combustion exhaust manifold 622. As shown in FIG. 37, the combustion exhaust manifold 622 preferably includes a leading exhaust manifold section 6221, an exhaust manifold midsection 6222, and a trailing exhaust manifold section 6223. In other embodiments, the number of the exhaust manifold sections may be varied as needed.

A connection structure 623 is arranged between two adjacent exhaust manifold sections to connect the two exhaust manifold sections to each other and to ensure relative displacement can be generated between the two adjacent exhaust manifold sections. A handle 6224 is arranged on the combustion exhaust manifold 622 to facilitate assembly or disassembly of the combustion exhaust manifold 622.

As shown in FIGS. 37 to 38, the preferred connection structure 623 includes a muffler connection sleeve 6231, a muffler fixing sleeve 6232, a plurality of muffler connection rods 6233, and a corresponding number of muffler tension springs 6234. One end of the muffler fixing sleeve 6232 is connected to one end of one of the exhaust manifold sections of the combustion exhaust manifold 622, and the other end of the muffler fixing sleeve 6232 is sleeved outside the muffler connection sleeve 6231 sleeved on another adjacent exhaust manifold section. At least one pair of muffler connection rods 6233 are arranged on each combustion exhaust manifold 622. The two muffler connection rods 6233 are symmetrically installed on two sides of the combustion exhaust manifold 622 along a radial direction. One end of the muffler tension spring 6234 is connected to the muffler connection rod 6233 on one of the exhaust manifold sections of the combustion exhaust manifold 622, and the other end is connected to the muffler connection rod 6233 on the adjacent exhaust manifold section. It should be noted that FIGS. 37 and 38 show the other end of the muffler tension spring 6234 not connected to the muffler connection rod 6233 on the adjacent exhaust manifold section, but they may be connected to each other in actual use as needed. Thus, the connection between two adjacent exhaust manifold sections of the combustion exhaust manifold 622 is implemented through the connection structure 623. The muffler connection sleeve 6231 may be a spherical graphite sleeve, which can effectively buffer and absorb the impact of engine amplitude.

FIG. 39 shows a cross-section of the preferred muffler 68. The muffler 68 includes a muffler housing 681 with a muffler outlet or tailpipe 686, a fixture 682 and a sound insulation member 687 within the muffler housing 681, and three chambers 683, 684, 685 defined within the muffler housing 681 by the fixture 682 and the sound insulation member 687. The sound insulation member 687 is preferably upstream of the fixture 682. The volume of the upstream chamber 685 is greater than the volume of the mid-chamber 683 defined between the sound insulation member 687 and the fixture 682.

The sound insulation member 687 includes a sound insulation plate 6871 inside an outer ring 6874, with the outer ring 6874 abutting the muffler housing 681 to fix the sound insulation plate 6871 inside the muffler housing 681. A plurality of ports 6872 are defined through the sound insulation plate 6871, evenly distributed along the circumferential direction of the sound insulation plate 6871. Each port 6872 has a blade 6873 extending downstream from the sound insulation plate 6871. The number of the ports 6872 and blades 6873 may be selected as needed for adequate exhaust flow and adequate sound insulation. The blades 6873 limit the flow rate of the exhaust through the ports 6872. At the same time, the blades 6873 direct the exhaust gas to form an airflow whirl, which lengthens the airflow and slows down the flow rate of the exhaust gas, resulting in a longer residence time for the exhaust gas colliding with itself within the muffler 68, thereby improving the noise reduction effect. In the preferred embodiment, the ports 6872 and blades 6873 are integrally fabricated in the sound insulation plate 6871 by stamping, improving manufacturing and installation efficiency. Each blade 6873 preferably has the same inclination angle, making the exhaust flow passing through more stable and resulting in better noise reduction effect. The blades 6873 are preferably inclined at an angle with the sound insulation plate 6871 in the range from 15° to 65°, more preferably in the range from 25° to 55°, and most preferably in the range from 30° to 45°.

The fixture 6812 includes a first fixing sleeve 6822 and a second fixing sleeve 6824 connected to the inner wall of the muffler housing 681, with a through tube 6821 passing through the first fixing sleeve 6822 and the second fixing sleeve 6824 at the same time. The lower portion of the first fixing sleeve 6822 and the inner wall of the muffler housing 681 jointly define a gap 6823.

As shown in FIG. 33, a brake fluid reservoir 17 is mounted in the vehicle front end area 100. The brake fluid reservoir 17 is better shown in FIGS. 40 and 41. The brake fluid reservoir 17 includes a reservoir body 171 and a reservoir cap 172 which can be threaded onto the reservoir body 171. The reservoir body 171 defines a surplus chamber 173 on top of a storage chamber 174 in fluid communication with each other. The surplus chamber 173 has a smaller cross-section area than the storage chamber 174.

Figure 41:
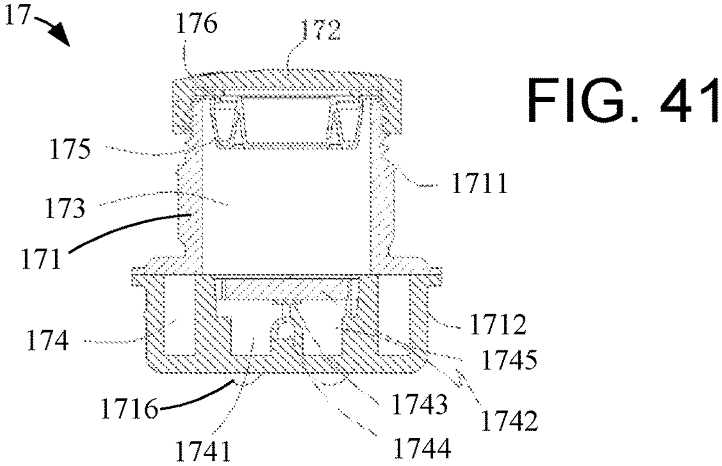
FIG. 41 is a cross-sectional view of the brake fluid reservoir of FIG. 40.

As shown in FIG. 41, in the preferred embodiment shown, part or all of the storage chamber 174 defines a sensor chamber 1741, and an alarm device 1742 is arranged inside the sensor chamber 1741. The alarm device 1742 preferably includes a brake fluid float 1745 for controlling the switch of the alarm device 1742, an electromagnetic induction magnet 1743 arranged on the brake fluid float 1745, and an electromagnetic induction connector 1744 arranged on the reservoir body 171 for receiving signals. The brake fluid float 1745 is installed inside the sensor chamber 1741 (possibly on a guide rod) and can move up and down along the inner wall of the reservoir body 171 with changes in the height of the brake fluid level. The electromagnetic induction connector 1744 is preferably installed on or in the reservoir body 171 beneath the electromagnetic induction magnet 1743. If desired, the reservoir body 171 and the reservoir cap 172 may be molded of a polymer material, and the brake fluid float may be formed with an air pocket (not shown) or otherwise formed of a material such as closed cell foam which is less dense than brake fluid.

During driving, if/when the amount of excess brake fluid decreases, the height of the brake fluid in the brake fluid reservoir 171 decreases. The cross-sectional area of the surplus chamber 173 is smaller than that of the storage chamber 174, and the total amount of brake fluid in the surplus chamber 173 is less than the total amount of brake fluid in the storage chamber 174. For a given rate of brake fluid decrease, the brake fluid level inside the surplus chamber 173 drops faster than the brake fluid level inside the storage chamber 174. Once the brake fluid level reaches the storage chamber 174, the brake fluid float 1745 moves downwards with the descent of the brake fluid level, in order to trigger the alarm device 1742. When the brake fluid level drops to a junction of the surplus chamber 173 and the storage chamber 174, brake fluid float 1745 begins to move changing the signal between the electromagnetic induction magnet 1743 and the electromagnetic induction connector 1744 and the alarm device 1742 will send a pre-alarm to remind the driver to add brake fluid. The pre-alarm may be indicator lights, buzzers, or other components (not shown) that serve as reminders. When the brake fluid level drops to the bottom of the sensor chamber 1741, the proximity between the electromagnetic induction magnet 1743 and the electromagnetic induction connector 1744 will cause the alarm device 1742 to sound an alarm. The alarm device 1742 preferably triggers both a buzzer and an indicator light (neither shown) in the cabin 200, which can quickly attract the attention of the driver. When the alarm is sounded, the total amount of brake fluid remaining in the storage chamber 174 is still sufficient to meet the demand for braking, providing sufficient time for the driver to add brake fluid and ensuring the safety of the vehicle 10 during driving.

Figure 40:
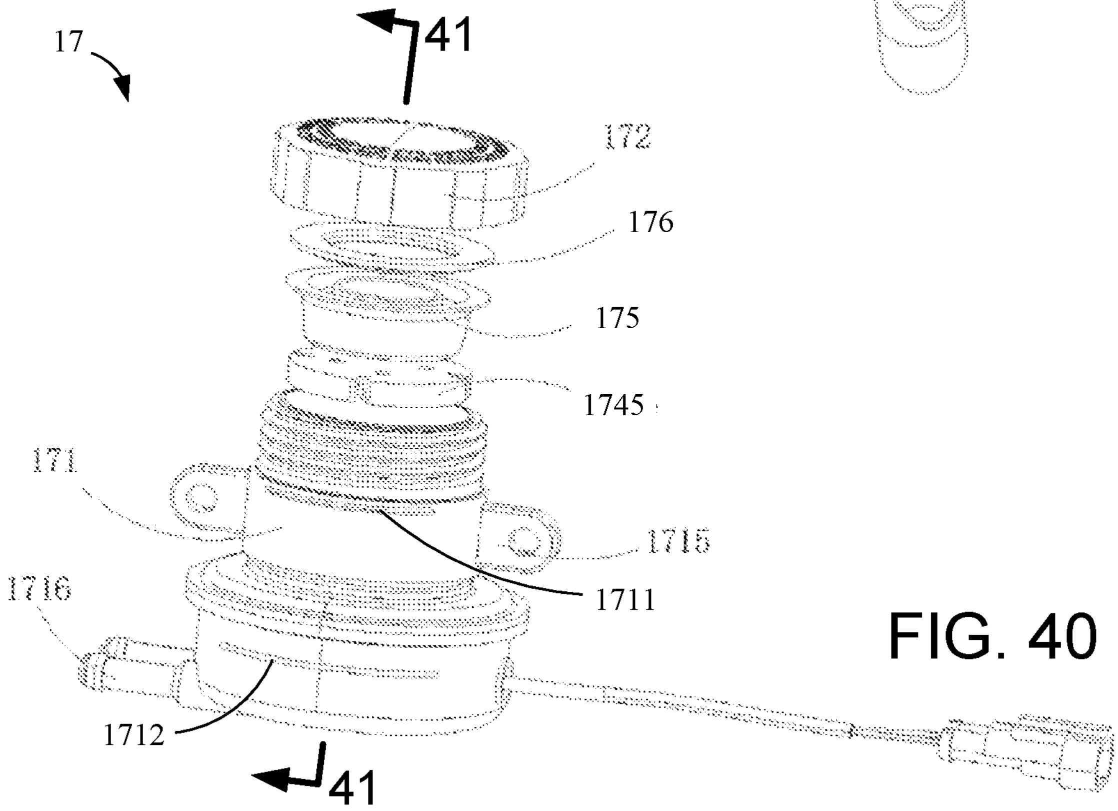
FIG. 40 is an exploded perspective view of the brake fluid reservoir of the side-by-side utility vehicle in FIG. 1.

FIGS. 40 to 41 call out two bulges 1711 and 1712 on the brake fluid reservoir body 171. A first full-level bulge 1711 indicates the highest level to which brake fluid should be added. When the brake fluid level is higher than the full-level bulge 1711, brake fluid could damage the brake fluid reservoir 171 due to thermal expansion. If desired, the alarm device 1742 could be configured to sound an additional alarm to prompt the driver to remove brake fluid. A second add-brake-fluid bulge 1712 corresponds with the low brake fluid level that will cause the alarm device 1742 to sound the alarm. Preferably the brake fluid reservoir body 171 is formed at least in part of a transparent or translucent material, so the driver can see if the top of the brake fluid level is below either of the two bulges 1711, 1712 even without removing the reservoir cap 172.

As shown in FIG. 40, the preferred brake fluid reservoir 17 includes a reservoir screen 175 and a reservoir gasket 176, which can both be positioned between the reservoir body 171 and the reservoir cap 172. The reservoir gasket 176, and preferably the top flange of the reservoir screen 175, are made of a soft, compressible material such as rubber. When the reservoir cap 172 is tightened onto the reservoir body 171, the reservoir gasket 176 seals the connection between the reservoir cap 172 and the reservoir body 171 to prevent brake fluid leakage. The reservoir screen 175 can be used to ensure that particulate matter does not mistakenly fall into the brake fluid reservoir 17 when adding brake fluid, and also to allow better visualization of the brake fluid level while the cap 172 is removed.

As shown in FIG. 40, the brake fluid reservoir body 171 preferably includes two installation side ears 1715 each with an installation hole. The installation side ears 1715 are used to bolt the brake fluid reservoir 171 in its designated position under the hood 11.

A plurality of brake fluid outlets 1716 are arranged toward the bottom of the reservoir body 171, supplying brake fluid to a brake master cylinder (not shown). When the driver pushes the brake pedal (not shown), the piston of the brake master cylinder is moved, applying pressure to the brake fluid, which in turn energizes the vehicle brakes (not shown).

Figure 42:
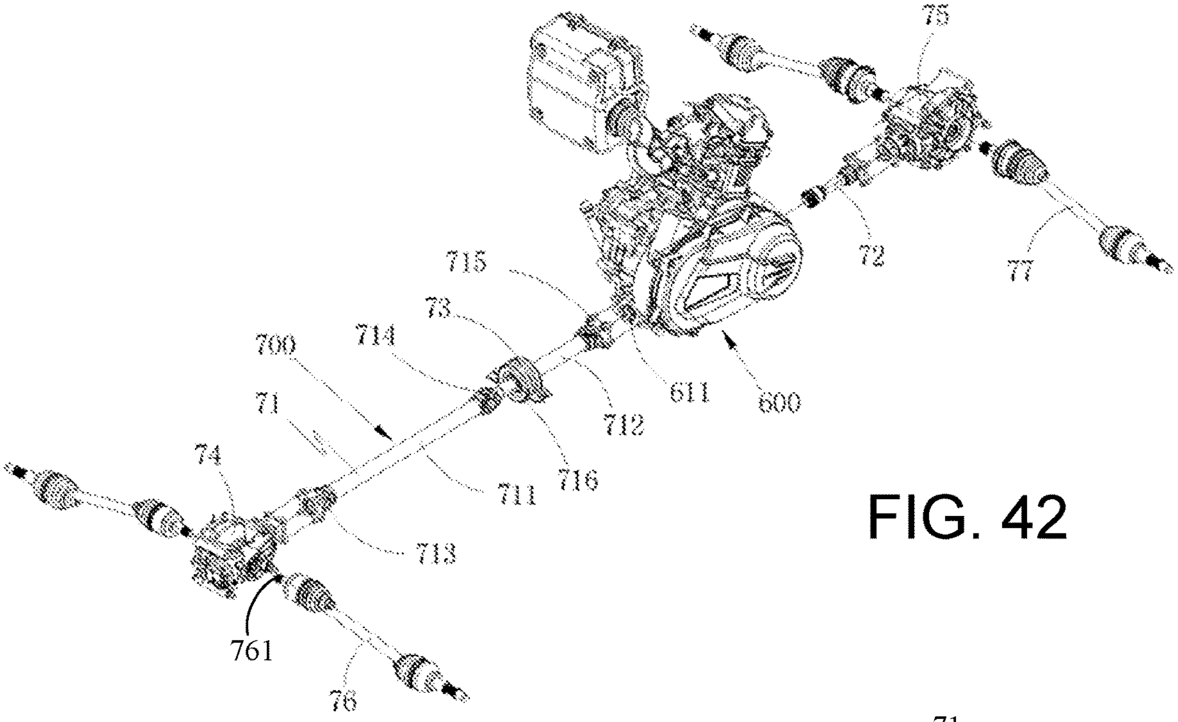
FIG. 42 is a front left perspective view of the drive train of the side-by-side utility vehicle in FIG. 1.
Figure 43:
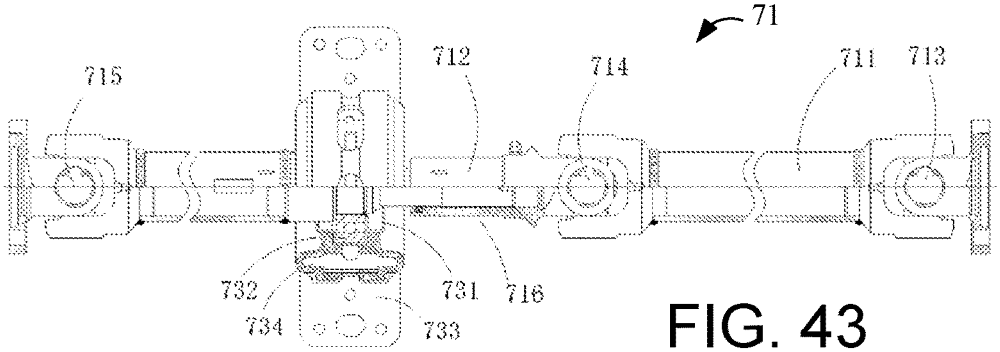
FIG. 43 is a side view, in partial cross-section, of the front drive shaft of the drive train of FIG. 42.

FIGS. 42 to 43 better show the preferred drive train 700 for the vehicle 10. The drive train 700 includes a front drive shaft 71, a rear drive shaft 72, a drive shaft support device 73, a front differential 74, a rear differential 75, two front constant velocity half shafts 76, and two rear constant velocity half shafts 77. The front drive shaft 71 transmits torque from the front power output flange 601 of the engine 60 to the front differential 74. The rear drive shaft 72 transmits torque from the rear power output flange 602 (shown in FIG. 4) of the engine 60 to the rear differential 75. The drive shaft support device 73 is installed on the front drive shaft 71 and helps support the weight of the front drive shaft 71 at a middle location along its length. Each constant velocity half shaft 76, 77 delivers torque from its associated differential 74, 75 to its associated wheel 91, 92.

As shown in FIGS. 42 to 43, in the preferred embodiment shown, the front drive shaft 71 includes a first shaft section 711, a second shaft section 712, a first cross universal joint 713, a second cross universal joint 714, a third cross universal joint 715 and a spline pair 716. The first cross universal joint 713 is installed on the end of the first shaft section 711 and connected to the front differential 74. Two ends of the second cross universal joint 714 are respectively connected to the first shaft section 711 and the second shaft section 712. The third cross universal joint 715 is installed on the second shaft section 712 and connected to the front power output flange 601 of the engine 60. The first shaft section 711 and the second shaft section 712 are connected by the spline pair 716, so that the relative position between the first shaft segment 711 and the second shaft segment 712 can slide longitudinally to ensure the stability of torque transmission.

As shown in FIG. 43, the drive shaft support device 73 includes a shaft fixing component 731, a bearing 732, a support component 733, and a damping elastic component 734. The installation position of the shaft fixing component 731 on the second shaft section 712 is close to the side of the second cross universal joint 714, so that the drive shaft support device 73 can support the middle of the front drive shaft 71. The support component 733 is fixed to the frame 400. The damping elastic component 734 absorbs shocks so as to reduce vibration amplitude during rotation of the front drive shaft 71 as the vehicle 10 travels over bumps and obstacles. In the preferred embodiment, the damping elastic component 734 is made of rubber.

FIGS. 44 to 47 better show the preferred front differential 74, which includes an input bevel gear 740 and two internally-splined differential outputs 741, 744. Each of the internally-splined differential outputs 741, 744 mates with external splines 761 on the end of a constant velocity half shaft 76 shown in FIG. 42. The general structural principles of differentials are well-known, and will be not described here. See, for instance, U.S. Pat. Nos. 10,816,071 and 11,353,099, both incorporated by reference.

Figure 44:
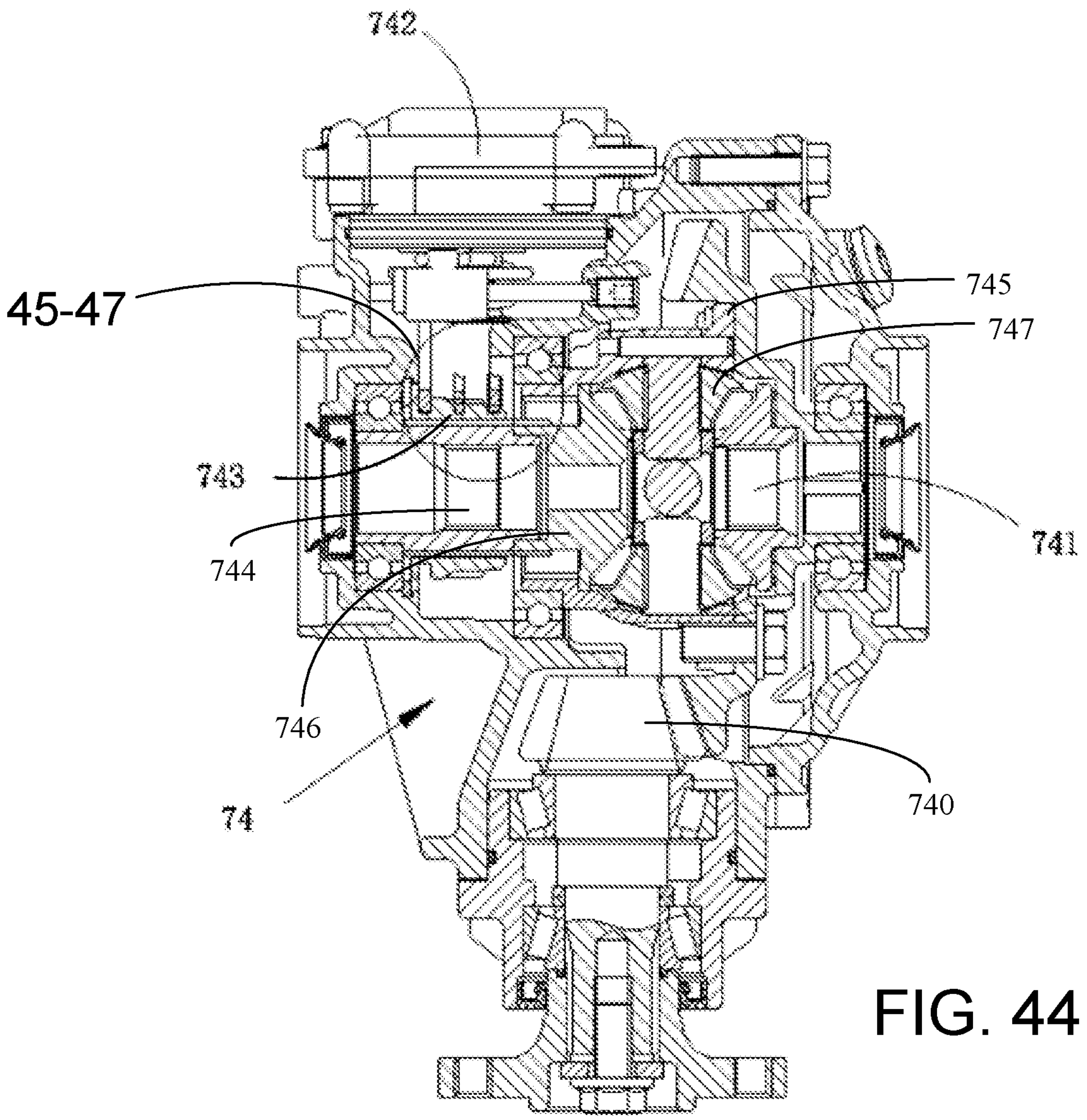
FIG. 44 is a horizontally bisecting cross-sectional view of the front differential of the side-by-side utility vehicle in FIG. 1.

The front differential 74 includes a drive mode motor 742 and a drive mode adjustment device 743. The drive mode adjusting device 743 includes a fork 7431 and a spline shift sleeve 7432. The shift fork 7431 is connected to the output shaft of the drive mode motor 742, and the drive mode motor 742 can drive the shift fork 7431 to move. FIG. 44 shows all three drive mode positions of the shift fork 7431 due to such movement, whereas FIGS. 45-47 each show a single position of the shift fork 7431.

The differential 741 includes a differential housing 745 and a half shaft gear 746, which when a pinion 747 spins can rotate relative to the differential housing 745 for differential operation. The spline shift sleeve 7432 is sleeved on the output 744, with a splined connection so the spline shift sleeve 7432 and the output 744 always rotate about a transverse axis at the same speed, but so the spline shift sleeve 7432 can slide back and forth (to the right or left as shown in FIGS. 44-47) relative to the output 744. The spline shift sleeve 7432 is equipped with a shift fork slot 7433, and one end of the shift fork 7431 is inserted into the shift fork slot 7432*a* so the shift fork 7431 can drive the spline shift sleeve 7432 to slide.

Figure 45:
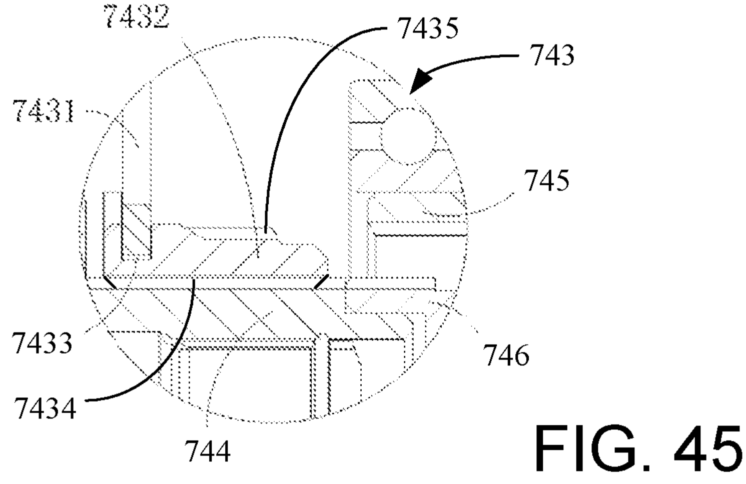
FIG. 45 is an enlargement of portion 45-47 of FIG. 44, showing the shift fork and spline shift sleeve in their first, two wheel drive state.

When the spline shift sleeve 7432 is in its position shown in FIG. 45, it does not contact the half shaft gear 746, and no engine power is transmitted to the output 744. With no torque transmitted to the output 744, any rotation of the front drive shaft 71 can be taken by spinning of the pinion 747 and free spinning of the half shaft gear 746, and no torque is transmitted to the other output 741, and the vehicle 10 remains in two wheel drive mode.

Figure 46:
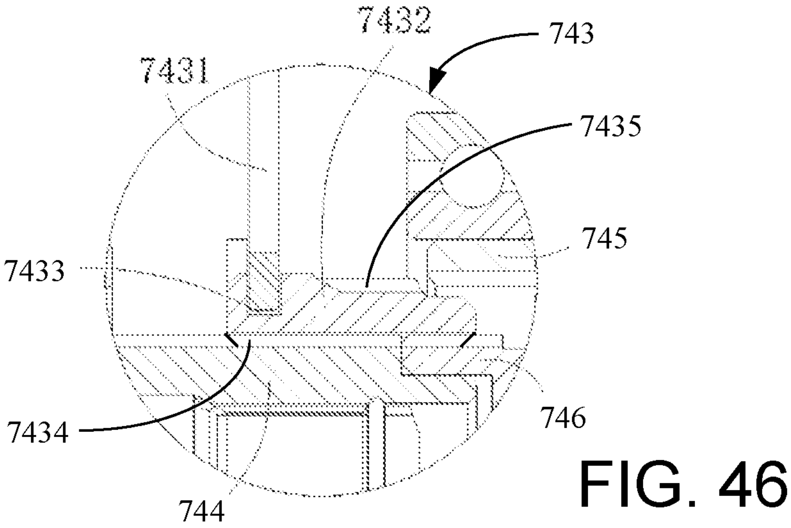
FIG. 46 is an enlargement of portion 45-47 of FIG. 44, showing the shift fork and spline shift sleeve in their second, four wheel drive state.

When the spline shift sleeve 7432 is driven by the shift fork 7431 to the position shown in FIG. 46, inner splines 7434 of the spline shift sleeve 7432 mesh with the half shaft gear 746 but the spline shift sleeve 7432 does not mesh with the differential housing 745. Torque can be transmitted to one of the front wheels 91 through the half shaft gear 746, the spline shift sleeve 7432 and the output 744, torque can be transmitted to the other of the front wheels 91 through the output 741, and the vehicle 10 drives in four wheel drive mode.

Figure 47:
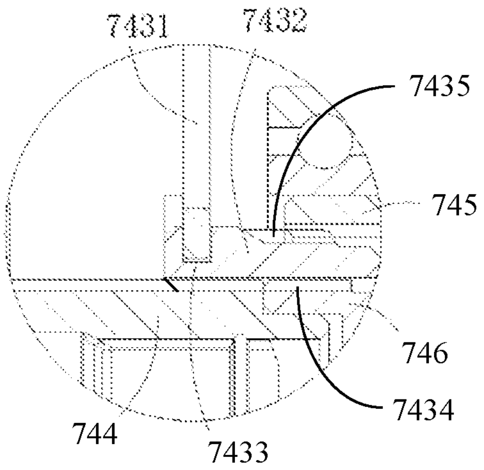
FIG. 47 is an enlargement of portion 45-47 of FIG. 44, showing the shift fork and spline shift sleeve in their third, four wheel differential locked drive state.

When the shift fork 7431 drives the spline shift sleeve 7432 to the position shown in FIG. 47, outer splines 7435 of the spline shift sleeve 7432 mesh with the differential housing 745, and the vehicle 10 enters the four wheel drive locking mode. At this time, the differential is locked and stops working (i.e., stops allowing rotational speed differences between the two front wheels 91 and prevents spinning of the pinion 747), making the front wheels 91 of the vehicle 10 rotate at the same speed while receiving torque.

Figure 48:
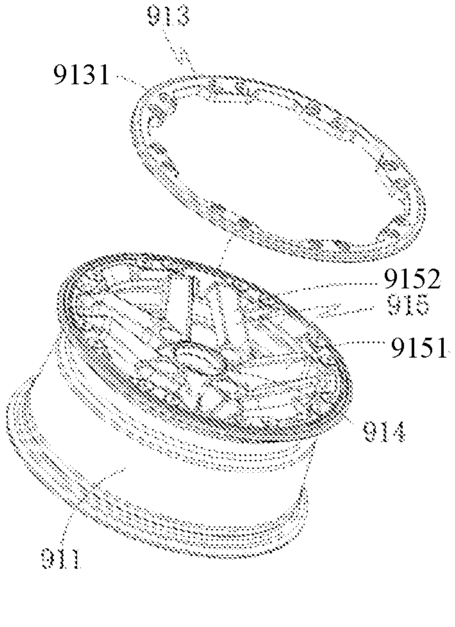
FIG. 48 is a perspective view of the rim and tire holder used in one of the front wheels of the side-by-side utility vehicle in FIG. 1.
Figure 49:
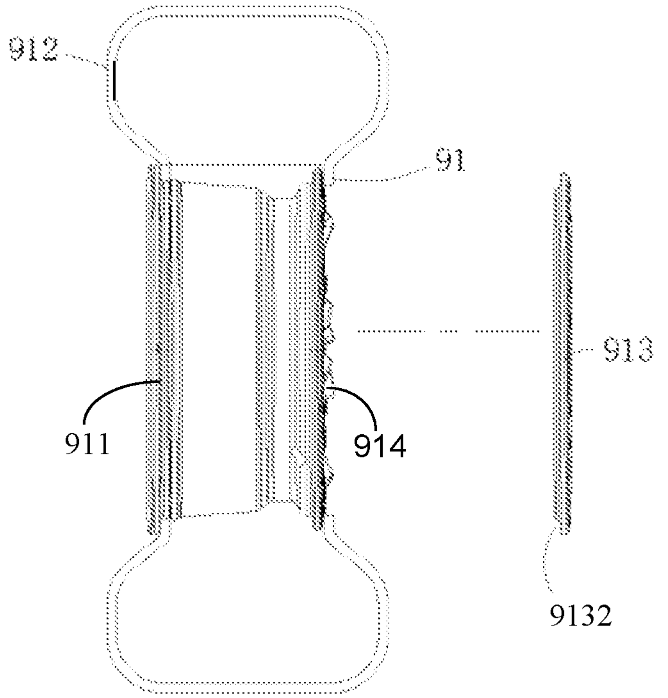
FIG. 49 is a cross-sectional view of one of the front wheels in FIG. 1, showing the rim in front view.

FIGS. 48 and 49 show the structure of a wheel, which can be identical for the rear wheels 92 as the front wheels 91. The wheels 900 each includes a rim 911, a wheel hub 914, a spoke section 915 used to connect the wheel hub 914 and the rim 911, a tire 912 arranged on the rim 911 and a tire holder 913 used to fix the tire 912 on the rim 911. The tire holder 913 is a circular structure. A plurality of rectangular bumps 9131 are evenly distributed along the circumference on the tire holder 913, and the rectangular bumps 9131 are fixed to the inner wall of the tire holder 913. The tire holder 913 can be fixed to the rim 911 by bolts (not shown, but sixteen bolts used with the tire holder 912 shown in FIG. 48), such as two bolts through each rectangular bump 9131. A ring groove 9132 is defined on the tire holder 913 on the side where the tire holder 913 contacts the rim 911. Installing the tire 912 involves placing the tire 912 onto the rim 911 so the inner side of the tire 912 is directly bumpered into the rim 911 and the tire lip of the outer side of the tire 912 is on the side wall of the rim 911, adjusting the angle of the tire holder 913, and fixing the tire holder 913 on the rim 911 with the bolts, the tightening of the bolts causing the tire lip to be pressed on the rim 911, so as to fix the whole tire 912 on the rim 911. The tire 912 is locked onto the rim 911 through the tire holder 913, so that even if the tire 912 is punctured in the wild, it will not fall off the rim 911. This allows vehicles 10 to drive at low speeds to repair points without easily causing component damage.

As shown in FIG. 48, the spoke section 915 includes four inner connection portions 9151 arranged on the hub 914 and a plurality of outer spoke portions 9152 arranged on the inner connection portions 9151 and extending radially outward. A plurality of gaps are defined between the outer spoke portions 9152 and the inner connection portions 9151. Both the inner connection portions 9151 and the outer spoke portions 9152 angle or slope away from the longitudinal mid-plane lm from the hub 914 to the rim 911.

Figure 50:
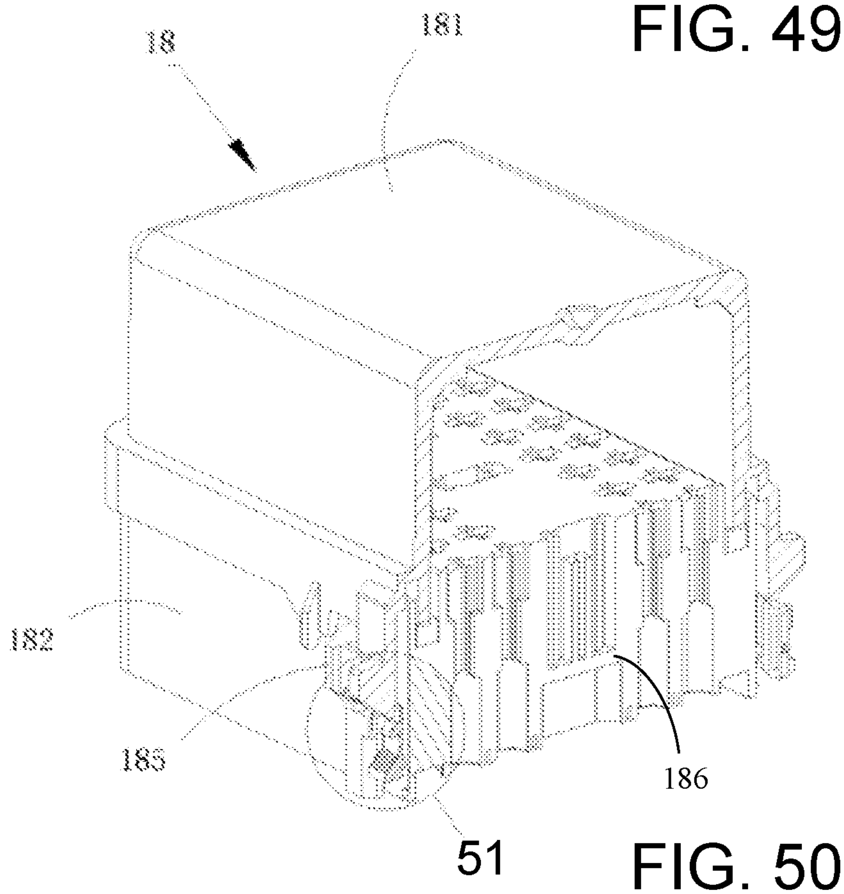
FIG. 50 is a cross-sectional view of a fuse box of the side-by-side utility vehicle in FIG. 1.
Figure 51:
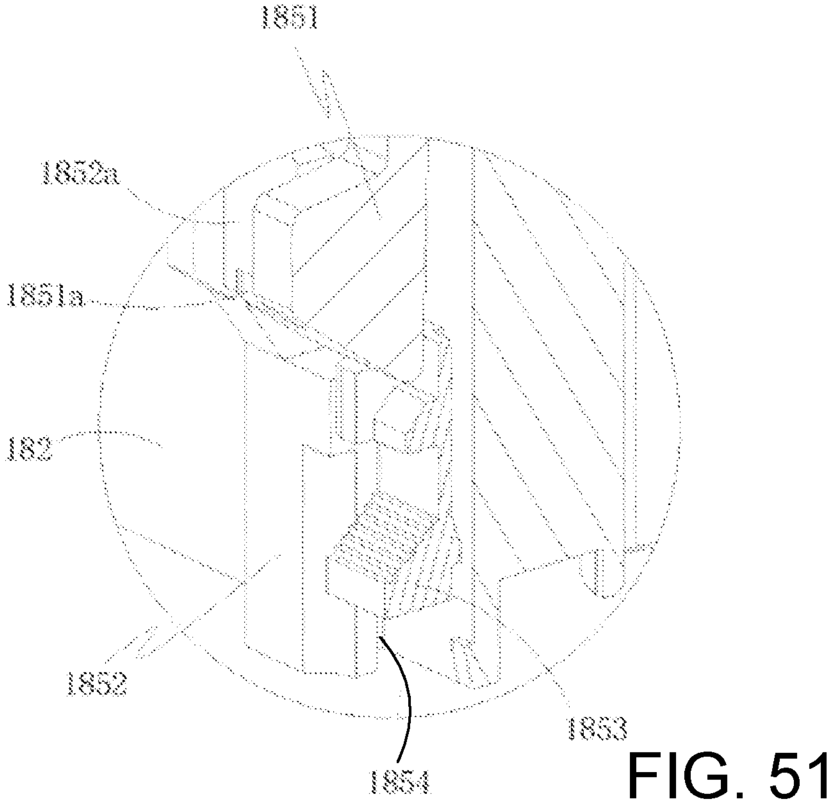
FIG. 51 is an enlarged view of part 51 in FIG. 50.
Figure 52:
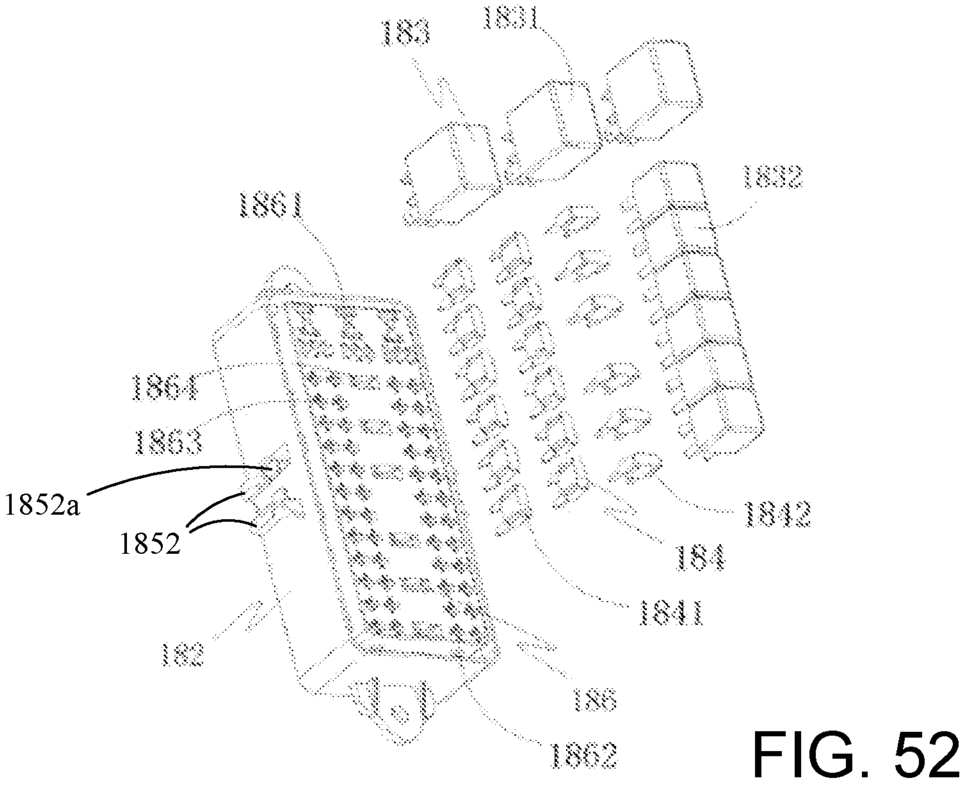
FIG. 52 is a perspective view of the lower box body and socket block of FIG. 50, showing an exploded perspective of the relays and fuses used in the fuse box.

The vehicle 10 preferably includes a fuse box 18 shown in FIGS. 50-52. The fuse box 18 can be located anywhere on the vehicle 10 which is convenient for wiring, preferably in a location protected from precipitation. The fuse box 18 includes an upper box body 181, a lower box body 182, and a buckle structure 185. The upper box body 181 and the lower box body 182 are detachably connected through the buckle structure 185. The lower box body 182 includes a socket block 186 for holding relays 183 and fuses 184. Specifically, the preferred socket block 186 defines three sockets 1861 for 5-pin relays 1831, six sockets 1862 for 4-pin relays 1832, twelve sockets 1863 for common mini-fuses 1841 and six sockets 1864 for standby mini-fuses 1842, so that both the relays 183 and the fuses 184 can be installed in the lower box body 182. In other embodiments, the numbers of 5-pin relays, 4-pin relays, common mini-fuses and/or standby mini-fuses may be adjusted as needed. Each 4-pin relay socket 1862 has the same structure as two of the common mini-fuse sockets 1863, which makes it possible for vehicle designers to adjust the number of 4-pin relays 183 and common mini-fuses 1841 in the limited box space.

As best shown in FIG. 51, the buckle structure 185 includes an upper fastener 1851, a lower fastener 1852, and a slide block 1853. The upper fastener 1851 is installed on the upper mounting box 181, and the lower fastener 1852 is installed on the lower mounting box 182. The upper fastener 1851 includes a hook portion 1851*a*, and the lower fastener 1852 includes abutment portion 1852*a*. A buckle slot 1854 is defined between the lower fastener 1852 and the lower box body 182. When the upper box body 181 is matched with the lower box body 182, the upper fastener 1851 will extend into the buckle slot 1854. The hook portion 1851*a* is matched with the abutment portion 1852*a* to form an anti-detachment fit between the upper box body 181 and the lower box body 182. The slide block 1853 is mounted inside the buckle slot 1854 and is capable of sliding along the buckle slot 1854. When the sliding block 1853 slides between the upper fastener 1851 and the lower box body 182, the upper fastener 1851 is pressed against the slide block 1853, preventing elastic deformation of the upper fastener 1851, and the hook portion 1851*a* and the abutment portion 1852*a* cannot be separated, thus achieving the locking between the upper fastener 1851 and the lower fastener 1852. On the other hand, when the sliding block 1853 is not placed between the upper fastener 1851 and the lower mounting box 182, the hook portion 1851*a* can be separated from the abutment portion 1852*a* to realize the unlocking between the upper fastener 1851 and the lower fastener 1852. The slide block 1853 may be a third loose part separate from both the upper box body 181 and the lower box body 182, or alternatively may be integrally manufactured with either the upper box body 181 or the lower box body 182. If desired, all of the structure shown in FIG. 51 may be molded of polymer.

Any embodiment of this application can be used as an independent technical solution or combined with other embodiments. All patents and publications mentioned in the specification of this application indicate that these are public technologies in the field and can be used in this application. All patents and publications cited here are listed in the same reference, just as each publication is specifically referenced separately. This application can be implemented without any one or more elements, one or more restrictions, which are not specifically described here.

What is claimed is:

1. A side-by-side utility vehicle comprising:

a pair of front wheels and a pair of rear wheels, with a ground reference plane being defined as a horizontal plane where the wheels contact with the ground, with a longitudinal mid-plane being defined as a vertical plane where a center line of the vehicle in a width direction is located, the longitudinal mid-plane being perpendicular to the ground reference plane, and with a wheelbase distance being defined within the ground reference plane between the front wheels and the rear wheels;

a frame supported by the front wheels and the rear wheels;

a cockpit supported by the frame, with a steering mechanism and a driver area and a passenger area defined inside the cockpit, the driver area having a driver seat and the passenger area having a passenger seat;

a prime mover assembly supported by the frame, the prime mover assembly comprising an engine, a transmission assembly coupled to the engine and a gear shift assembly coupled to the transmission assembly, the engine having at least one internal combustion cylinder;

a drive train coupled to the prime mover assembly to drive at least one of the front wheels and the rear wheels; and an intake and exhaust system comprising a combustion air intake manifold, a combustion exhaust manifold, a cooling air intake manifold and a cooling air outlet manifold, the combustion air intake manifold and the combustion exhaust manifold being coupled to the internal combustion cylinder, and the cooling air intake manifold and the cooling air outlet manifold being coupled to the transmission assembly;

wherein the combustion air intake manifold is closer to the the driver seat and the passenger seat than the combustion exhaust manifold is to the driver seat and the passenger seat, and the combustion air intake manifold and the combustion exhaust manifold are located on a same first side of the longitudinal mid-plane;

wherein the cooling air intake manifold is located on a same second side of the longitudinal mid-plane with the cooling air outlet manifold, the first side of the longitudinal mid-plane being opposite the second side of the longitudinal mid-plane such that the combustion air intake manifold and the cooling air intake manifold are respectively located on opposite sides of the longitudinal mid-plane;

wherein the internal combustion cylinder defines a cylinder head mid-point and the driver seat and the passenger seat collectively define a seat beam front point; and wherein the ratio of a distance between the cylinder head mid-point and the seat beam front point to the wheel base distance is in the range from 0.22 to 0.49;

wherein the driver seat comprises:

a driver seat cross beam;

a driver seat scaffold connected to the driver seat cross beam;

a driver seat back-cushion arranged on the driver seat scaffold;

a driver seat cushion arranged on the driver seat scaffold; and a seat adjustment device connecting the driver seat cross beam and the driver seat scaffold, the seat adjustment device comprising:

at least one movable adjustment slide rail connected to the driver seat scaffold;

at least one stationary adjustment slide rail connected to the movable adjustment slide rail(s) in a way that allows selective sliding of the movable adjustment slide rail relative to the stationary adjustment slide rail; and a seat adjustment handle arranged to control whether the movable adjustment slide is slidable relative to the stationary adjustment slide rail;

wherein a driver seat connection structure is arranged between the driver seat and the frame, the driver seat connection structure comprising:

a driver seat limit base arranged on the frame;

a driver seat fixing pin arranged on the frame;

a driver seat connection shaft arranged on the driver seat cross beam, the driver seat fixing pin releaseably mating with the driver seat limit base; and a driver seat locking member detachably connectable to the driver seat fixing pin.

2. The side-by-side utility vehicle of claim 1, wherein the seat beam front point is defined as a projection of a midpoint in a front end face of a seat support main beam on the longitudinal mid-plane;

wherein a storage space is defined under at least one of the the passenger seat and the driver seat;

wherein a storage box having an upper opening is arranged in the storage space; and wherein either a storage box cover is arranged between the storage box and said at least one of the passenger seat and the driver seat, or said at least one of the passenger seat and the driver seat is capable of closing the upper opening of the storage box.

3. The side-by-side utility vehicle of claim 2, wherein a seat bracket is fixed to the frame, the seat bracket comprising:

a seat support cross beam fixed to the frame, with the seat support main beam connected to the seat support cross beam, and a plurality of seat support legs, each with one end connected to the seat support main beam and another end fixed to the frame, with the plurality of the seat support legs being respectively distributed on both sides of the seat support main beam.

4. The side-by-side utility vehicle of claim 1, wherein the passenger seat is separated from the driver seat, the passenger seat comprising:

a passenger seat base detachably connected to a seat bracket of the frame;

a passenger seat cushion arranged on the passenger seat base;

a passenger seat back detachably connected to the frame; and a passenger seat back-cushion arranged on the passenger seat back;

wherein a passenger seat connection structure is arranged between the passenger seat and the frame, the passenger seat connection structure comprising:

a passenger seat base stopper arranged on the passenger seat base;

a passenger seat base receptacle arranged on the passenger seat base;

a passenger seat fixing pin arranged on the seat bracket;

a seat stopper arranged on the seat bracket;

a back hook arranged on the passenger seat back; and a back rod arranged on the passenger seat back;

wherein the passenger seat plate stopper and the seat stopper are rotationally matchable, and wherein the passenger seat plate receptacle and the passenger seat fixing pin are detachably connectable to each other.

5. The side-by-side utility vehicle of claim 1, further comprising:

a cabin back plate arranged behind the the passenger seat and the driver seat;

a combustion intake air filter arranged on the cabin back plate, the combustion intake air filter comprising:

a preliminary air filter with a preliminary air filter element within a preliminary air filter housing; and a main air filter with a main air filter housing connected to the preliminary air filter housing by a pipeline, the main air filter being closer to the longitudinal mid-plane than the preliminary air filter;

wherein the preliminary air filter housing has an angled face defining an air inlet of the combustion intake air filter, the angled face and the cabin back plate cooperatively defining a combustion air inlet wedge angle facing towards outside of the vehicle;

an outer side cover mounted on the frame around the combustion air inlet wedge angle; and a baffle detachably mounted on the outer side cover so as to overlap the combustion air inlet wedge angle when viewed from outside of the vehicle;

wherein the main air filter housing defines a primary flow filter chamber and a supplementary flow filter chamber with a smaller volume than the primary flow filter chamber, the primary flow filter chamber having an primary flow air filter element disposed therein, the supplemental flow filter chamber having a supplemental filter element disposed therein.

6. The side-by-side utility vehicle of claim 5, wherein the combustion air inlet wedge angle is in the range from 18.2° to 49.6°.

7. The side-by-side utility vehicle of claim 1, further comprising:

a rear trunk, the rear trunk comprising a rear trunk frame pivotally attached to the frame of the vehicle and a rear trunk body fixed to the rear trunk frame, the rear trunk body having a rear trunk floor; and a release lever having a rod with one or more hooks which mate with the frame to hold the rear trunk such that the rear trunk floor is parallel to the ground reference plane, the release lever having at least one handle on an end of the rod which can be used to disengage the one or more hooks from the frame, the disengagement enabling dumping of the rear trunk to a maximum dump angle wherein the rear trunk floor is in the range from 40° to 60° relative to the ground reference plane, the rod having an engine avoidance portion, with a ratio of width of the engine avoidance portion to length of the rod being in the range from 1:3.3 to 1:3.6.

8. The side-by-side utility vehicle of claim 1, further comprising a fuel tank, wherein a center of gravity of the driver seat and a center of gravity of the fuel tank are respectively located on opposite sides of the longitudinal mid-plane;

wherein the fuel tank is located below the passenger seat;

wherein a passenger storage box is positioned below the passenger seat, with a top of the passenger storage box being closer to the passenger seat than a top of the fuel tank, and with a bottom of the fuel tank being closer to the ground reference plane than a bottom of the passenger storage box;

wherein the passenger storage box comprises a deeper storage area and a shallower storage area, the deeper storage area being closer to the longitudinal mid-plane than the fuel tank, and the shallower storage area being at least partially located above the fuel tank.

9. The side-by-side utility vehicle of claim 8, wherein the side-by-side utility vehicle comprises a battery, and a center of gravity of the battery and the center of gravity of the fuel tank are respectively located on opposite sides of the longitudinal mid-plane; wherein the center of gravity of the battery is rearward compared with a center of gravity of the seats; and wherein the center of gravity of the battery is farther away from the longitudinal mid-plane than a center of gravity of the engine.

10. The side-by-side utility vehicle of claim 8, wherein a driver storage box is arranged below the driver seat, and a bottom of the driver storage box is closer to the ground reference plane than the bottom of the passenger storage box.

11. The side-by-side utility vehicle of claim 10, wherein a bottom of the driver storage box is closer to the ground reference plane than a lowest point of the transmission assembly; and wherein a surface of the driver storage box is provided with rib plates extending in a direction toward the ground reference plane.

12. The side-by-side utility vehicle of claim 1, wherein a cabin back plate is arranged behind the the passenger seat and the driver seat, with an electronic control unit access port cover arranged on the cabin back plate; wherein the electronic control unit access port cover and a combustion intake air filter are respectively located on opposite sides of the longitudinal mid-plane.

13. The side-by-side utility vehicle of claim 1, wherein a dashboard panel is arranged inside the cockpit, and an incoming call reminder module is arranged on the dashboard panel.

14. The side-by-side utility vehicle of claim 1, wherein the prime mover assembly comprises a fuel input pipe and a coolant input pipe both further forward than a cylinder head of the internal combustion cylinder; and wherein the side-by-side utility vehicle comprises a fuel tank and a carbon canister connected to the fuel tank by a pipeline, the carbon canister being arranged on the frame behind the seat(s) the passenger seat and the driver seat.

15. The side-by-side utility vehicle of claim 1, further comprising a vehicle door, wherein the ratio of thickness of the vehicle door to width of the vehicle is in the range from 0.03 to 0.068.

16. The side-by-side utility vehicle of claim 15, wherein the vehicle door comprises:

a door frame having a bracket pin;

an outer door cover on the door frame, exterior from the cockpit;

an inner door cover on the door frame, interior toward the cockpit;

a door latch for latching the vehicle door shut;

a latch linkage mechanism connected to the door latch; and an interior handle with a handle mounting bracket pivotably connected to the bracket pin and movable between a opened position and a closed position, with movement between the opened position and the closed position being within a plane substantially parallel to a middle plane of the vehicle door along the vehicle width direction, the interior handle being coupled to the latch linkage mechanism such that when the interior handle is in the opened position, the latch linkage causes the door latch to be in an open state, and when the interior handle is in the closed position, the door latch may be in a latched state.

17. The side-by-side utility vehicle of claim 16, wherein the latch linkage mechanism comprises a push rod and a pull rod both provided with a rod sleeve, the rode sleeve comprising a sleeve seat, a sleeve body arranged on the rod sleeve seat, and a rod sleeve hook arranged on the rod sleeve seat.

18. The side-by-side utility vehicle of claim 16, wherein the inner door cover comprises a storage pouch with a handgrasp section for pulling the vehicle door closed.

19. The side-by-side utility vehicle of claim 15, wherein the vehicle door comprises a door window comprising:

a casement frame;

a window hinge arranged on the casement frame;

a front pane pivotally connected to the casement frame by the window hinge;

a rear pane pivotally connected to the casement frame by the window hinge;

a front pane limit mechanism connected between the casement frame and the front pane which restricts pivoting of the front pane outside of an allowed pivot angle in the range from 3° to 30° relative to the casement frame; and a rear pane limit mechanism connected between the casement frame and the rear pane which restricts pivoting of the rear pane outside of an allowed pivot angle in the range from 3° to 30° relative to the casement frame, the rear pane limit mechanism allowing disconnection so the rear pane can pivot further than 30° relative to the casement frame.

* * * * *